US008967635B2

(12) United States Patent
Paul et al.

(10) Patent No.: US 8,967,635 B2
(45) Date of Patent: Mar. 3, 2015

(54) BRAKES FOR MOBILE MEDICAL DEVICE

(71) Applicant: Stryker Corporation, Kalamazoo, MI (US)

(72) Inventors: Anish Paul, Portage, MI (US); William D. Childs, Plainwell, MI (US); Steven L. Birman, Otsego, MI (US)

(73) Assignee: Stryker Corporation, Kalamazoo, MI (US)

( * ) Notice: Subject to any disclaimer, the term of this patent is extended or adjusted under 35 U.S.C. 154(b) by 24 days.

(21) Appl. No.: 13/686,085

(22) Filed: Nov. 27, 2012

(65) Prior Publication Data

US 2013/0140783 A1 Jun. 6, 2013

Related U.S. Application Data

(60) Provisional application No. 61/701,555, filed on Sep. 14, 2012, provisional application No. 61/563,823, filed on Nov. 27, 2011.

(51) Int. Cl.

*B62B 7/00* (2006.01)
*A61G 5/12* (2006.01)
(Continued)

(52) U.S. Cl.

CPC ... *A61G 5/12* (2013.01); *A47C 7/62* (2013.01); *A61G 5/00* (2013.01); *A61G 5/10* (2013.01);
(Continued)

(58) Field of Classification Search

CPC . A61G 5/1037; A61G 5/1021; A61G 5/1005; A61G 5/101; A61G 5/1027; A61G 5/1032; A62B 5/0433; B62B 5/0457; B62B 5/04
USPC ......... 280/250.1, 33.994; 188/2 F, 72.1, 72.9, 188/72.3, 31, 166, 1.12
See application file for complete search history.

(56) References Cited

U.S. PATENT DOCUMENTS 3,990,541 A * 11/1976 Dobrinska et al. .............. 188/31
4,733,755 A 3/1988 Manning
(Continued)

FOREIGN PATENT DOCUMENTS

WO 98/07402 2/1998
WO 99/12507 3/1999

OTHER PUBLICATIONS

Owner's Manual and Maintenance Instructions for staxi Airport/Commercial Chair, downloaded from www.staxi.com on Oct. 22, 2012.

(Continued)

*Primary Examiner* — Joseph Rocca
*Assistant Examiner* — Conan Duda
(74) *Attorney, Agent, or Firm* — Warner Norcross & Judd LLP

(57) ABSTRACT

A brake system for a medical device, such as a cot, stretcher, bed, wheeled chair, or other medical device, includes a pin and toothed wheel arrangement wherein the selective insertion of a pin between teeth on the toothed wheel brakes the system, while the removal of the pin from between the teeth unbrakes the system. Multiple pins may be used with a single toothed wheel wherein the pins are offset from each other relative to the teeth so that, when one pin is inserted between teeth, the other pin is at least partially blocked from being inserted between the teeth. This effectively increases the resolution of the toothed wheel. The toothed wheel may be axially spaced from wheel(s) that roll on the ground. When so spaced, the toothed wheel, and all of the braking components associated therewith, may be enclosed within a housing separate from the rolling wheel(s).

30 Claims, 62 Drawing Sheets

(51) Int. Cl.

| | |
|---|---|
| ***A47C 7/62*** | (2006.01) |
| ***A61G 5/00*** | (2006.01) |
| ***A61G 5/10*** | (2006.01) |
| *A61J 1/16* | (2006.01) |

(52) U.S. Cl.

CPC .............. *A61G 5/101* (2013.01); *A61G 5/1037* (2013.01); *A61J 1/16* (2013.01); *A61G 2005/1094* (2013.01); *A61G 2005/125* (2013.01); *A61G 2005/128* (2013.01)

USPC ........................................................ 280/47.38

(56) References Cited

U.S. PATENT DOCUMENTS

| | | | | |
|---|---|---|---|---|
| 4,805,259 | A | 2/1989 | Kassai | |
| 4,953,667 | A | 9/1990 | Bigo | |
| 4,985,960 | A | 1/1991 | Zun | |
| 4,997,066 | A | 3/1991 | Bigo | |
| 5,191,675 | A | 3/1993 | Ishikura | |
| 5,370,408 | A | 12/1994 | Eagan | |
| 5,379,866 | A | 1/1995 | Pearce et al. | |
| 5,492,355 | A * | 2/1996 | Berry | 280/304.1 |
| 5,573,266 | A | 11/1996 | Zalewski et al. | |
| 5,765,665 | A | 6/1998 | Cheng et al. | |
| 5,799,756 | A * | 9/1998 | Roberts et al. | 188/2 F |
| 5,984,334 | A | 11/1999 | Dugas | |
| 6,022,042 | A | 2/2000 | Hartenstine | |
| 6,264,007 | B1 | 7/2001 | Norton et al. | |
| 6,315,306 | B1 * | 11/2001 | Fernie et al. | 280/33.991 |
| 6,341,671 | B1 | 1/2002 | Ebersole | |
| 6,341,672 | B1 * | 1/2002 | Yang et al. | 188/20 |
| 6,352,138 | B1 | 3/2002 | Duran et al. | |
| 6,598,712 | B1 | 7/2003 | Sun | |
| 6,644,443 | B1 * | 11/2003 | Jager | 188/2 F |
| 7,059,452 | B2 * | 6/2006 | Chen | 188/20 |
| 7,175,004 | B2 | 2/2007 | Kassai et al. | |
| 7,537,093 | B2 | 5/2009 | Chen | |
| 7,571,966 | B2 * | 8/2009 | Chen et al. | 301/111.01 |
| 7,708,119 | B2 | 5/2010 | Chen | |
| 7,971,893 | B1 | 7/2011 | Dunn | |
| 8,424,654 | B2 * | 4/2013 | Landry et al. | 188/2 F |
| 8,490,757 | B2 * | 7/2013 | Chen et al. | 188/20 |
| 8,622,178 | B2 * | 1/2014 | Jowers et al. | 188/2 F |
| 8,684,395 | B2 * | 4/2014 | Winterhalter et al. | 280/647 |
| 2002/0024196 | A1 | 2/2002 | Malassigne et al. | |
| 2003/0015853 | A1 * | 1/2003 | Hanson et al. | 280/250.1 |
| 2004/0099487 | A1 | 5/2004 | Melgarejo | |
| 2004/0178025 | A1 | 9/2004 | Zweideck | |
| 2005/0257966 | A1 | 11/2005 | Mulhern et al. | |
| 2006/0137942 | A1 * | 6/2006 | Counts | 188/2 F |
| 2006/0151259 | A1 | 7/2006 | Tomasi et al. | |
| 2007/0045055 | A1 * | 3/2007 | Lan | 188/20 |
| 2007/0089958 | A1 * | 4/2007 | Kanehisa | 192/64 |
| 2008/0078630 | A1 * | 4/2008 | Yeh | 188/20 |
| 2009/0085317 | A1 | 4/2009 | Livengood et al. | |
| 2009/0140570 | A1 * | 6/2009 | Houkal | 301/1 |
| 2010/0007114 | A1 * | 1/2010 | Papi et al. | 280/304.1 |
| 2011/0278912 | A1 * | 11/2011 | Schlanger | 301/124.2 |
| 2013/0180805 | A1 * | 7/2013 | Cheng | 188/20 |

OTHER PUBLICATIONS

Axi Transport Chair brochure, downloaded from www.axi2go.com on Oct. 22, 2012.

Owner's Manual and Maintenance Instructions for staxi Max Bariatric Chair, downloaded from www.staxi.com on Oct. 22, 2012.

Owner's Manual and Maintenance Instructions for staxi Medical Chair, downloaded from www.staxi.com on Oct. 22, 2012.

PCT International Search Report dated Mar. 29, 2013 for PCT/US2012/066608.

PCT International Written Opinion dated Mar. 29, 2013 for PCT/US2012/066608.

PCT/US2012/066608, an international counterpart to U.S. Appl. No. 13/686,085.

* cited by examiner

BRAKES FOR MOBILE MEDICAL DEVICE

CROSS-REFERENCE TO RELATED APPLICATIONS

This application claims priority to U.S. provisional patent application Ser. No. 61/563,823 filed Nov. 27, 2011 by applicant Anish Paul and entitled TRANSPORT CHAIR, and to U.S. provisional patent application Ser. No. 61/701,555 filed Sep. 14, 2012 by applicants Anish Paul et al. and also entitled TRANSPORT CHAIR, the complete disclosures of both of which are incorporated herein by reference.

BACKGROUND OF THE INVENTION

The present invention relates to wheeled chairs that are suitable for transporting patients or other individuals.

Wheelchairs and transport chairs are known. Such chairs may be used when an individual is not able to walk easily on his or her own, or they may be used when an individual is able to walk on his or her own, but it is desirable to move that person via a wheeled chair so that he or she does not have to walk. Such prior art wheelchairs and transport chairs have often suffered from one or more disadvantages that make one or more aspects of the chairs difficult to use, or that have other undesirable characteristics.

SUMMARY OF THE INVENTION

The various aspects of the present invention provide improved ease of use for one or more aspects of wheeled chairs, whether the chairs are wheelchairs or transport chairs. Such aspects may include the brake, the armrests, the footrests, the storage of the chairs, and the attachments of objects to the transport chair, such as oxygen bottles and/or charts, as well as other aspects. In sum, some aspects make the chair easier to get into and out of; other aspects make it easier to store; other aspects make it easier to use the footrests; still other aspects make it easier to accommodate patients of different size; and other aspects make it easier to carry a chart and/or an oxygen bottle on the transport chair. In other embodiments, any one or more of these various aspects may be combined in any manner with any one or more of the other aspects.

According to one embodiment, a chair is provided for transporting patients. The chair includes a frame, a seat supported on the frame, a back rest supported on the frame, a plurality of wheels, a brake pedal, and a release pedal. The brake pedal is adapted to brake a set of the wheels. The release pedal is adapted to unbrake the set of wheels. The brake and release pedals are interconnected such that pressing the brake pedal releases the release pedal, while pressing the release pedal releases the brake pedal.

According to another embodiment, a brake system is provided for a medical device. The system includes a plurality of wheels that allow the medical device to roll, a toothed wheel, first and second pins, and a control. The toothed wheel is rotatably coupled to one or more of the plurality of wheels whereby it rotates in unison with one or more of the plurality of wheels. The first pin is selectively positionable between teeth on the toothed wheel and the first pin prevents the one or more wheels from rotating when positioned between teeth on the toothed wheel. The second pin is also selectively positionable between teeth on the toothed wheel, and the second pin prevents the one or more wheels from rotating when positioned between teeth on the toothed wheel. A control is included for selectively urging the first and second pints toward and away from the toothed wheel.

According to still another embodiment, a brake system for a medical device is provided that includes a plurality of wheels, a toothed wheel, a pin, a biasing member, and a control. The toothed wheel is coupled to one or more of the plurality of wheels so as to rotate in unison therewith. The pin is selectively positionable between teeth on the toothed wheel, and the pin prevents the one or more wheels from rotating when the pin is positioned between teeth on the toothed wheel. The biasing member is adapted to urge the pin between teeth on the toothed wheel. The control is adapted to activate and deactivate the brake system. The control overcomes the urging of the biasing member when the brake system is deactivated, and does not resist the urging of the biasing member when the brake system is activated.

According other aspects, the brake pedal and the release pedal are positioned side-by-side at a location behind the chair's back rest. The brake and release pedals pivot about a common pivot axis when either pedal is pressed. The chair includes a pair of handles attached to the frame that allow a caregiver to push the chair. The chair may further include a pair of rear wheels wherein the brake and release pedals are positioned between the pair of rear wheels.

The chair may also include first and second toothed wheels, as well as first and second pins that are selectively positionable between the first and second toothed wheels, respectively. First and second biasing members may also be included that are adapted to urge the first and second pins between teeth on the first and second toothed wheels, respectively, when the brake pedal is pressed.

The one or more wheels that are selectively braked and unbraked may be coupled to one or more rear legs of the frame. Further, the pin, toothed wheel, and biasing members may be enclosed within the rear leg, while the wheel which is braked and unbraked is positioned outside of the rear leg. A wheelie may also be coupled to the lower end of the rear leg. The toothed wheel may be clamped with one or more fasteners to an axle at a location that is axially spaced from the wheel which is braked and unbraked. The wheel(s) which are braked or unbraked may be attached to the axle via a keyed surface and threads defined on the axle, to thereby tightly coupled the wheel to the axle and reduce, if not eliminate, any mechanical slop between the two.

When two or more pins are included for selective engagement with a toothed wheel, they may be offset from each other relative to the teeth such that, when one of the pins is able to be inserted between teeth on the toothed wheel, the other of the pins will be at least partially blocked by a tooth from being positioned between teeth on the toothed wheel.

The medical device to which the brake systems may be applied include, but are not limited to, beds, stretchers, cots, and wheeled chairs.

The brake system may include one or more biasing members—such as, but not limited to, springs—that store more potential energy when the brake is disengaged and less potential energy when the brake is engaged. A portion of the potential energy stored in the spring when the brake is disengaged is used during the engagement of the brake to move the one or more pins to positions between teeth on the toothed wheel. The energy needed to move the one or more pins to positions between the teeth may come entirely from the spring, or other biasing member, so that a caregiver does not need to manually force the pin between teeth.

Before the many embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE EMBODIMENTS

Figure 1:
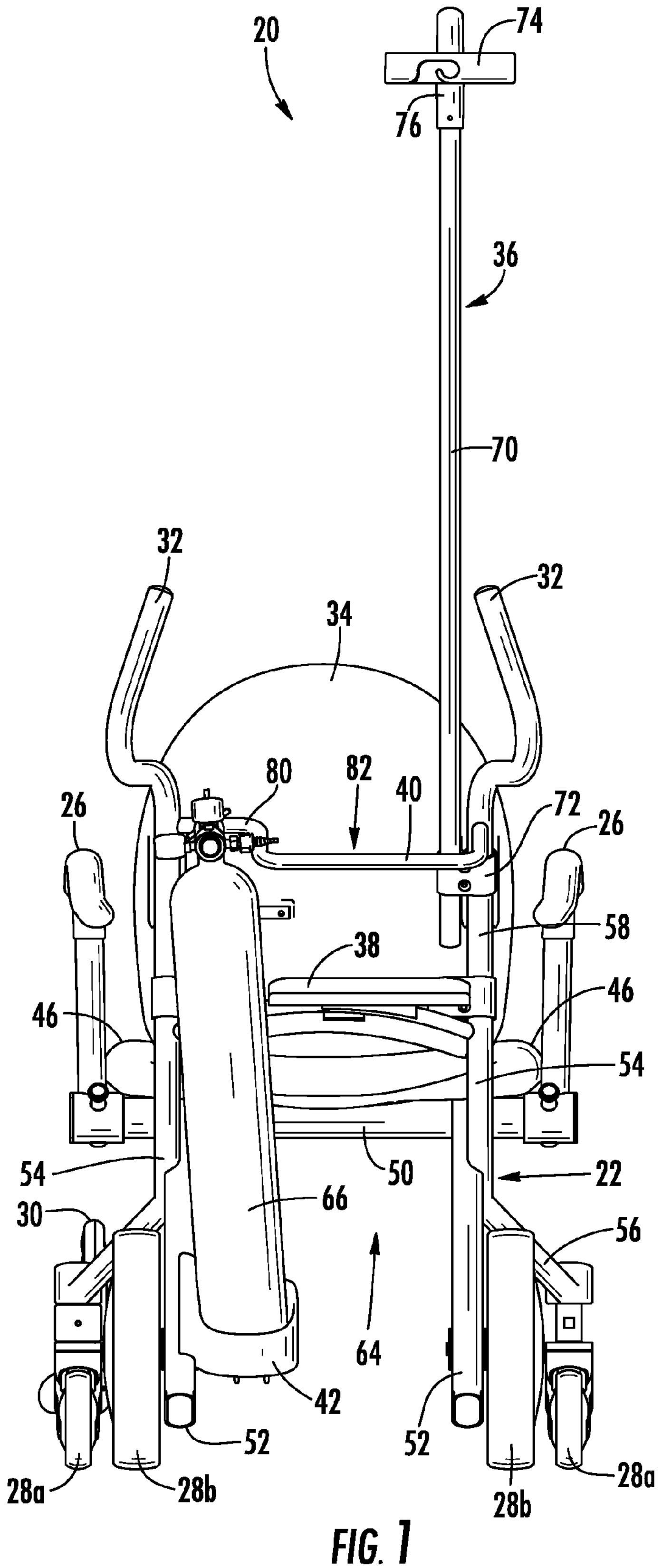
FIG. 1 is a rear elevational view of a wheeled transport chair according to a first embodiment.
Figure 2:
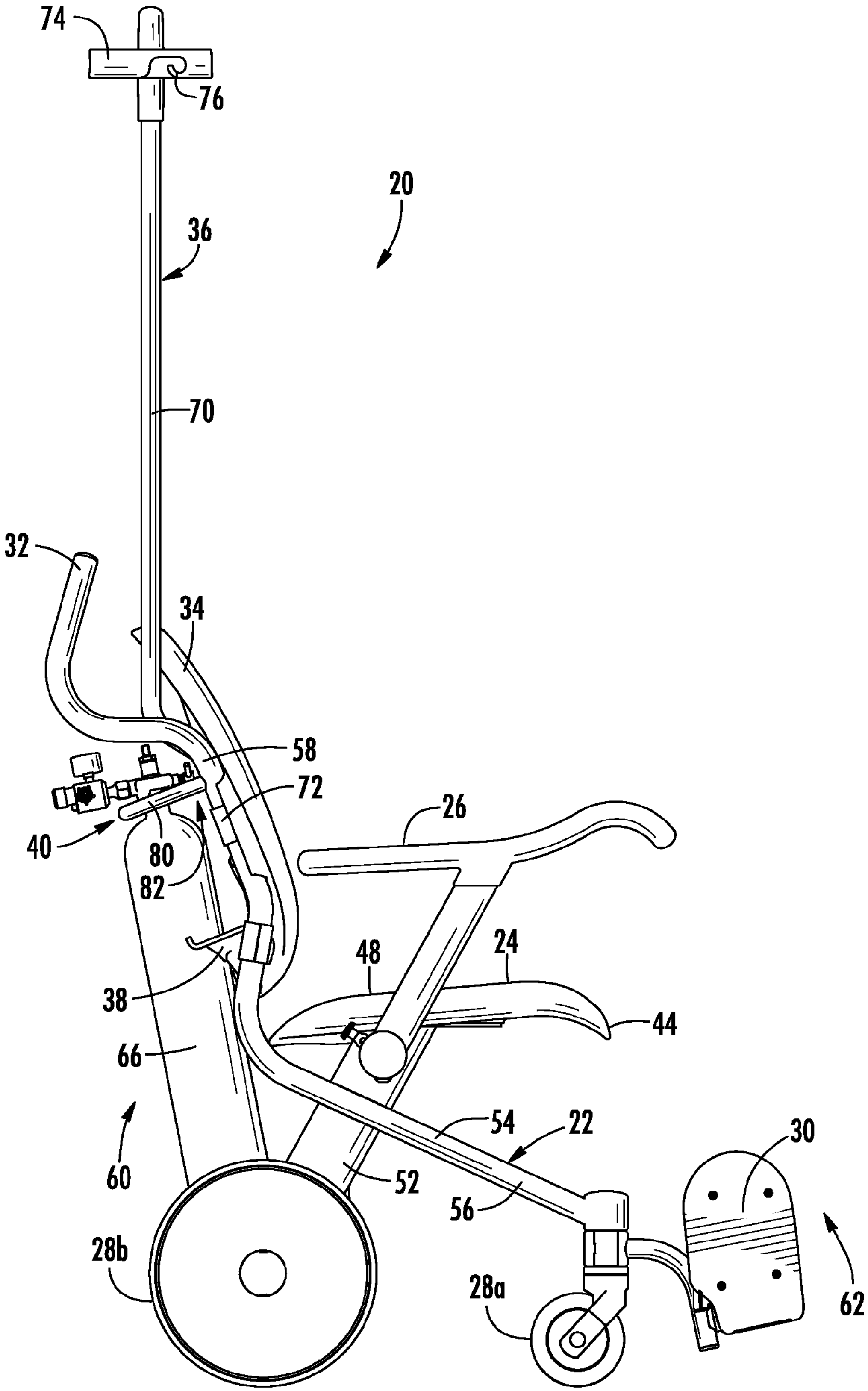
FIG. 2 is a side, elevational view of the wheeled transport chair of FIG. 1.
Figure 3:
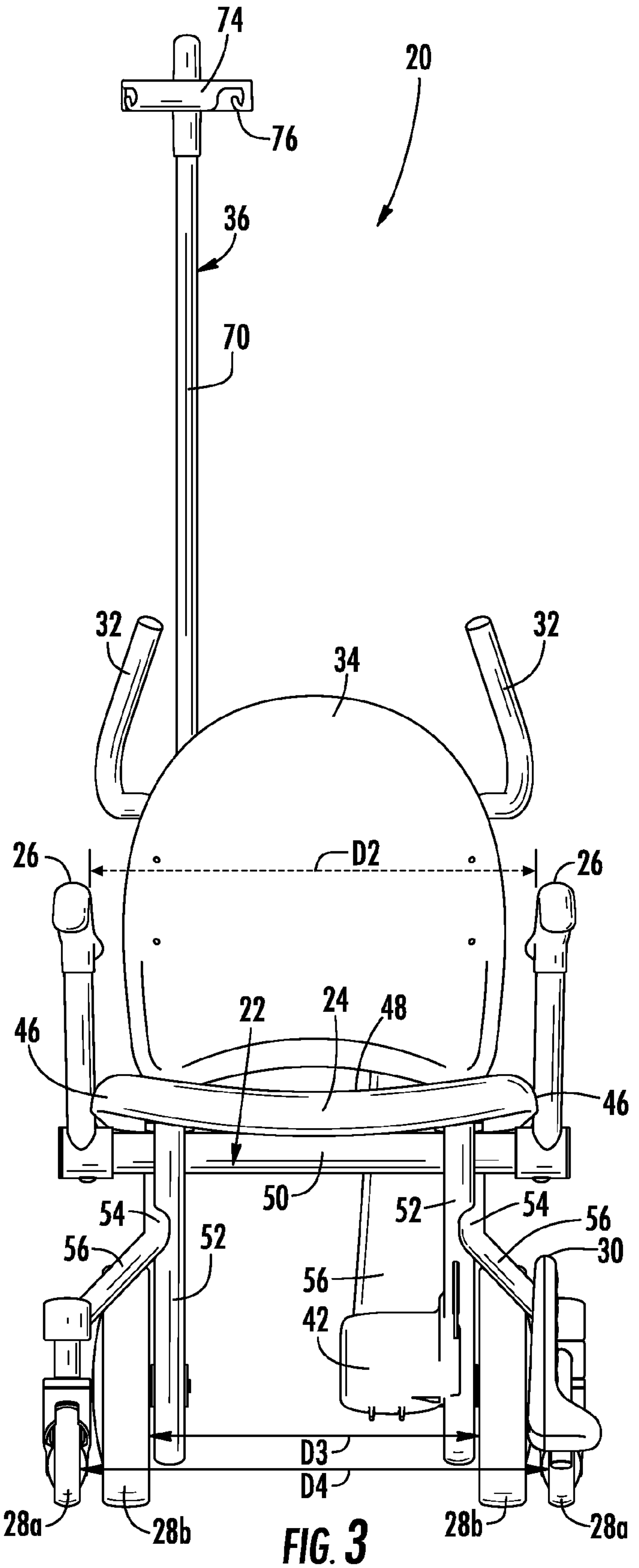
FIG. 3 is a front, elevational view of the wheeled transport chair of FIG. 1.
Figure 4:
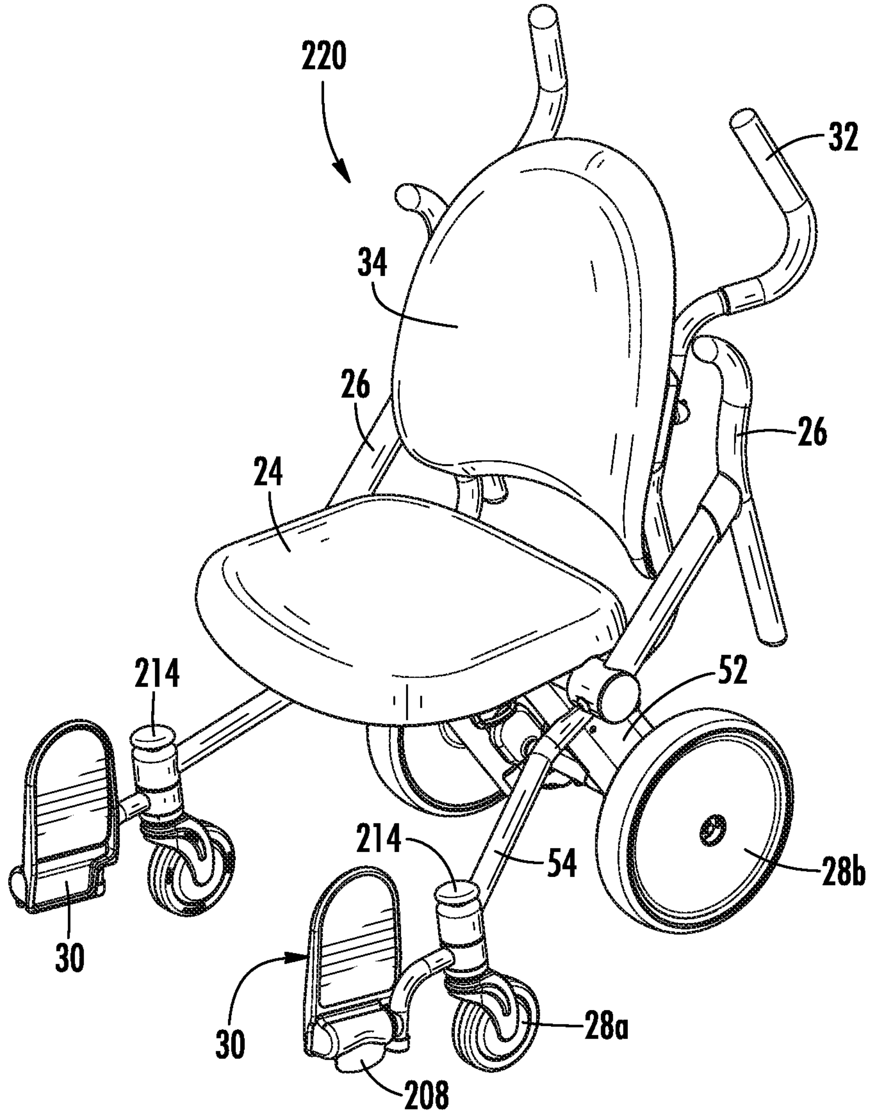
FIG. 4 is a perspective view of a wheeled transport chair according to a second embodiment.
Figure 5:
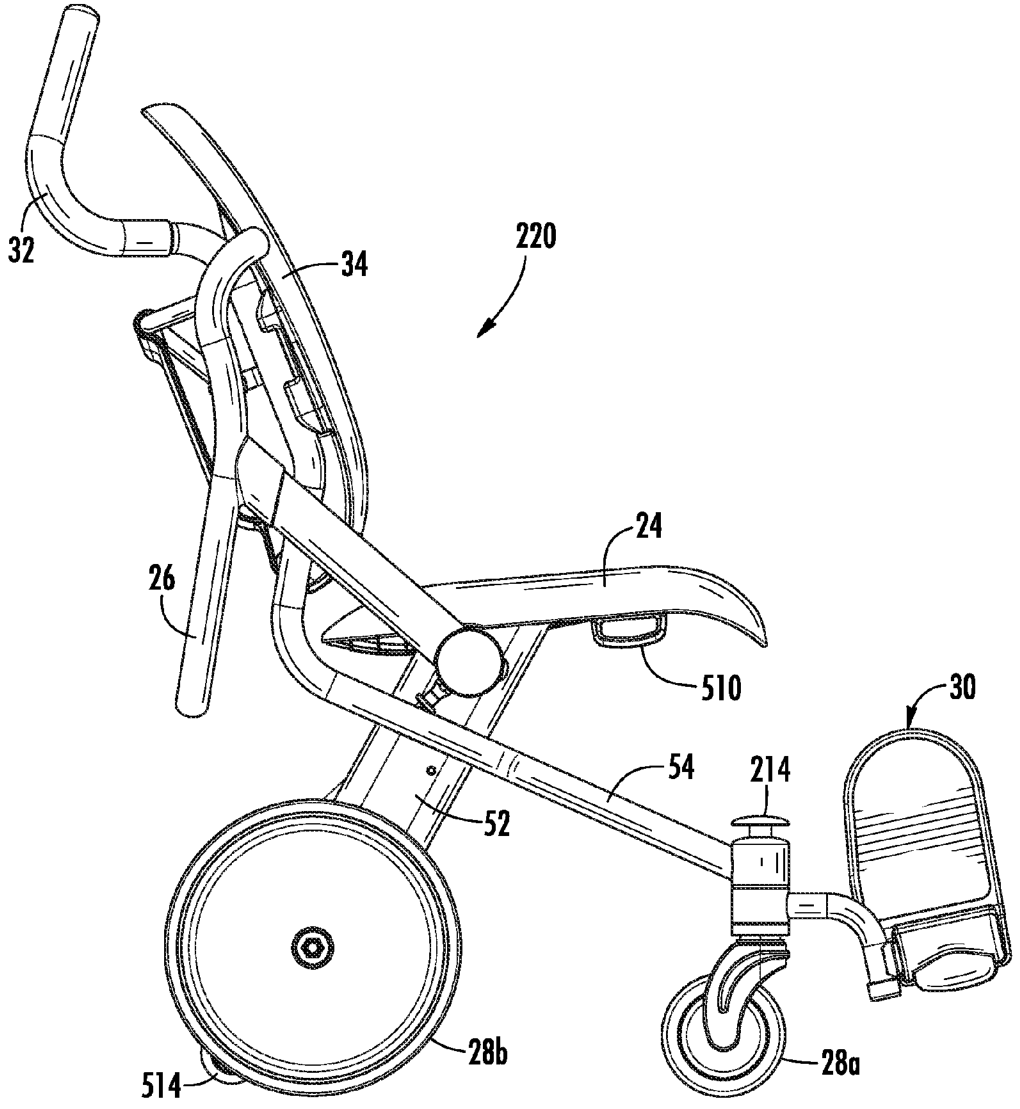
FIG. 5 is a side, elevational view of the transport chair of FIG. 4.
Figure 6:
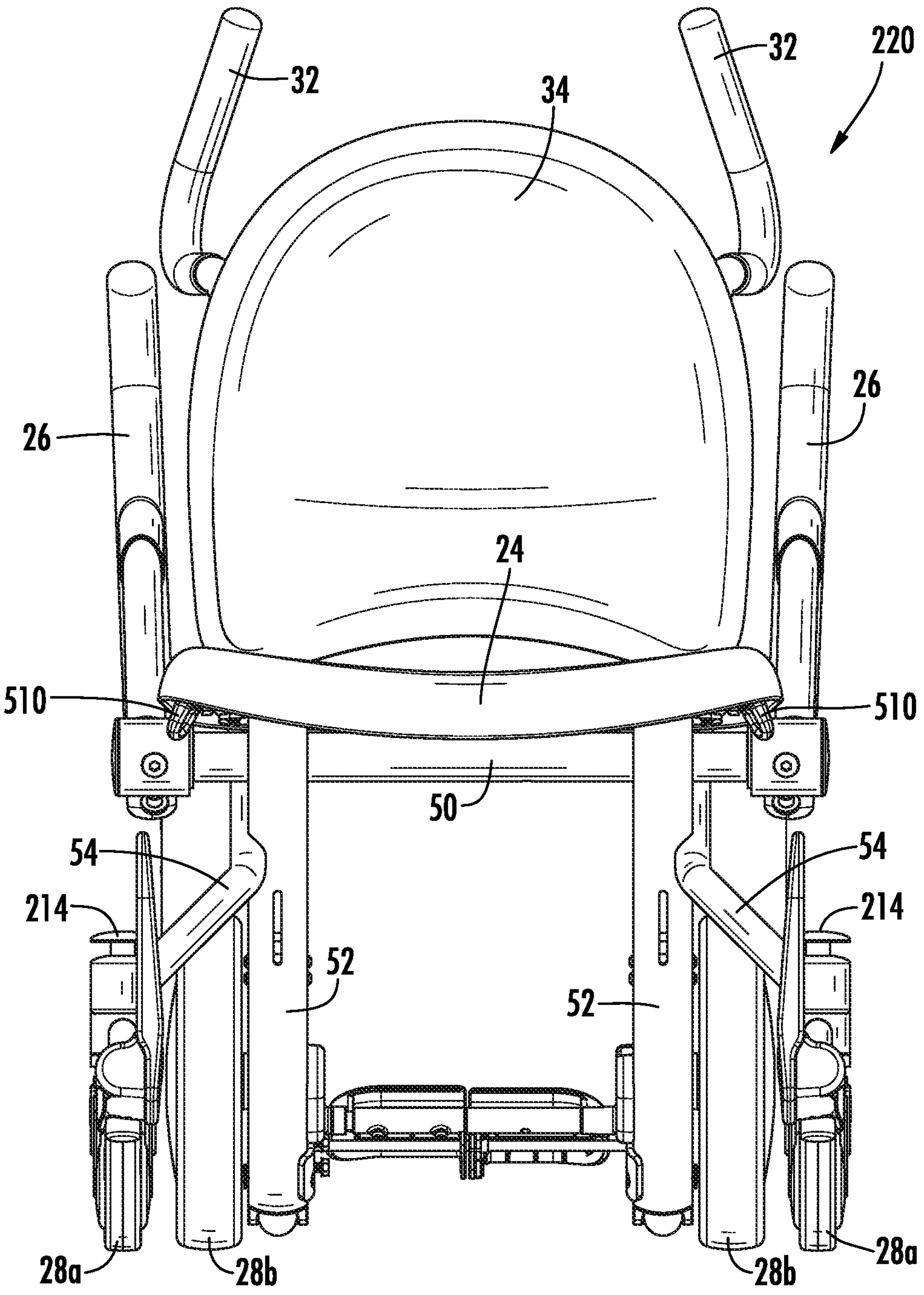
FIG. 6 is a front, elevational view of the transport chair of FIG. 4.
Figure 7:
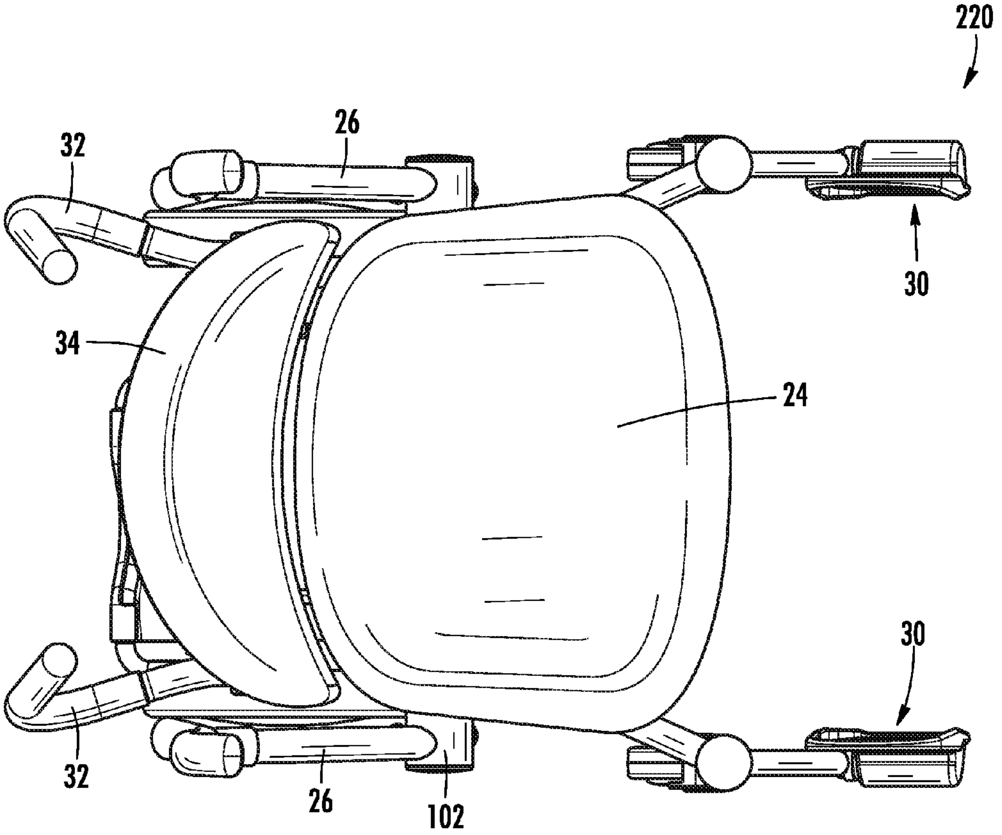
FIG. 7 is a plan view of the transport chair of FIG. 4.

A transport chair 20 according to a first embodiment of the invention is depicted in FIGS. 1-3. Transport chair 20 is adapted to allow a patient to be transported to different locations within a healthcare facility, such as, but not limited to a hospital, nursing home, doctor's office, or similar location. A number of different embodiments of transport chair 20 are described below and in the accompanying drawings. It will be understood that further variations of the embodiments described herein and shown in the accompanying drawings may be made without departing from the principles disclosed herein. It will also be understood that the wheeled transport chairs described herein include multiple innovative aspects and features, and that any one or more of these aspects and/or features may be combined together with any one or more of the other aspects or features, or that any one of these aspects or features may be used alone. For example, the following description includes a discussion of a variety of different features, including armrests, footrests, brakes, an oxygen bottle holder, an IV pole, a chart holder, a calf rest, and other features. Any one of these features may be incorporated into a transport chair by itself. Alternatively, multiple of these features may be incorporated into a single transport chair in any desirable combination. Still further, several of these features may be used in other applications besides transport chairs, including, for example, the IV pole and IV pole topper, the oxygen bottle holder, and the brakes. Such other applications include, but are not limited to, wheeled medical devices, or other types of medical devices.

Although much of the description herein uses the term "transport chair" to refer to chair 20, as well as its various embodiments, it will be understood that the various embodiments and inventions described herein are equally applicable to wheelchairs, in addition to transport chairs. The term "wheeled chair" will be used herein as a generic term that encompasses both wheelchairs and transport chairs. In general, wheelchairs differ from transport chairs in that wheelchairs include rear wheels that are large enough for a patient to grasp and use to move herself or himself, while transport chairs tend to have smaller wheels that generally preclude a patient from propelling herself or himself in the chair, but instead require a caregiver to push or pull the patient while seated in the chair.

The transport chair 20 depicted in FIGS. 1-3 includes a frame 22, a seat 24 supported thereon, a pair of armrests 26, a plurality of wheels 28 (that include front wheels 28*a* and rear wheels 28*b*), at least one footrest 30, a pair of handles 32, a back rest 34, and an IV pole 36. Transport chair 20 further includes a chart holder bottom portion 38, a chart holder top portion 40, and an oxygen holder bottom portion 42. While not shown in the embodiment depicted in FIGS. 1-3, but described elsewhere (e.g. in, and with reference to, FIGS. 4-10 and 31-44), transport chair 20 may also include a brake pedal, a stop pedal, an additional footrest, and an oxygen bottle holder. Still other features may also be added to transport chair 20.

Seat 24 provides a top surface 48 on which a patient may sit while being transported on transport chair 20. Seat 24 includes a front edge 44 (FIG. 2) and a pair of side edges 46*a* and 46*b* (FIG. 3). Seat 24 may be cushioned, or it may be substantially rigid, or it may provide a support for a separate cushion (not shown) to be placed on top of top surface 48. Seat 24 is supported above a cross bar 50 of frame 22. Cross bar 50 extends laterally between a pair of rear legs 52 of frame 22. As will be discussed in greater detail below, cross bar 50 generally defines a horizontal pivot axis about which armrests 26 may pivot.

Each rear leg 52 is fastened to a corresponding forward leg 54 that extends forwardly underneath seat 24. When viewed from either side, rear legs 52 and forward legs 54 cross each other in an X-fashion. That is, rear legs 52 extend upwardly and forwardly from rear wheels 28*b* to positions underneath seat 24 where rear legs 52 provide support for the seat 24, while forward legs 54 extend downwardly and forwardly from behind seat 24 to termini adjacent the front end 62 of chair 20. The crisscrossing arrangement of rear and forward legs 52 and 54 generally defines an X-shape. At each of the termini of forward legs 54, front wheels 28*a* and footrests 30 are attached and supported. At each of the upper ends of rear legs 52, a seat bracket 68 is attached to which seat 24 is coupled (see FIGS. 8 and 67).

Forward legs 54 include a lower portion 56 and an upper portion 58. Back rest 34 is attached to the upper portion 58 of forward legs 54. Back rest 34 provides a surface against which a patient may rest his or her back while seated on transport chair 20. Back rest 34 may itself be cushioned, or it may be rigid, or it may provide support for a separate cushion that is attached thereto (not shown).

In the embodiment shown in FIGS. 1-3, forward legs 54 of frame 22 terminate at their upper ends as handles 32. Handles 32 provide a structure which a caregiver can grip in order to push and steer transport chair 20. It will be understood that handles 32 could alternatively be separate structures from legs 54 that are attached to legs 54, or that are attached to any other suitable structure in transport chair 20, in any suitable fashion. In one embodiment, handles 32 include a gripping material added thereto that resists sliding contact between a person's hand and the gripping material so that a caregiver's hands are less likely to slip when pushing or pulling transport chair 20 via handles 32. In another embodiment, handles 32 do not have any material added.

As shown in FIG. 3, lower portions 56 of forward legs 54 are angled outwardly from each other as they extend from a rear end 60 to a front end 62 of transport chair 20. As will be described in greater detail below, this angling of lower portions 56 creates a greater space D4 between front wheels 28*a* than the lateral spacing D3 between rear wheels 28*b* (FIG. 3). This greater spacing provides a greater space for a patient to stand in front of chair 20, as well as providing space for transport chair 20 to nest with another similar transport chair 20 when the two chairs 20 are being stored. This greater space in the front of transport chair 20 enables a patient to stand, turn, and move around while positioned in front of chair 20 with less likelihood of bumping into footrests 30, and with a greater range of available movement, thereby facilitating the entry into, and exiting from, transport chair 20. Further, the nesting ability of chair 20 reduces the space occupied by multiple chairs 20 when they are not in use. Such nesting is shown in FIGS. 62-65 for an alternative embodiment of the transport chair, as will be discussed in greater detail below.

Chair 20 in FIGS. 1-3 is shown holding an oxygen bottle 66 that may be necessary for a person being transported in chair 20. If the patient being transported is not in need of oxygen, then bottle 66 may be removed from transport chair 20. When chair 20 is used to transport a bottle 66, it may attach to an oxygen bottle holder that includes the bottom portion 42 that holds the bottom of the oxygen bottle 66 and a top portion (not shown in FIGS. 1-3) that secures a top region of the bottle 66. The bottom portion may be positioned close to the floor and have a relatively shallow depth so that a caregiver does not have to lift the bottle 66 (which can be heavy) as much as with prior oxygen bottle holders in order to place the bottle 66 in the bottom portion 42 of the holder. The top portion may take on a variety of different configurations, as will be discussed more below. Both the top and bottom portions are discussed in greater detail below.

IV pole 36 includes a generally vertical rod 70 that is attached at its lower end to the upper portion 58 of one of the forward legs 54 via an IV pole bracket 72 (FIG. 1). The upper end of IV pole 36 includes a IV pole topper 74 that defines a plurality of hooks 76 on which IV bags, or other medical equipment, may be hung (see also FIGS. 46-47). IV pole topper 74 is generally circularly shaped (when viewed from above or below) and each hook 76 is arcuately shaped so as to define the periphery of the circular shape of IV pole topper 74. Rather than extending radially outward from the generally vertical axis defined by rod 70—as many prior art IV hooks have done—each hook 76 extends circularly around the periphery of topper 74. This configuration leads to no outward extending hooks 76 that can be inadvertently bumped against by a caregiver or other person standing next to transport chair 20. Because the height of topper 74 is often at or near a common height of people's heads (when standing), any outwardly projecting hooks—such as in the prior art—can create potentially painful projections when bumped against a person's head. In contrast, the hooks 76 of the IV pole 36 shown in FIGS. 1-3 do not extend outwardly, and therefore do not create any projections which can be bumped against from an angle that is directly aligned with the angle of the projection. Instead, any bumps against hooks 76 will be sideways and/or glancing, thereby minimizing the impact of such bumps. Topper 74 and hooks 76 therefore help to mitigate the seriousness of any injury that might otherwise arise from a person bumping their head, or other body part, against hooks 76.

Figure 47:
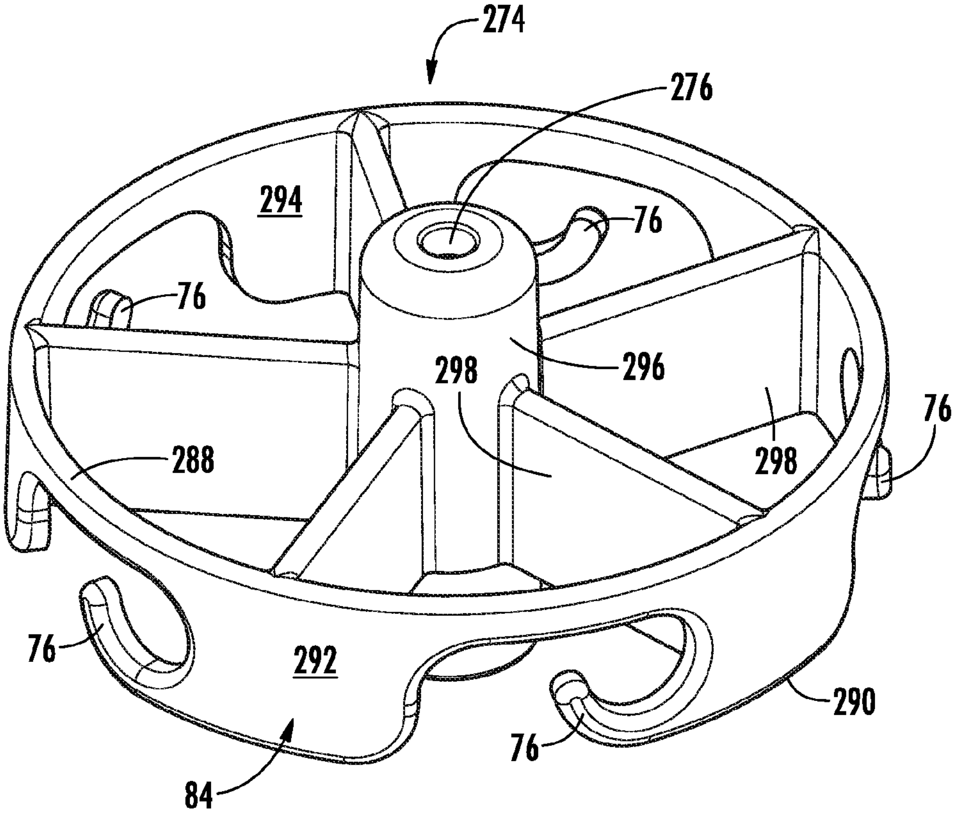
FIG. 47 is a perspective view of a second embodiment of an IV pole topper.

While FIGS. 1-3 illustrate an IV pole topper 74 having three arcuately shaped hooks 76, the construction of IV pole topper 74 may be modified. For example, FIG. 47 shows one alternative embodiment of an IV pole topper 274 that may be attached to transport chair 20, or to any of the other transport chair embodiments discussed herein. IV pole topper 274 includes five arcuate hooks. Still other numbers of hooks 76 may be included in IV pole topper 274. Further, the shape of IV pole toppers 74 and/or 274 may be changed from that shown to any other shapes that reduce the likelihood of any hooks 76 pointing directly toward a person who might make inadvertent contact with the hooks. For example, hooks 76 could point radially inward toward the center of IV pole topper 74 or 274. Other constructions are also possible.

As noted above, transport 20 may also include a chart holder for carrying one or more patient's medical charts, or for carrying a binder, or for carrying papers, or any combination of these items. The configuration of the chart holder may vary, as will be described in greater detail below. In the embodiment shown in FIGS. 1-3, the chart holder includes a bottom portion 38 on which the chart and/or papers may rest. The top portion 40 prevents the charts and/or papers from tipping out of the bottom portion. The top portion is defined by a bent bar 80 that extends between upper portions 58 of forward legs 54 behind back rest 34. Bent bar 80 is bent in such a way so as to define an opening 82 (FIG. 1) between bar 80 and the back of back rest 34. A chart, binder, or set of papers may be inserted into opening 82 until the bottom of the chart, binder, or papers rests against bottom portion 38 of the chart holder. The vertical distance between the bottom portion 38 and the top portion 40 of the chart holder is dimensioned such that it is smaller than the height and/or width of conventional papers. Thus, when the chart, binder, or papers rest on bottom portion 38, the top end of the chart, binder, or papers will extend higher than bent bar 80. Bent bar 80 will thus prevent the chart, binder, or papers from tipping off of bottom portion 38. In some embodiments, a clip or other fastening structure may be included that grips the chart, binder, or papers. Such a clip may be particularly useful for flexible items that could potentially bend or fold out of the opening 82 while still seated on bottom portion 38, such as individual sheets of papers, or small quantities of paper, or other flexible items.

A transport chair 220 according to another embodiment of the invention is shown in FIGS. 4-10. Those components of transport chair 220 that are the same as those of transport chair 20 are labeled with the same reference numbers, and the description of those components applies equally to transport chair 220. Those components of transport chair 220 that are similar to, but include modifications, to corresponding components on transport chair 20 will be referenced by the same reference number raised by 200. Those components of transport chair 220 that do not have an analogue in transport chair 20 will bear a new reference number. It will further be understood that transport chair 220 may be modified to exclude any of its components that are lacking from chair 20, and/or it may be modified to include any of the components of chair 20 that it is shown to lack in FIGS. 4-10.

Transport chair 220 is similar to transport chair 20 but, as shown, does not include any chart holder components, an oxygen bottle holder, nor an IV pole. Transport chair 220 further includes a pair of buttons 214 that are not present in transport chair 20, as well as a set of wheelies 78 positioned at a bottom end of rear legs 52 of frame 22, as well as other differences. Buttons 214 may be pushed vertically downward to automatically cause the immediately adjacent footrest 30 to pivot from a use position in front of seat 24 (shown in FIGS. 4-8) to a stowed position along the sides 46 of chair 220 (shown in FIG. 9). The construction and function of buttons 214, as well as the pivoting mechanism controlled by buttons 214 will be described in greater detail below. Wheelie set 78 helps facilitate a caregiver lifting the front end of transport chair 220 when moving chair 220 over an obstacle, such as a curb, or other obstruction. Wheelie set 78 also helps prevent over-tipping of chair 220 backwards, thereby helping to prevent an accidental backward tipping of chair 220 completely over, as will be discussed more below, particularly with respect to FIGS. 66 and 67.

Transport chair 220, like transport chair 20, includes a pair of front wheels 28*a* that are spaced apart a lateral distance D4 that is less than the lateral distance D3 between rear wheels 28*b*. This creates a more open space in front of seat 24 so that a patient may enter and exit chair 220 more easily.

The detailed construction of various of the components of transport chairs 20 and 220, as well as other embodiments of the transport chairs, will be described in more detail below. These components include the armrests, the foot rests, the oxygen bottle holder, the brakes, a calf rest, and the IV pole and IV pole topper, as well as other components. As was noted previously, these various components may be combined together in a single transport chair in any suitable fashion, or they may be used individually by themselves within a transport chair.

Armrests

Figure 11:
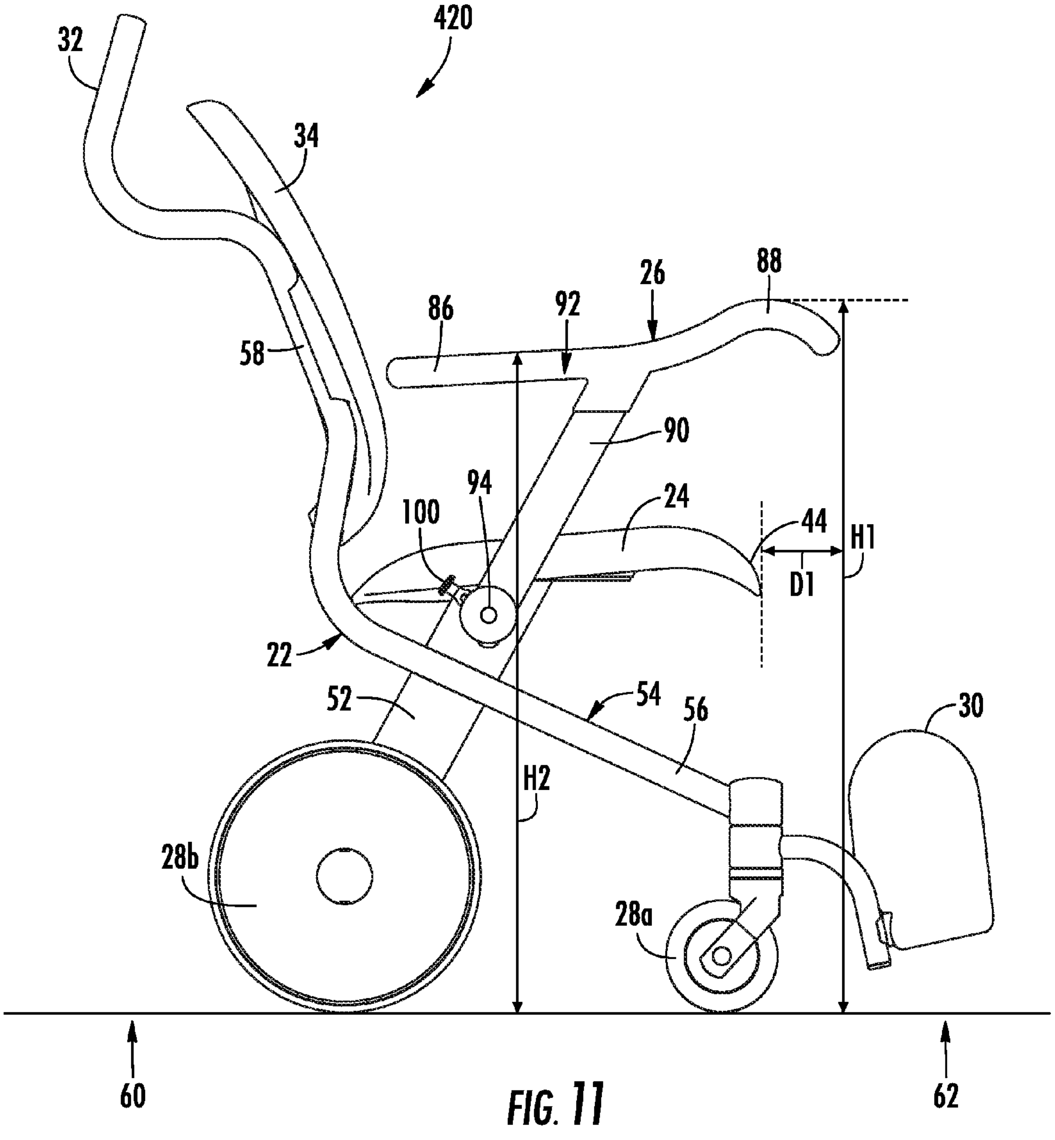
FIG. 11 is a side, elevational view of a third embodiment of a wheeled transport chair showing an armrest in a use position.
Figure 12:
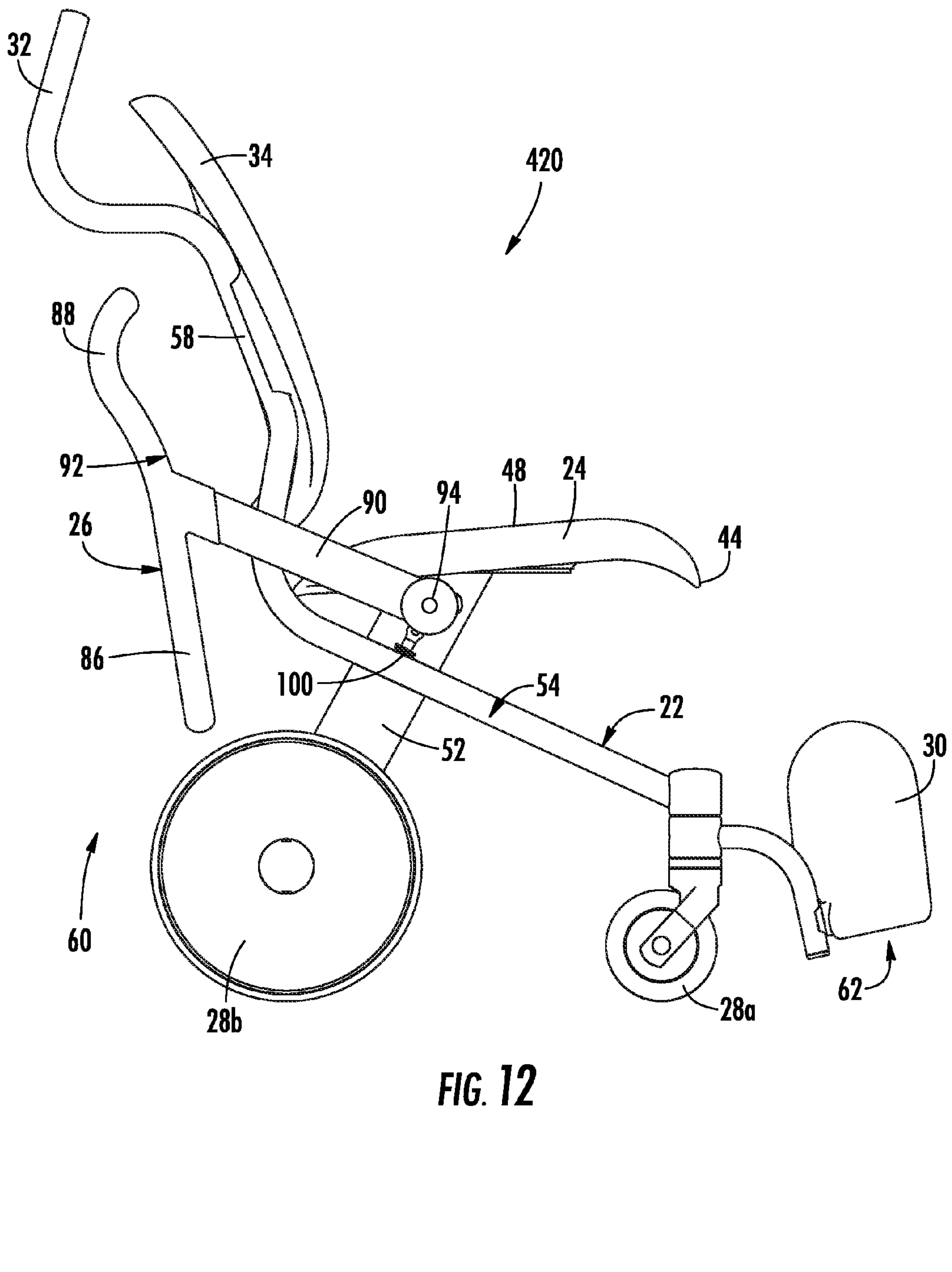
FIG. 12 is a side, elevational view of the transport chair of FIG. 11 shown with the armrest in a stowed or retracted position.
Figure 13:
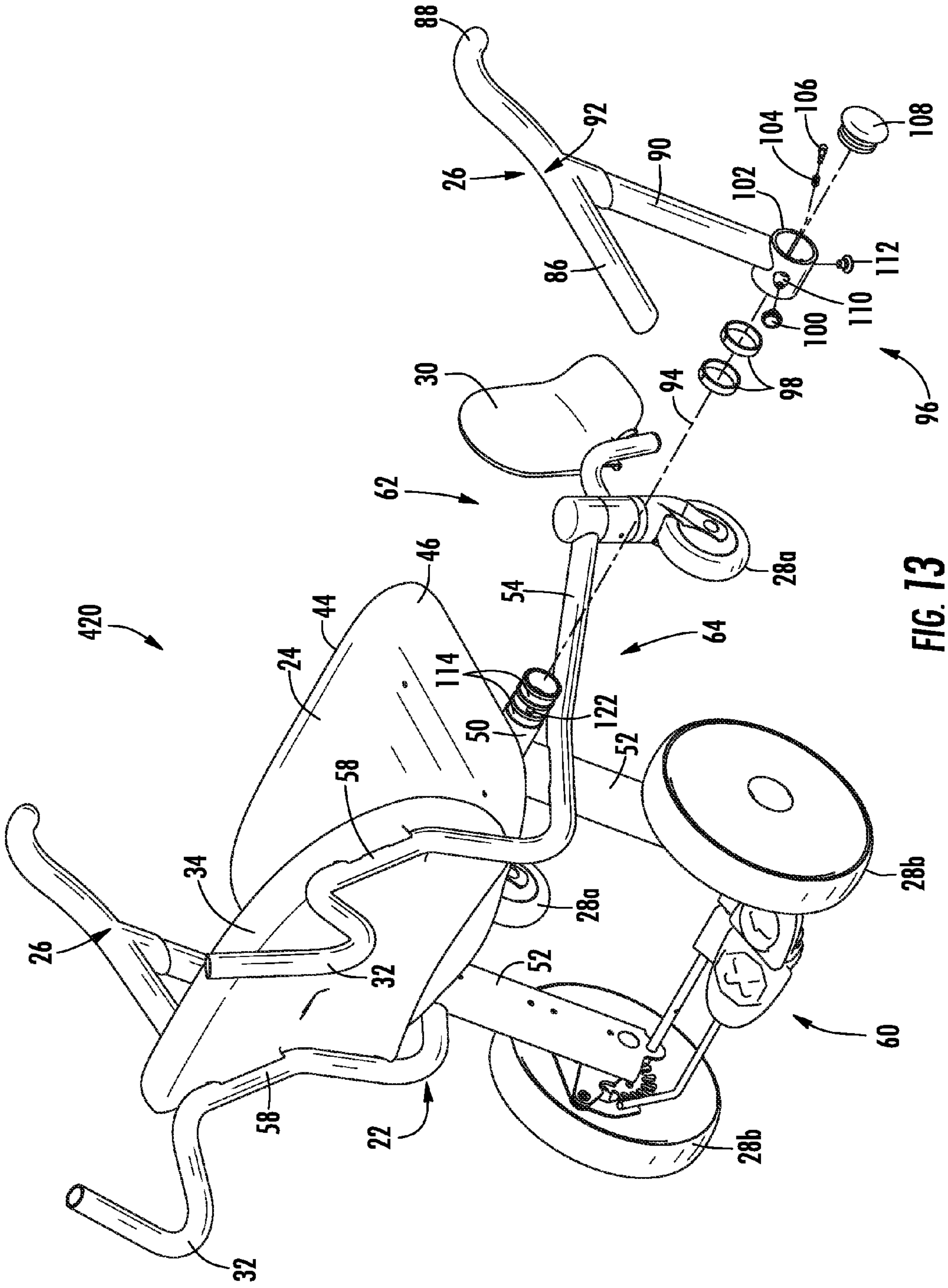
FIG. 13 is an exploded perspective view of the armrest pivoting mechanism of the chair of FIGS. 11 and 12.

FIGS. 11-13 depict a third embodiment of a transport chair 420 that includes many of the same aspects and components as transport chairs 20 and 220. Those components of transport chair 420 that are the same as those of transport chair 20 or 220 are labeled with the same reference numbers, and the description of those components applies equally to transport chair 420. Those components of transport chair 420 that do not have an analogue in transport chair 20 will bear a new reference number. It will further be understood that transport chair 420 may be modified to exclude any of its components that are lacking from chair 20 or chair 220, and/or it may be modified to include any of the components of chair 20 or 220 that it is shown to lack in FIGS. 11-13.

The armrests 26 of chair 420 may be incorporated into any of the chair embodiments described herein, including transport chairs 20 and 220, as well as any of the transport chairs subsequently described herein. Armrests 26 each include a support bar 90 and an arm bar 92. Arm bar 92 provides the structure that a patient may rest his or her arms on while seated in seat 24. Arm bar 92 also provides a structure that a patient may grasp when entering or exiting seat 24. Support bar 90 connects arm bar 92 to frame 22. Arm bar 92 includes a rear portion 86 and a forward portion 88. As shown in FIG. 11, the height (H1) of forward portion 88 is higher than the height (H2) of rear portion 86. The higher height (H1) of forward portion 88 provides more accessible support to a patient who is either entering or exiting chair 420. That is, a patient who is standing, or nearly standing, is more easily able to reach the forward portions 88 of armrests 26 while they are standing, or nearly standing. This makes it easier for a patient to hold onto forward portions 88 while the patient is exiting or entering chair 420, or about to exit or enter chair 420. While the specific height (H1) of forward portion 88 may vary, it may generally be chosen to be close the median height above ground (for a given population) of a person's index finger (or middle finger) when that person is standing and has his or her arms and hands hanging downward at his or her sides. This median height varies somewhat for different populations, but generally varies little beyond one or two inches. For example, this height varies no more than a few inches when looking at human males within the 95$^{th}$ percentile in height as compared to human females who are with the 5$^{th}$ percentile for height.

By positioning the forward portions 88 of armrests 26 at a height that can typically be touched by the ends of a patient's fingers while he or she is fully standing, the patient is able to feel and make contact with the handles while he or she is still fully upright. This enables the patient to make a tactile determination of the position of chair 420 relative to his or her body while they are fully standing. When going from a standing-to-sitting position, the patient therefore does not typically have to begin to bend prior to determining the location of the chair, thus helping to ensure that the patient (who may not be physically adept at supporting themselves in a bent position) aims and aligns themselves properly with the seat 24 prior to sitting down. The higher height of the front ends of armrests 26 also gives confidence to the patient, and eases his or her transition from merely touching the handles while standing to holding them firmly for support during their downward motion into the chair.

Still further, during exit from chair 420, the higher height of forward portions 88 of armrests 26 enables the patient to continue to hold onto the armrests 26 virtually throughout the entire sitting-to-standing motion. Indeed, the patient can often continue to push downward on the forward portions 88 of the armrests 26 (and thus lift themselves upward) throughout the entire sitting-to-standing motion. This substantially eliminates the need for a terminal portion of the patient's sitting-to-standing transition to take place without providing any structure on the chair for the patient to grasp. This also continues to provide a tactile indication to the patient of the location of the chair relative to their body after they have stood up, helping to ensure the patient doesn't lose his or her balance, and also helping to remind the patient of his or her proximity to the chair. Still further, it can help maintain the patient's balance while he or she is standing in front of the chair 420.

While the height H2 of rear portion 86 is shown in FIG. 11 as being defined with respect to the floor, this has been done primarily for comparison purposes with the height H1 of forward portion 88 of armrests 26. In actual practice, the height H2 may be more beneficially defined with respect to the top surface 48 of seat 24. That is, the height of rear portion 86 may be chosen be positioned above seat 24 at a height that corresponds to, or is near, the median height of a population's elbows when they are seated on seat 24 and their arms are hanging downward at their sides. Thus, a person sitting upright in chair 420 on seat 24 does not need to slouch much, if at all, in order to rest his or her elbows on rear portion 86 of armrests 26. This height provides easy support and comfort for a person's arms while seated in chair 420.

As can also be seen in FIG. 11, forward portion 88 of armrests 26 also may extend forwardly from front edge 44 of seat portion a distance D1. Distance D1 may be equal to several inches, although the precise magnitude of distance D1 can vary. By extending forwardly from front edge 44, a patient is more easily able to grasp armrests 26 while standing in front of chair 420, or while either beginning to transition from the standing-to-sitting position or finishing the transition from the sitting-to-standing position. The patient does not need to reach behind his or her back to grasp the armrests. This makes is easier to not only see the armrests, but also to hold them while standing upright, or nearly upright. Further, the extra length of armrests 26 provides a structure for a patient to support himself or herself while getting close to seat 24. In contrast to prior art transport chairs with armrests that extend only as far as the front edge of the seat (or a shorter distance), the armrests 26 of chair 420 provide a supportive structure for the patient that does not require the patient to hunch over, or angle their arms, to reach armrests 26 while standing. Instead, the patient can support himself or herself on armrests 26 while standing completely upright with his or her arms oriented straight up or down. This makes it easier for the patient to enter or exit chair 420.

As shown in FIGS. 11 and 12, armrests 26 may be pivotable between a use position (FIG. 11) and a stowed position (FIG. 12). This pivoting enables the armrests to be moved out of the way so that a patient may exit or enter seat 24 along either of the sides of seat 24. The pivoting of armrests 26 also enables a patient having a girth nearly equal to, or wider than, the lateral separation of armrests 26 to fit comfortably on seat 24 without being squeezed between armrests 26, or prevented altogether from sitting on seat because of insufficient lateral separation between armrests 26.

The pivoting of armrests 26 takes place about a generally horizontal pivot axis 94 that, in the illustrated embodiment, is aligned with cross bar 50. Pivot axis 94 is located at a height less than the height of seat 24. By being located at a height lower than seat 24, there is substantially no structure that inhibits or obstructs a patient from exiting a side of seat 24 when armrest 26 is pivoted to the stowed position. Thus, as can be seen in FIG. 12, when armrest 26 is pivoted to the stowed position, arm bar 92 is completely behind back rest 34 while support bar 90 is angled such that no portion of it presents any actual obstruction to a patient exiting seat 24 from the side. Thus, when armrest 26 is pivoted to the stowed position, chair 420 is configured—from the patient's stand point—substantially as if no armrest were present. Moving the armrest 26 to the stowed position therefore clears any obstacles that might otherwise impede entering or exiting seat 24 from the side. It also clears any structure that would prevent, or render uncomfortable, a patient with girth greater than the lateral distance between armrests 26 from sitting in seat 24.

Pivot axis 94 is also located at a position that is forward of the generally vertical plane defined by back rest 34, as can be seen in FIGS. 11 and 12. By locating pivot axis 94 forward of the plane generally defined by back rest 34, the lever arm defined between pivot axis 94 and the front end of forward portion 88 is reduced (as compared to a pivot axis that was in line with back rest 34). This reduced lever arm distance means that greater downward forces may be safely applied to forward portion 88 of armrests 26 than would be possible if pivot axis 94 were positioned closer to—or behind—the generally vertical plane defined by back rest 34. This, in turn, makes forward portions 88 more solid and provides a feeling to the patient of greater strength and stability for forward portions 88, thereby giving the patient confidence during entry or exit into seat 24 that he or she may safely use forward portions 88 to fully support himself or herself when exiting or entering seat 24.

Any and all of the transport chair embodiments described herein, including, but not limited to, chairs 20 and 220, as well as the subsequently described chairs, may include the pivotable armrests 26 described above with respect to FIGS. 11 and 12. That is, any of the armrests 26 of the other transport chairs described herein may include armrests 26 that pivot from a pivot axis defined below the seat 24 and forward of back rest 34. Further, the armrests 26 of any of the transport chair embodiments described herein may include the features of a forward portion 88 that is elevated with respect to a rear portion 86 of arm bar 92. The pivoting mechanism that enables armrests 26 to pivot between the use and the stowed positions may take on any suitable form. One illustrative embodiment of a pivoting mechanism is described below with respect to FIGS. 13-15. Another illustrative embodiment of a pivoting mechanism is described with respect to FIGS. 16-20. Still other pivoting mechanisms may be used for any of the transport chairs described herein.

Figure 14:
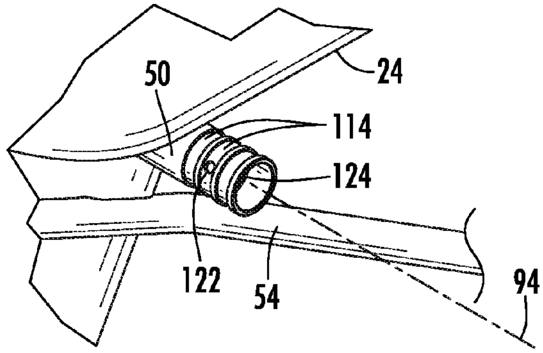
FIG. 14 is a close up, perspective view of the cross bar to which the armrests of FIGS. 11-13 attach.
Figure 15:
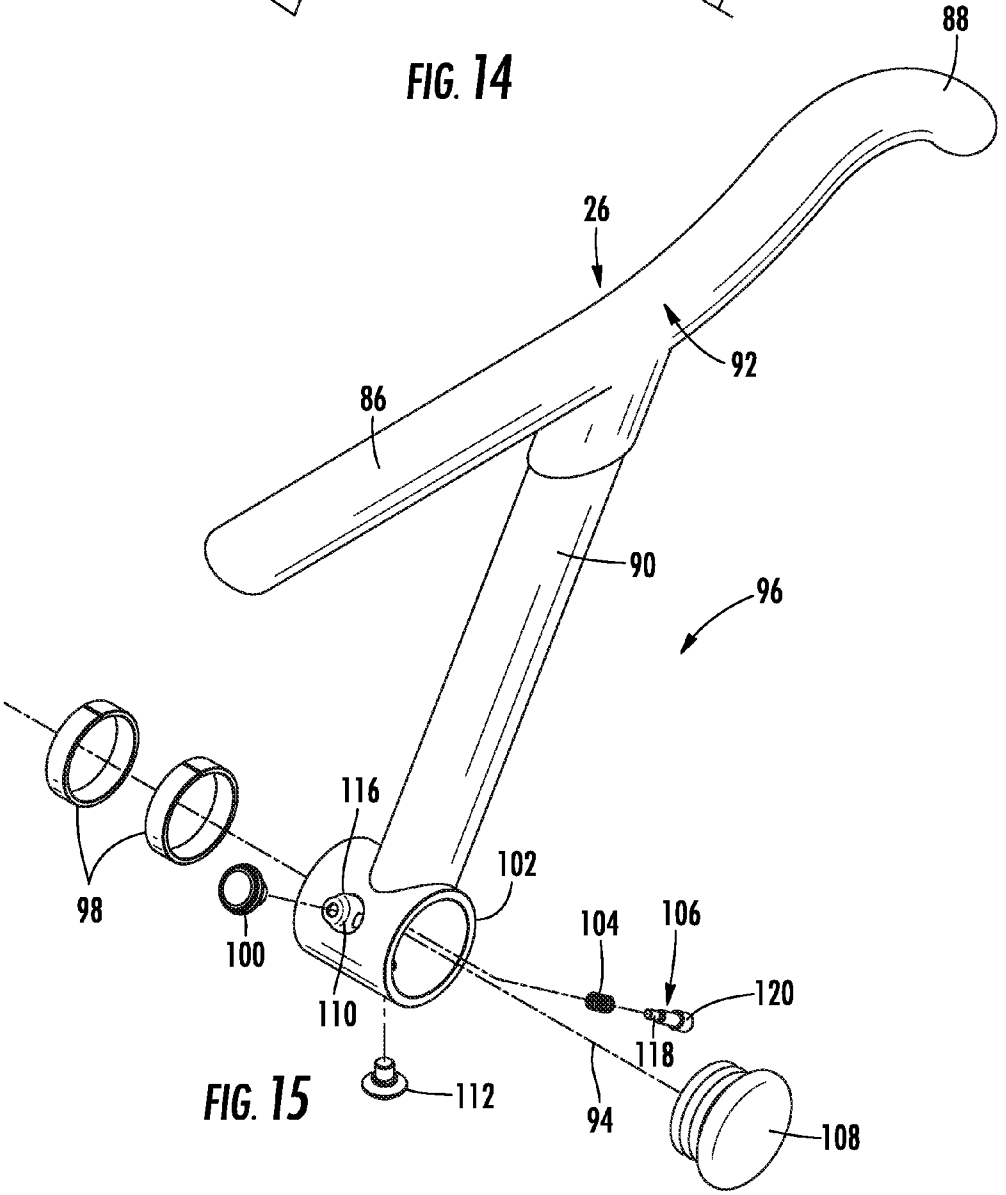
FIG. 15 is a close up, perspective view of the armrest pivoting mechanism that attaches to the cross bar of FIG. 14.

FIGS. 13-14 illustrate in greater detail one suitable construction of a pivoting mechanism 96 for armrests 26. Pivoting mechanism 96 includes a pair of bushings 98, a release handle 100, a cylindrical body 102, a spring 104, a locking pin 106, an end cap 108, a spring housing 110, and a stop pin 112. Bushings 98 are each dimensioned to fit within cylindrical body 102. More specifically, each bushing 98 is dimensioned to fit within a corresponding channel 114 defined on the end of cross bar 50 (FIGS. 13 and 14). Bushings 98 facilitate the pivoting movement of armrest 26 while it pivots about axis 94. A neck portion of release handle 100 fits within an aperture 116 (FIG. 15) defined within spring housing 110. The neck portion is attached to locking pin 106 after the neck portion has been inserted through aperture 116. Spring 104 is cylindrically shaped and has a diameter that is greater than the diameter of aperture 116. The diameter of spring 104 is also greater than an upper portion 118 of locking pin 106, but less than the diameter of a lower portion 120 of locking pin 106. Spring 104 thus fits over upper portion 118 but not lower portion 120. Spring 104 is interposed between locking pin 106 and an interior of spring housing 110. Spring 104 may be configured such that, when armrest 26 is pivoted to the stowed position, spring 104 is compressed and exerts a force against locking pin 106 that urges locking pin 106 radially inward toward pivot axis 94. This urging of locking pin 106 toward pivot axis 94 will cause locking pin 106 to automatically slide into an a stop aperture 122 defined on cross bar 50 when armrest 26 has been pivoted to the use position. Spring 104 will continue to urge locking pin 106 to remain in stop aperture 122 while armrest 26 is in the use position. When locking pin 106 seated inside stop aperture 122, armrest 26 is prevented from rotating about pivot axis 94 because cross bar 50 does not rotate, which means that stop aperture 122 does not move, nor can armrest 26 while locking pin 106 is inserted in stop aperture 122.

In order to move armrest 26 to the stowed position, a user must first pull on release handle 100 in a direction radially outward from pivot axis 94. Because release handle 100 is internally coupled to locking pin 106, this outward radial force will tend to move locking pin 106 out of stop aperture 122, provided this outward radial force is of sufficient magnitude to overcome the spring force of spring 104, which biases locking pin 106 towards the locked position within stop aperture 122. Once locking pin 106 is moved out of stop aperture 122, armrest 26 is free to rotate to the stowed position. The pivoting movement of armrest 26 about pivot axis 94 is limited by stop pin 112, which is inserted into cylindrical body 102 such that a portion of it extends inwardly from the interior or cylindrical body 102. This inward portion of stop pin 112 may ride in an elongated channel 124 (FIG. 14) defined within cross bar 50. The ends of this elongated channel 124 define the forward and rearward limits of the pivoting motion of armrest 26. When stop pin 112 reaches one end of this elongated channel 124, armrest 26 is prevented from further rotation in a clockwise direction, and when stop pin 112 reaches the other end of elongated channel 124, armrest 26 is prevented from further rotation in a counterclockwise direction.

When armrest 26 is moved to the use position (FIG. 11), spring 104 will automatically push locking pin 106 into aperture 122 defined in cross bar 50. Consequently, when a user pushes armrests 26 to their use position, armrests 26 will each automatically return to their locked state. In this locked state, neither armrest 26 can pivot unless a user pulls on release handle 100. Because of this, a user can lift up on either or both of armrests 26 without causing the armrests to pivot with respect to cross bar 50. The armrests can therefore be used either by the patient or the caregiver to exert an upward force on the transport chair. Such upward forces may be the result of a patient attempting to reposition himself or herself on seat 24, such as by pulling himself or herself forward, or such forces may be the result of a caregiver attempting to partially lift, or otherwise reposition, the transport chair. Regardless of the purpose of the forces, when armrests 26 are locked in the use position, they are not movable in any upward, downward, or sideways directions, thereby providing a solid and useful structure for grasping for the patient to use as a support during ingress or egress, as well as a solid and useful structure for a caregiver to grasp to hold or to move the transport chair.

Figure 16:
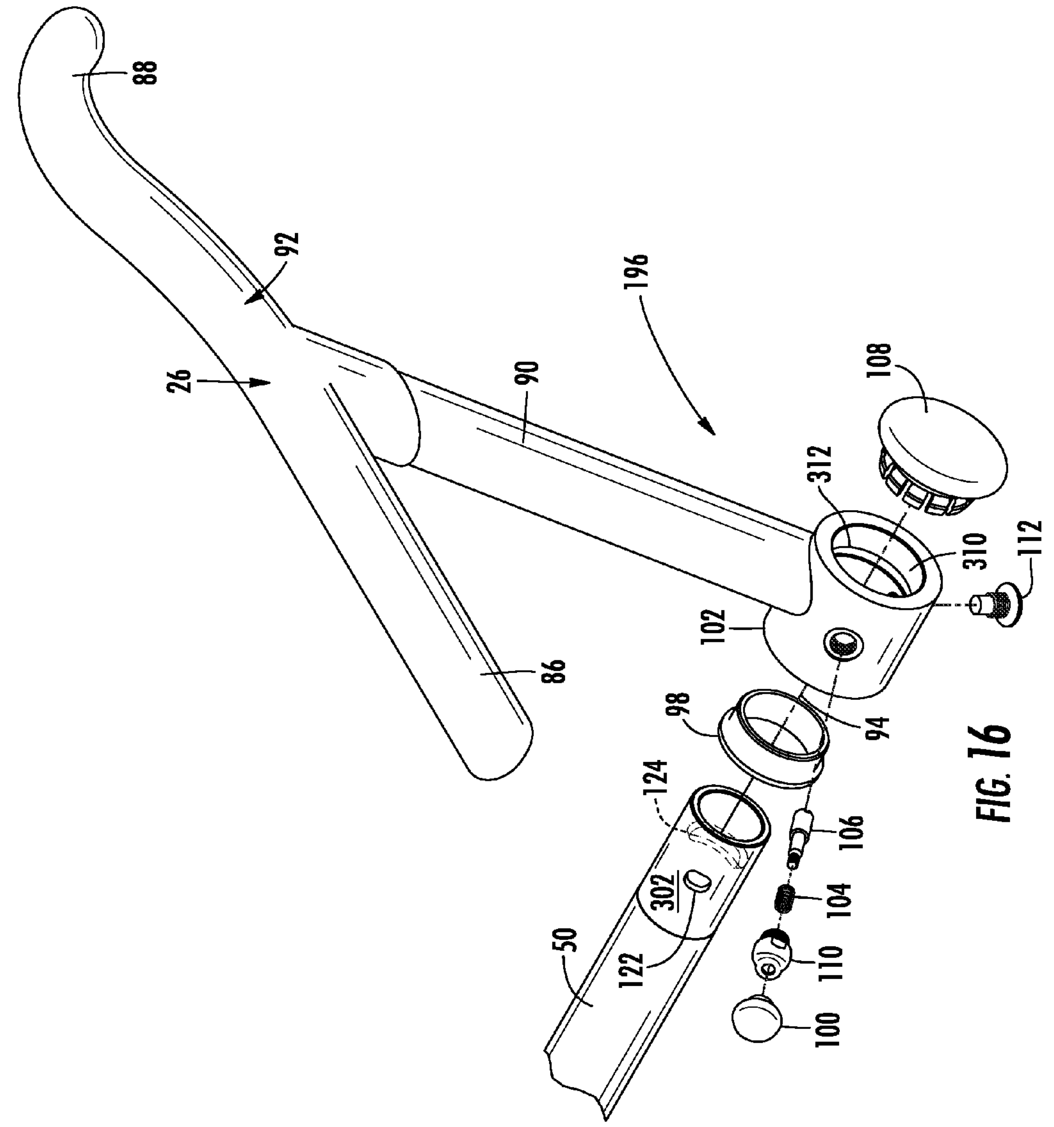
FIG. 16 is an exploded, perspective view of a second embodiment of an armrest pivoting mechanism.
Figures 17, 17A:
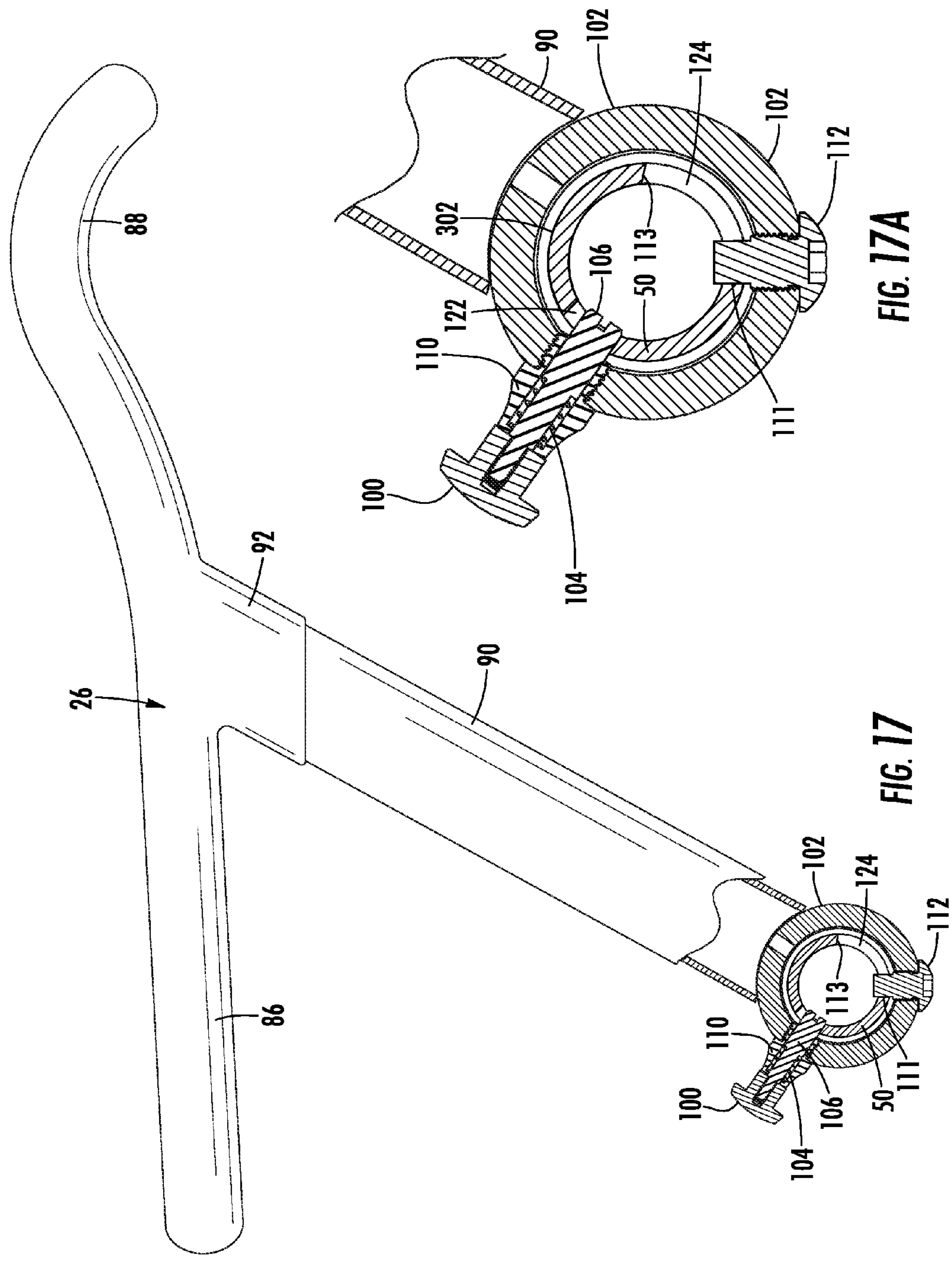
FIG. 17 is a side, elevational view of the armrest pivoting mechanism of FIG. 16 shown with the armrest pivoted down to a use position.
FIG. 17A is an enlarged view of the pivoting region of FIG. 17.
Figure 18:
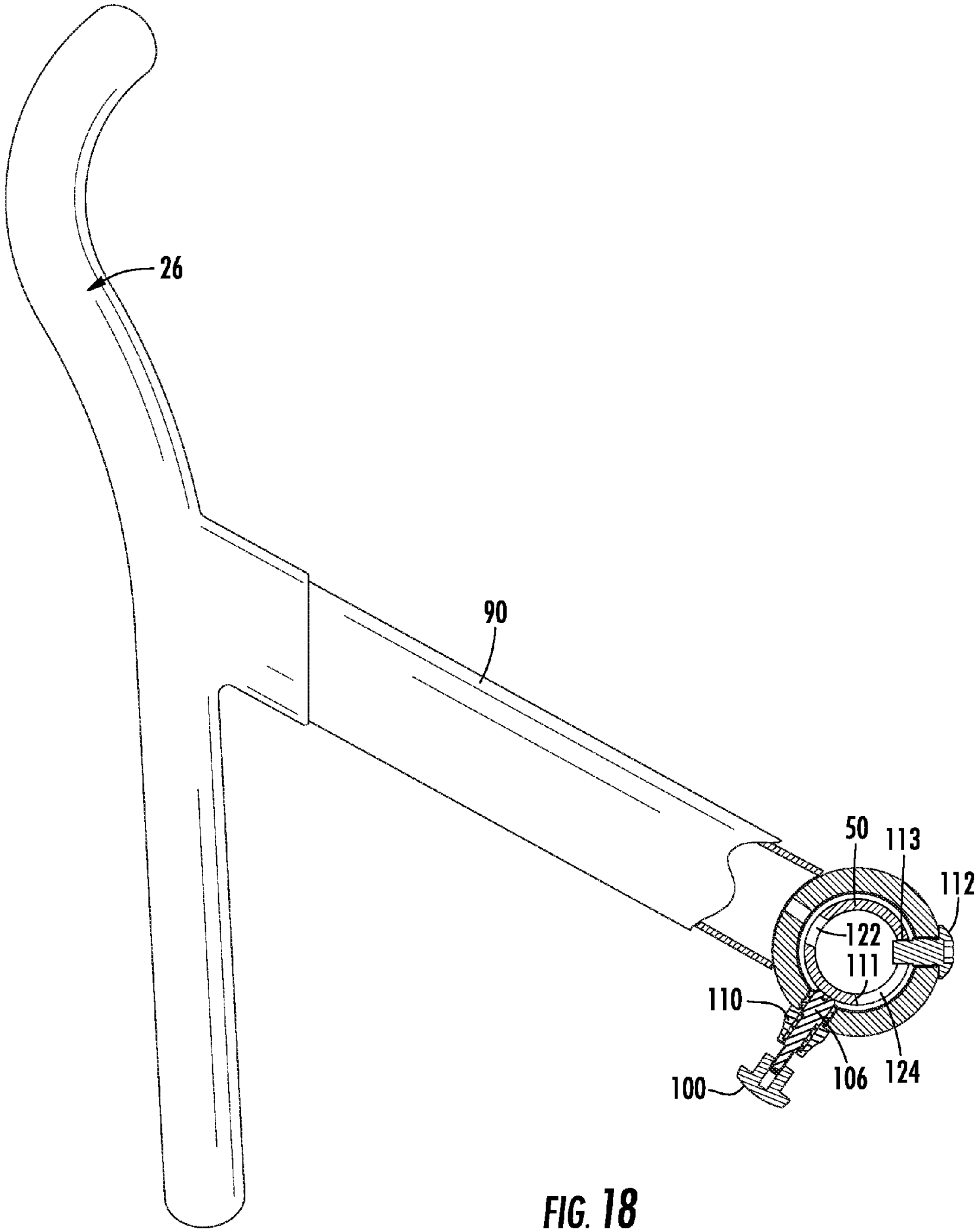
FIG. 18 is a side, elevational view of the armrest pivoting mechanism of FIG. 16 shown with the armrest up to a stowed position.

FIGS. 16-20 illustrate an alternative construction of a pivoting mechanism 196 that may be used with transport chair 420, and/or with any of the other transport chair embodiments described herein. Pivoting mechanism 196 includes cylindrical body 102 attached to, or integrated into, the bottom end of support bar 90. Pivoting mechanism 196 further includes a bushing 98, a release handle 100, a spring housing 110, a spring 104, a locking pin 106, a stop pin 112, and an end cap 108. Pivoting mechanism 196 operates in substantially the same manner as pivoting mechanism 96. That is, a user pulls on release handle 100 radially outwardly from the horizontal pivot axis 94 defined by cross bar 50 in order to allow armrest 26 to pivot. This outward movement of handle 100 pulls locking pin 106 out of stop aperture 122 in cross bar 50, thereby enabling armrest 26 to pivot. The pivoting movement of armrest 26 is limited by stop pin 112 engaging the ends of elongated aperture 124. When armrest 26 is in the use position, stop pin 112 engages a bottom end 111 of elongated aperture 124 (FIGS. 17 and 17A). When armrest 26 is moved the stowed position, the upward pivoting of armrest 26 is stopped when stop pin 112 engages a top end 113 of elongated aperture 124 (FIG. 18). Further, due to the biasing of spring 104, pin 106 is continually urged radially inwardly toward pivot axis 94, so that when armrest 26 is returned to the use position, pin 106 will automatically be inserted back into aperture 122 of cross bar 50, thereby preventing further pivoting of armrest 26 in the absence of a user pulling on release handle 100 again. Both bushing 98 and end cap 108 will rotate with armrest 26 as it pivots.

Figure 20:
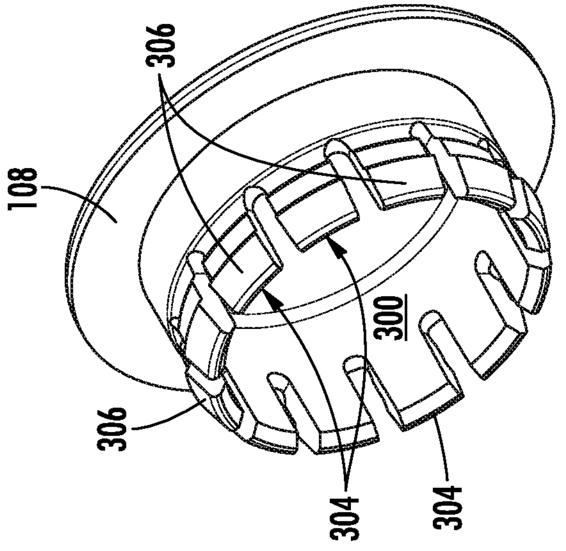
FIG. 20 is a rear perspective view of the end cap of FIG. 19.
Figure 19:
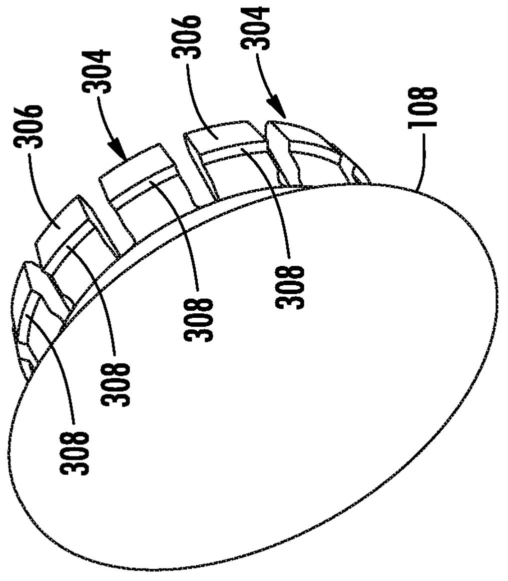
FIG. 19 is a front perspective view of the end cap of the pivoting mechanism of FIG. 16.

End cap 108 of FIGS. 16-18 is shown in more detail in FIGS. 19 and 20. End cap 108 acts as both an end cap that prevents dirt and unwanted environment debris from entering pivoting mechanism 196, as well as a bushing. More specifically, end cap 108 includes an interior surface 300 (FIG. 20) that engages an exterior surface 302 of cross bar 50. When armrest 26 pivots, interior surface 300 slides along exterior surface 302 of cross bar 50. End cap 108 further includes a plurality of flexible fingers 304 that each include a cam surface 306 and a shoulder 308. Cam surface 306 engages an interior surface 310 of cylindrical body 102 (FIG. 16) that has an interior diameter slightly less than the exterior diameter of the collectively plurality of flexible fingers 304. Consequently, when end cap 108 is pushed inwardly into cylindrical body 102, flexible fingers 304 flex radially inwardly due to the engage of cam surfaces 306 with interior surface 320. This inward flexing continues as end cap 108 is pushed further and further into cylindrical body.

When end cap 108 is pushed fully into cylindrical body 102, flexible fingers 304 will reach a groove 312 defined in interior surface 310 (FIG. 16). Groove 312 is dimensioned to allow flexible fingers 304 to return to their unflexed stated. In this unflexed stated, shoulders 308 of flexible fingers 304 will engage an edge of groove 312, thereby preventing end cap 108 from being pulled out of cylindrical body 102. Only if each flexible finger is manually engaged and flexed inwardly so that shoulders 308 disengage from the edge of groove 312 can end cap 108 be removed from cylindrical body 102. However, after cylindrical body 102 and end cap 108 are both mounted to cross bar 50, the exterior surface 302 of cross bar 50 has a diameter sufficiently large to prevent any inward flexing of flexible fingers 304. Consequently, when end cap 108 and cylindrical body 102 are mounted to cross bar 50, it is impossible to remove end cap 108 without breaking end cap 108. Only if cylindrical body 102 is removed from cross bar 50 (by unscrewing stop pin 112 and pulling on release handle 100, is it theoretically possible to remove end cap 108 from cylindrical body 102 (by manually flexing fingers 304 in the manner described above). End cap 108 thereby forms both a permanent end cap, as well as a bushing for pivoting mechanism 196.

It will be understood by those skilled in the art that pivoting mechanisms 96 and 196 may be varied substantially from that disclosed herein. It will also be understood that the location of pivoting mechanisms 96, 196 and/or the release for the pivoting mechanism 96, 196 may be moved to different locations on the transport chair. For example, the release for pivoting mechanism 96,196 may be moved to be positioned anywhere along support bar 90, or at any location along arm bar 92. When positioned on arm bar 92, the release for pivoting mechanism 96, 196 may be positioned on an underside of arm bar 92 so as to not interfere with a patient resting his or her arms on armrests 26, yet still be accessible to a seated patient so that he or she may pivot the arms to the stowed position, if desired.

Transport chair 420, or any of the other transport chair embodiments described herein, may also be configured such that the lateral distance D2 (FIG. 3) between armrests 26 may be increased or decreased. This variable lateral distance allows chair 420 to be more comfortably used with patients of different size. In order to change the lateral distance between armrests 26, a release mechanism (not shown) may be included anywhere on armrests 26, or near cross bar 50. Indeed, in one embodiment, the release mechanism may be triggered by the same release handle 100 used to enable the armrests to pivot about axis 94. The extension and/or retraction of armrests 26 toward and away from the center of seat 24 (thereby varying distance D2) may be accomplished in a variety of different manners. In one embodiment, cylindrical portion 102 may have its length along axis 94 extended in the direction of axis 94 so that it overlaps a greater portion of cross bar 50 when the armrests are positioned as close as possible to each other (i.e. distance D2 is at a minimum). The overlapping portion may then be selectively reduced by sliding cylindrical portion 102 outwardly along axis 94 so that distance D2 increases. Armrests 26 may then be supported at different lateral spacings from each other by having different amounts of cylindrical portion 102 overlap cross bar 50. Alternatively, cylindrical body 102 could be dimensioned to have a diameter smaller than the diameter of cross bar 50 so that body 102 fit within cross bar 50 and cross bar 50 overlapped variable amounts of cylindrical body 102. Still other manners of changing the distance D2 could also be used.

Oxygen Bottle Holder

Figure 21:
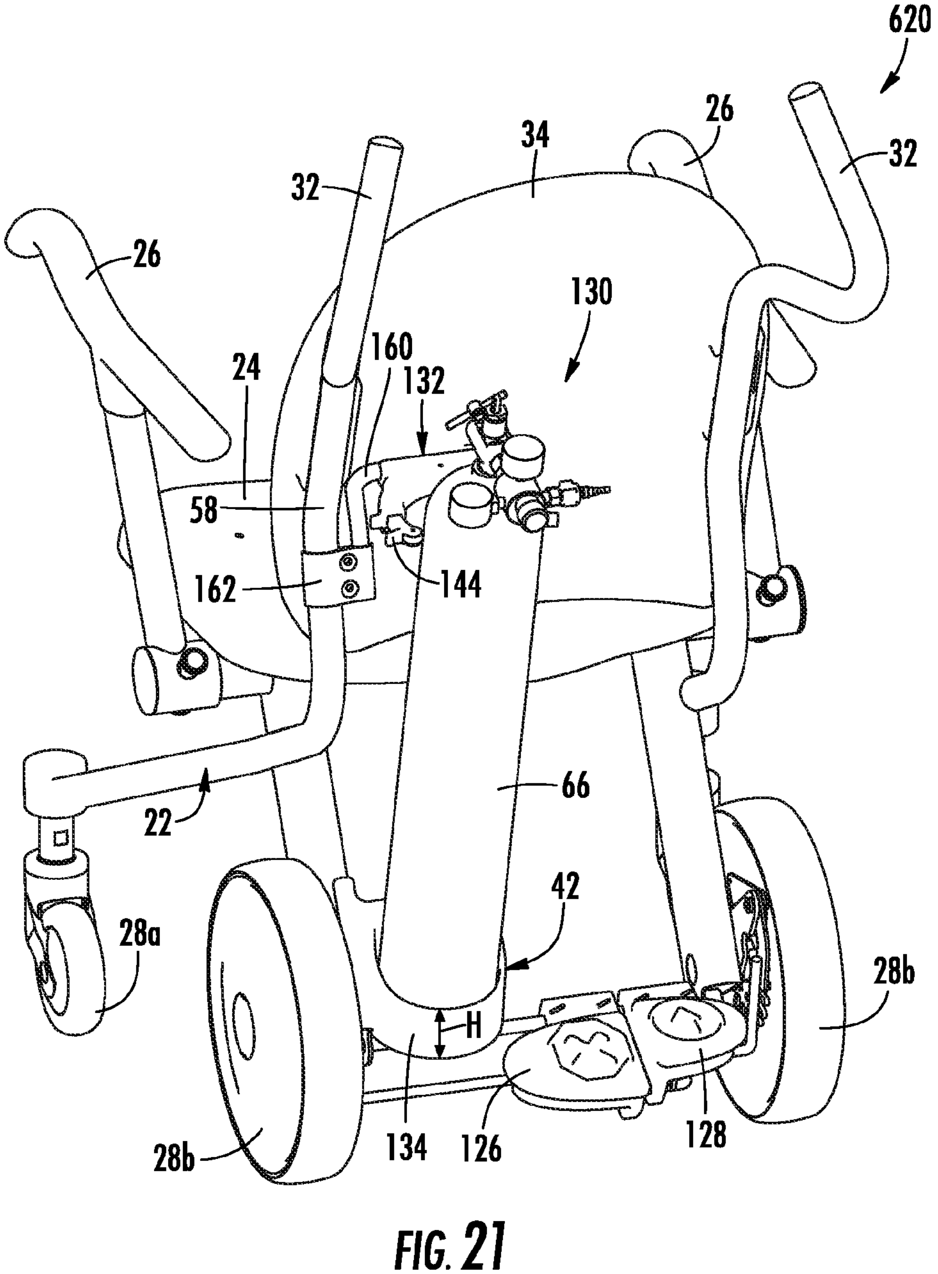
FIG. 21 is rear perspective view of a fourth embodiment of a wheeled transport chair showing an oxygen bottle that is in the process of being inserted into an oxygen bottle holder on the chair.
Figure 22:
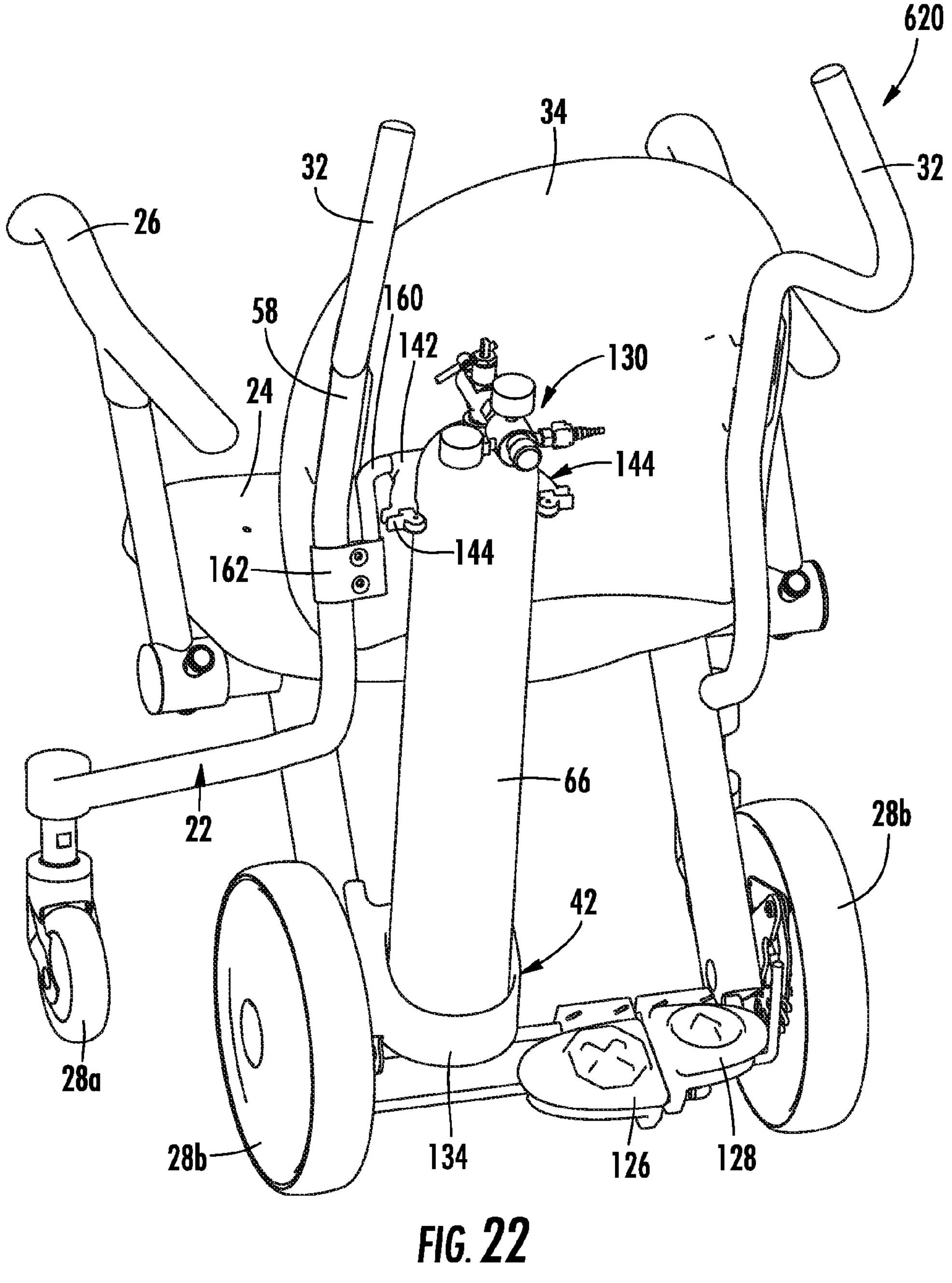
FIG. 22 is a rear perspective view of the embodiment of FIG. 21 showing the oxygen bottle being inserted to a greater extent into the oxygen bottle holder than that shown in FIG. 21.
Figure 23:
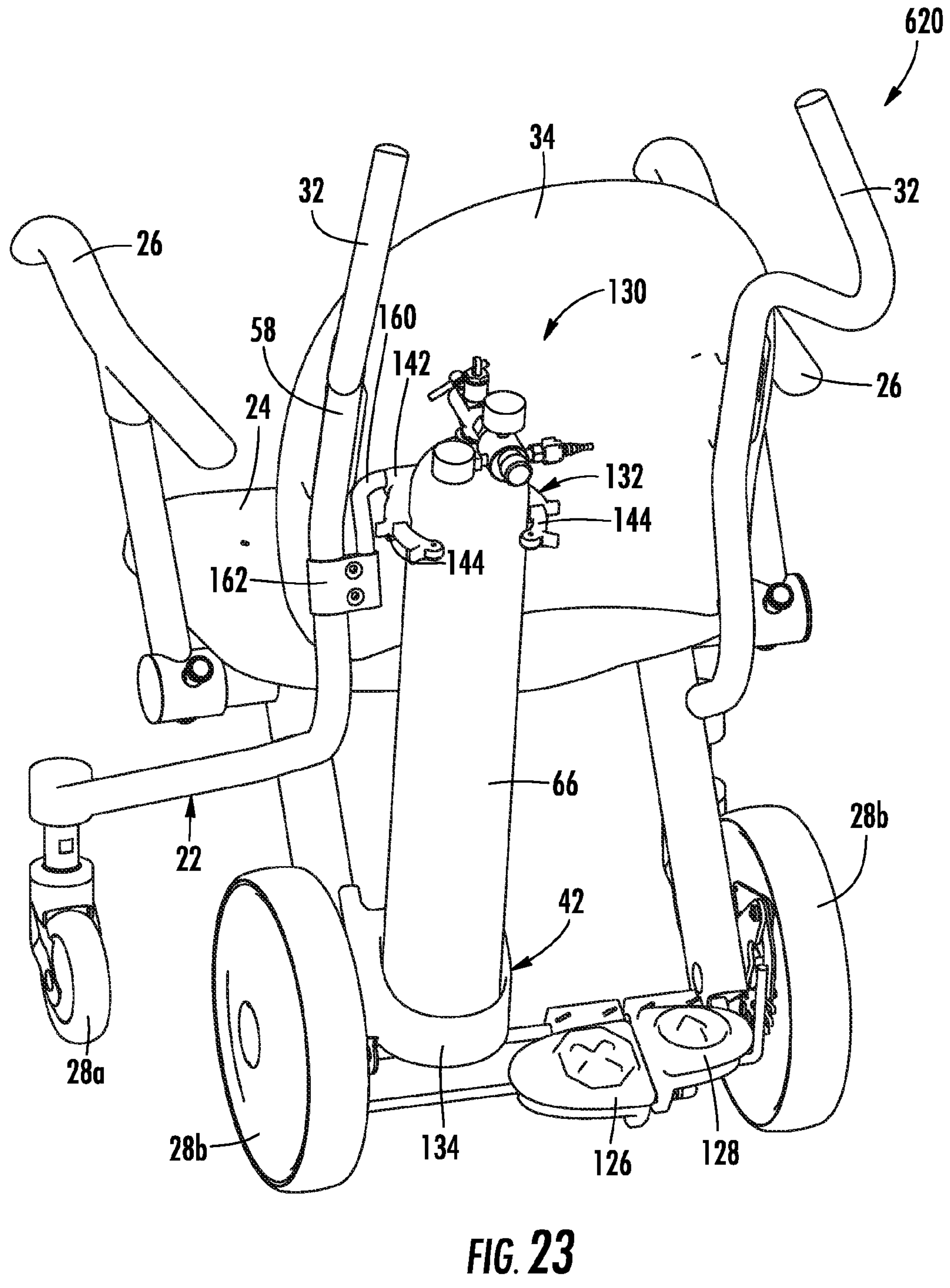
FIG. 23 is a rear perspective view of the embodiment of FIG. 21 showing the oxygen bottle completed inserted into the oxygen bottle holder.

FIGS. 21-23 illustrate another embodiment of a transport chair 620 according to various aspects of the invention. Transport chair 620 is similar to transport chairs 20, 220, and 420 but, as shown, does not include any chart holder components, any footrests, any wheelies, or any IV pole. Those components of transport chair 620 that are the same as those of transport chairs 20, 220, or 420 are labeled with the same reference numbers, and the description of those components applies equally to transport chair 620. It will be understood that wheeled transport chair 620 may be modified to exclude any its components that are lacking from chairs 20, 220, or 420, and/or it may be modified to include any of the components of chairs 20, 220, or 420 that are shown lacking in FIGS. 21-23.

Figure 29A:
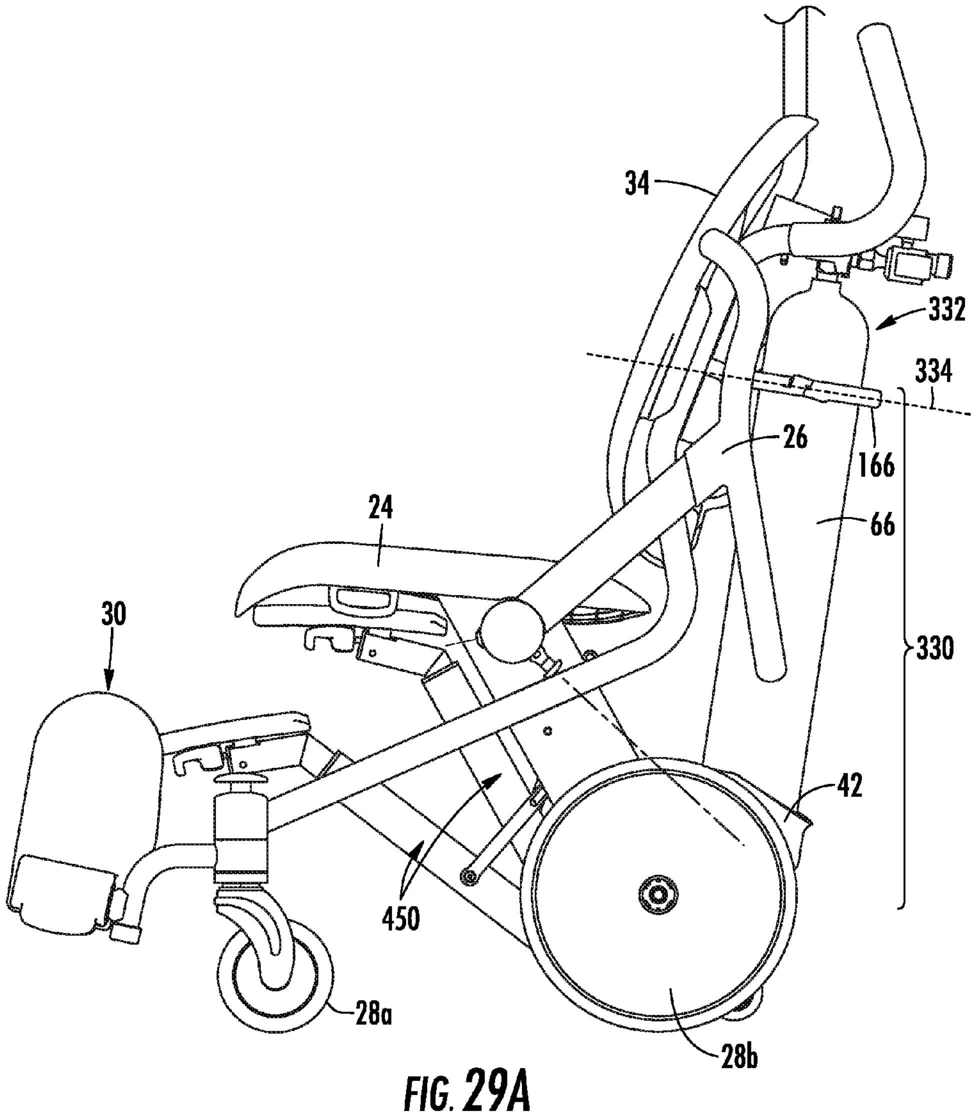
FIG. 29A is a side, elevational view of a transport chair according to a fifth embodiment showing an alternative construction of a top portion of the oxygen bottle holder.
Figure 29B:
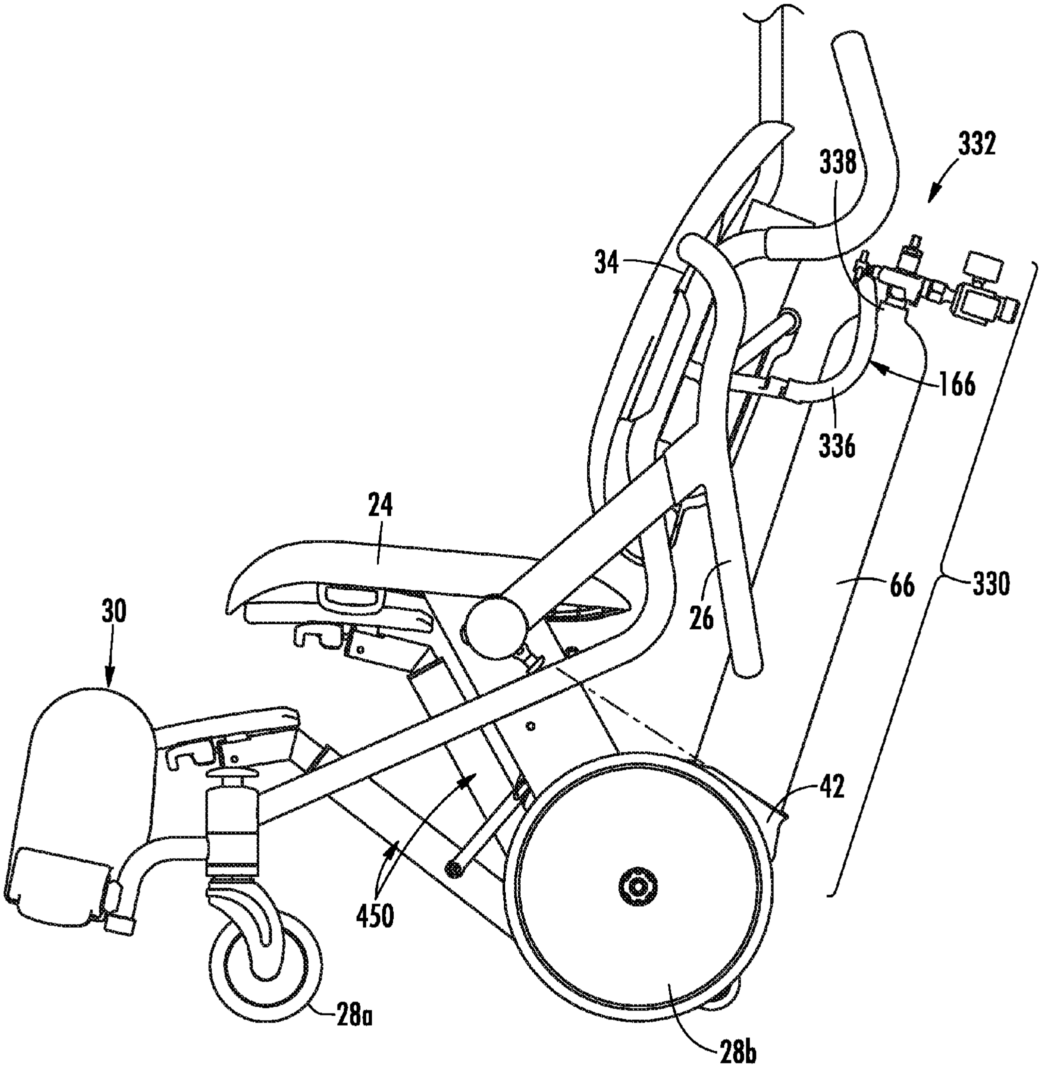
FIG. 29B is a side, elevational view of the transport chair of FIG. 29A showing the top portion of the oxygen bottle holder raised to a position enabling the oxygen bottle to be removed.

Transport chair 620 includes an oxygen bottle holder 130 that includes an upper portion 132 and a lower portion 42. Lower portion 42 includes a base or body 134 in which is defined a circular recess. The circular recess has a diameter that is slightly larger than the diameter or most conventional oxygen bottles 66 so that the bottom end of the oxygen bottle 66 can be inserted into the recess. As shown in FIGS. 21-23, base 134 is positioned close to the floor so that a caregiver does not have to lift the oxygen bottle 66 very high in order to position its bottom end within the circular recess. Further, the height (H) of base 134 (see FIG. 23) may be relatively small so that the height which a caregiver has to lift the bottle 66 to insert it into base 134 is reduced. Indeed, in one embodiment, the depth of the circular recess may be insufficient to prevent bottle 66 from tipping out of the circular recess without the additional stabilization and/or locking forces provided by upper portion 132 of bottle holder 130, which will be described in more detail below. In another embodiment, such as that shown in FIGS. 29A-29B, the height H the circular recess defined in base 134 is sufficiently tall such that an oxygen bottle 66 positioned therein will not tip out of the base 134, even in the absence of the oxygen bottle being secured by upper portion 132 of bottle holder 130. An example of an oxygen bottle being held on the transport chair solely by way of base 134 is shown in FIG. 29B. In the embodiments shown in FIGS. 21-23 and 29A-29B, the height H is smaller at a rear end of base 134 than at a forward end of base 134. This helps a caregiver insert the bottle 66 more easily into the circular recess defined in base 134 than if the height of the circular recess were uniform throughout its entire circumference.

Figure 26:
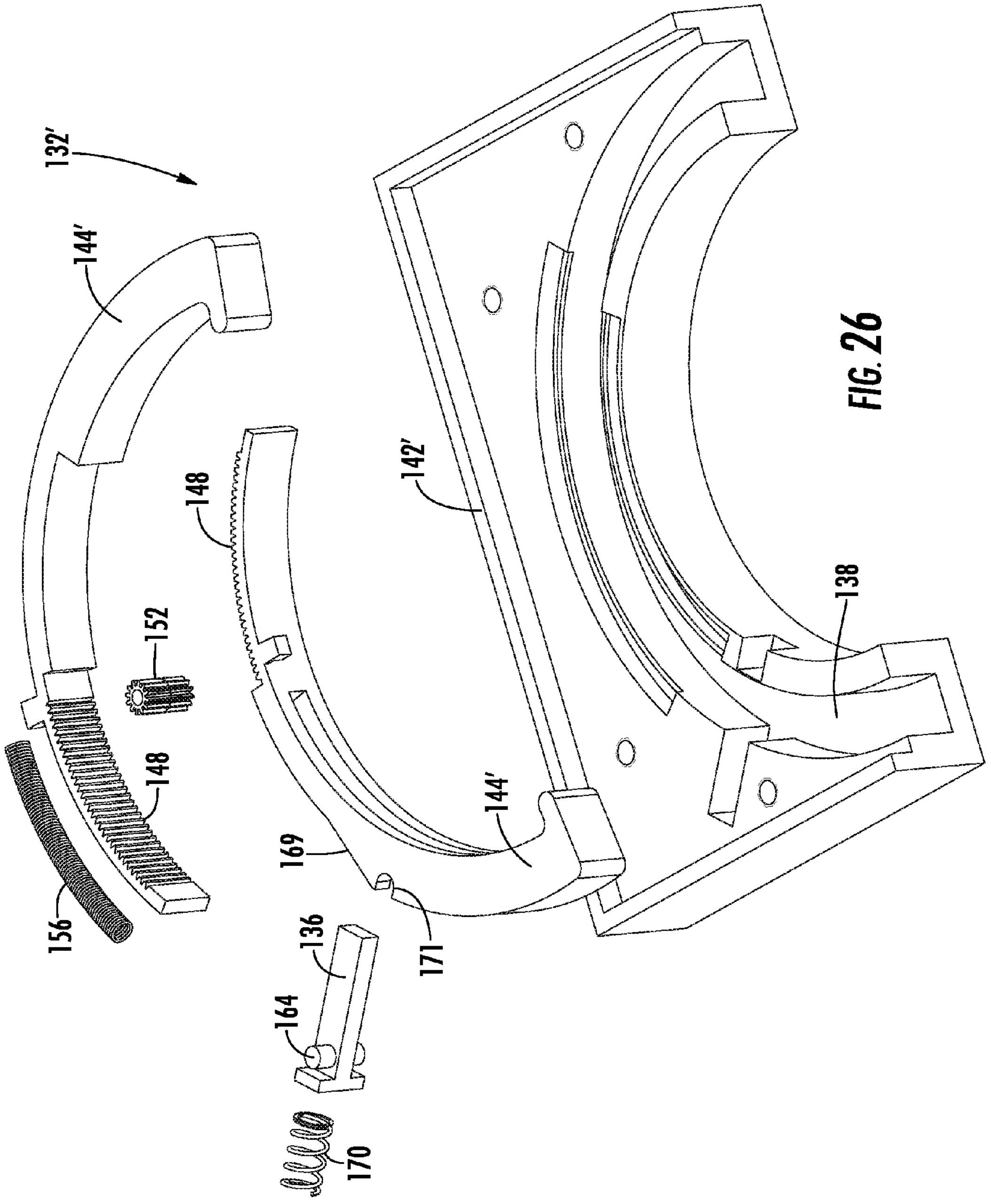
FIG. 26 is a perspective, exploded view of an alternative embodiment of a top portion of the oxygen bottle holder.
Figure 27:
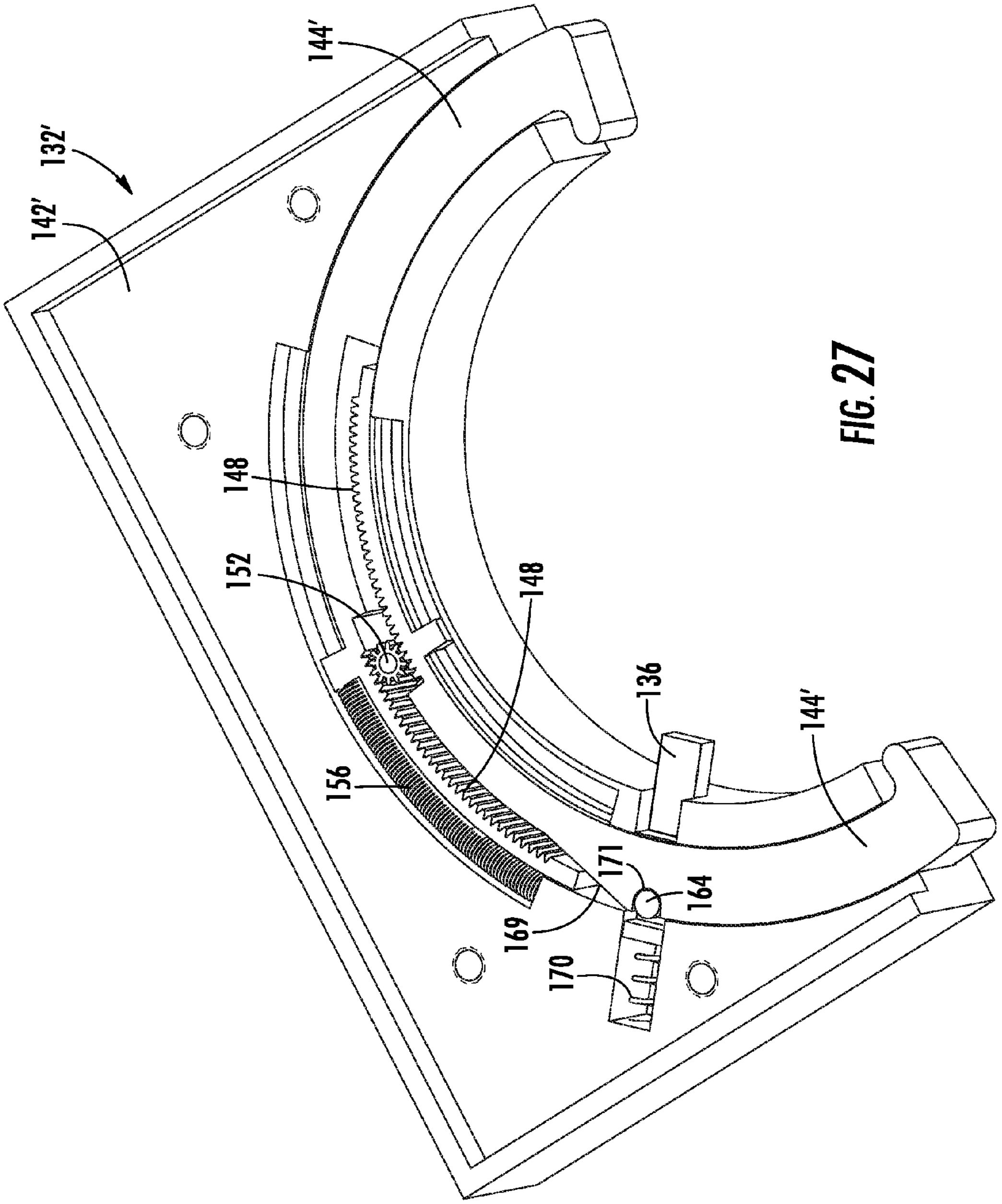
FIG. 27 is a perspective view of the oxygen bottle holder portion of FIG. 26 shown with its fingers in a retracted position.
Figure 28:
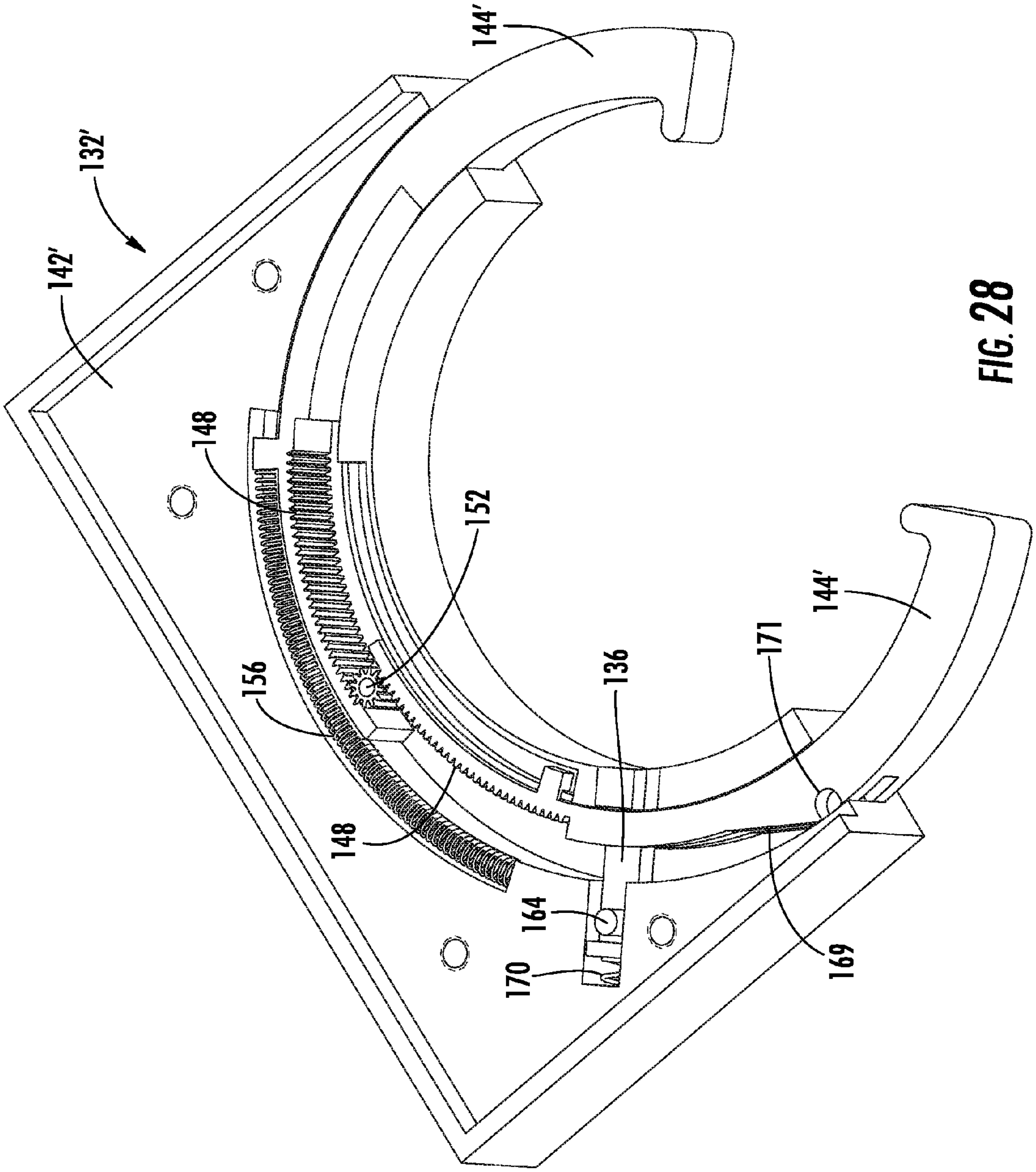
FIG. 28 is a perspective view of the oxygen bottle holder portion of FIG. 26 shown with its fingers in an extended position.

Upper portion 132 of bottle holder 130 may take on a variety of different configurations. A first embodiment is shown in FIGS. 21-25, a second embodiment is shown in FIGS. 26-28, and a third embodiment is shown in FIGS. 29A-30B. Still other embodiments are possible.

Figure 24:
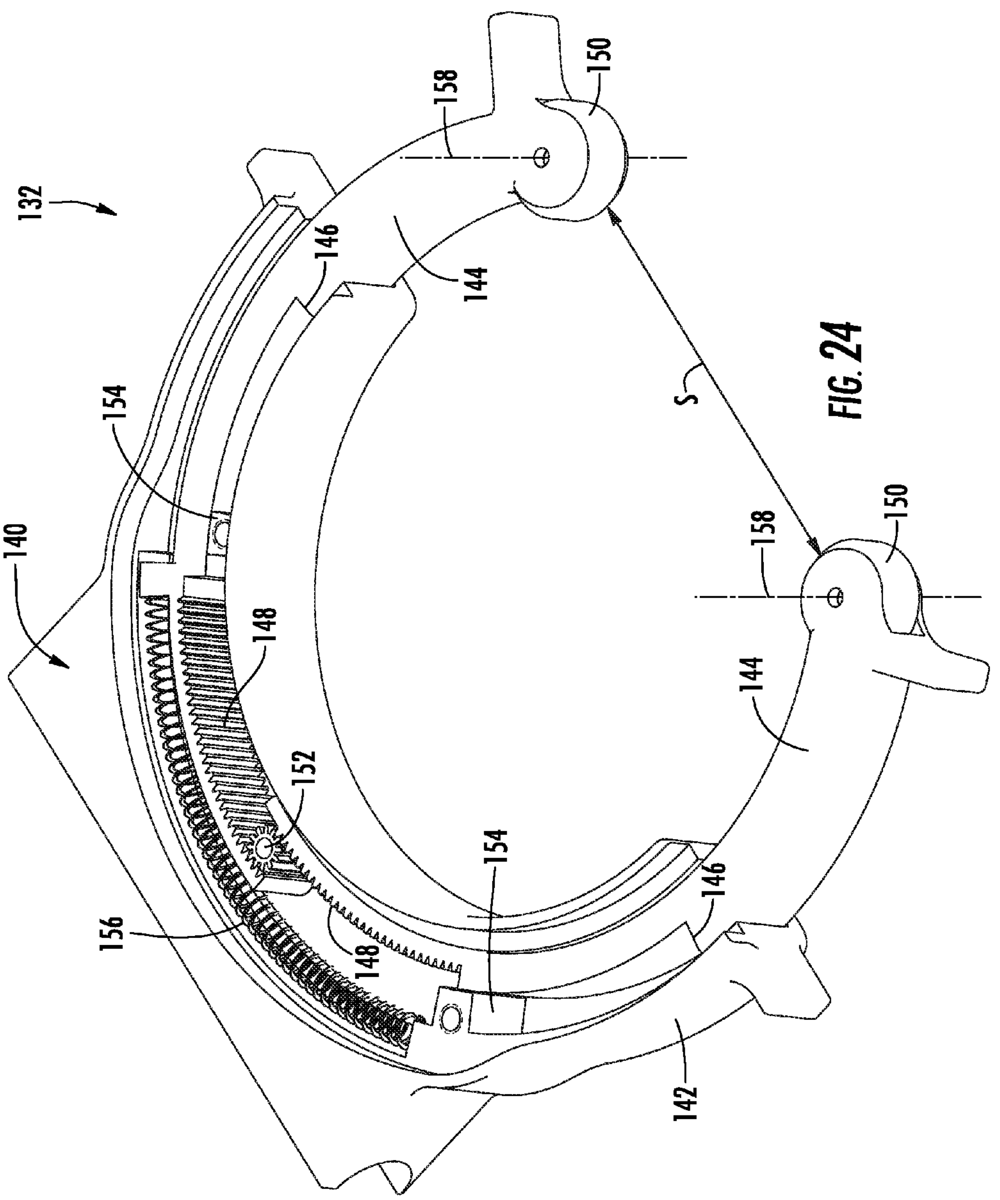
FIG. 24 is a perspective view of a top portion of the oxygen bottle holder of FIGS. 21-23 that is shown in a locked position.
Figure 25:
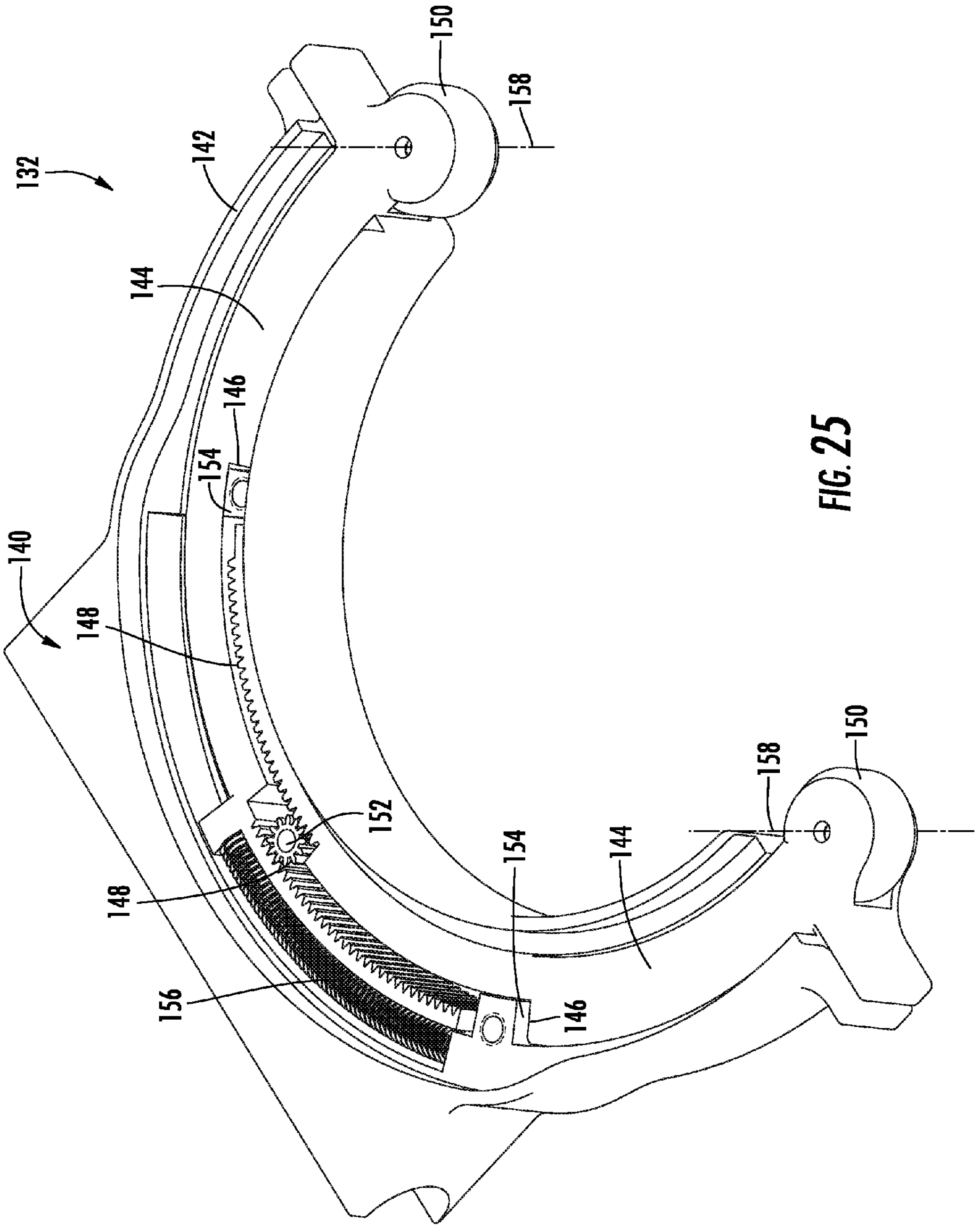
FIG. 25 is a perspective view of the top portion of the bottle holder of FIG. 24 showing the top portion in an unlocked position.

In the embodiment of FIGS. 21-25, upper portion 132 includes a clamp 140 having an arcuate body or housing 142 in which a pair of slideable arcuate fingers 144 are housed. Arcuate fingers 144 are shown more clearly in FIGS. 12 and 13. In FIG. 12, fingers 144 are shown in the extended position, which corresponds to the position in which a bottle 66 may be secured to transport chair 620. In FIG. 25, fingers 144 are shown in the retracted position, which corresponds to the position in which a bottle 66 may either be inserted between fingers 144 or removed from between fingers 144.

In the embodiments shown in FIGS. 21-25, each finger 144 includes a stop shoulder 146, a toothed surface 148, and a low friction member 150. The toothed surface interacts with, and engages, a gear 152 that is rotatably secured within housing or body 142. As fingers 144 extend into, or retract out of, housing 142, toothed surfaces 148 engage gear 152, causing gear 152 to rotate. Because both toothed surfaces engage gear 152, any movement of one finger 144 either into or out of housing 142 automatically causes a corresponding similar movement of the other finger 144. That is, both arms retract into, or extend out of, housing 142 in unison. This uniform movement occurs even if an external extension or retraction force is applied to only one of the fingers 144. The retraction of movable fingers 144 into housing 142 is terminated when stop shoulders 146 engage against stops 154 within housing 142.

A spring 156 is positioned between portions of each finger 144, as shown in FIGS. 24 and 25. Spring 156 urges each finger to the extended position shown in FIG. 24. Thus, when fingers are retracted into housing 142, a force must be applied to one or both of fingers 144 that is greater than the biasing force of spring 156.

Low friction members 150 are, in the embodiment shown, rollers that may rotate about an axis 158 that is generally vertical in FIGS. 24 and 25. Low friction members 150 may take on other forms. Low friction members 150, when configured as rollers, are configured to rollingly interact with the exterior surface of bottle 66 when bottle 66 is inserted into upper portion 132. The movement of a bottle into upper portion 132 of bottle holder 130 is shown sequentially in FIGS. 21-23. In FIG. 21, the base of the bottle 66 is placed in lower portion 42 of bottle holder 130 and the upper portion of the bottle 66 is positioned to abut against rollers 150. The caregiver then pushes the bottle 66 against rollers 150, which causes a force to be exerted on the ends of movable fingers 144 that tends to retract the fingers into housing 142. As the fingers begin to retract, the horizontal separation S between the ends of fingers 144 (FIG. 22) begins to increase. FIG. 22 shows the bottle pushed almost all of the way into the space between fingers 144. Rollers 150 help to reduce the frictional resistance of bottle 66 against fingers 144 as bottle 66 is inserted into upper portion 132. Rollers 150 also acts as low friction cams that help to translate the movement of the bottle 66 toward upper portion 132 into a finger retracting movement that widens the separation between the ends of fingers 144.

Once the ends of fingers 144 have been forced apart far enough to accommodate the full diameter of bottle 66, any further movement of bottle 66 toward upper portion 132 will allow the fingers 144 to extend out of housing 142. That is, once the bottle 66 is positioned within upper portion 132, the force of spring 156 will force fingers 144 out of housing 142 back to their extended (and bottle locking) position. Any outward forces exerted by the bottle against the interior of fingers 144 will not result in any retraction of the fingers 144 into housing 142. Instead, fingers 144 will not move against such outward forces applied to bottle 66. Bottle 66 will therefore be securely held within the arcuate interior region defined by arcuate fingers 144 (FIG. 23).

Because of the configuration of upper portion 132 of bottle holder 130 in the embodiments shown in FIGS. 21-25, it is not necessary for a caregiver, or other person, to directly touch any of upper portion 132 when pushing a bottle 66 thereinto. That is, the person does not need to grasp either finger 144, or any other portion of upper portion 132 in order to secure a bottle therein. Instead, the person may simply hold onto bottle 66 and push the bottle toward upper portion 132. This pushing force will cause fingers 144 to initially retract until the bottle fits between the fingers. Thereafter, the force of spring 156 will return fingers 144 to their extended and locked position. A caregiver, or other person, therefore can keep both hands on bottle 66 while securing it to chair 420, and does not need to release one hand in order to manipulate upper portion 132. Because of the weight of bottles 66, this makes it easy to secure it to chair 420 while retaining full control of bottle 66 with two hands.

In order to remove a bottle from bottle holder 130, a caregiver or other person may grasp either one of movable fingers 144 and push them in a direction that causes them to retract into housing 142. Once sufficiently retracted, the top portion of bottle 66 may be tipped out of the reach of fingers 144 while the bottom portion of the bottle 66 remains in the circular recess of base 134. Once out of the reach of fingers 144, the person may then freely lift the bottle 66 out of the base 134.

Upper portion 132 of bottle holder 130 may be secured to chair 420 by way of a bar 160 that is secured to a bracket 162 attached to the upper portion 58 of one of the forward legs 54 of frame 22, as shown in FIGS. 21-23.

FIGS. 26-28 illustrate an alternative embodiment of bottle holder 130. More particularly, FIGS. 26-28 illustrate an alternative embodiment of an upper portion 132' of bottle holder 130. Those components of upper portion 132' that are the same as those found in upper portion 132 are labeled herein with the same reference numbers. Those components of upper portion 132' that are similar to components in upper portion 132 but have been changed in some fashion have been given the same reference number followed by the prime symbol ('). Components in upper portion 132' that are not found in upper portion 132 have been given a new number.

Upper portion 132' differs from upper portion 132 in that upper portion 132' includes a trigger 136 that automatically extends fingers 144' when a user inserts an oxygen bottle into upper portion 132'. Trigger 136 is visible in FIGS. 26-28 and intersects a channel 138 in which one of fingers 144' slides. Trigger 136 includes a trigger pin 164 defined therein. A trigger spring 170 is disposed between trigger 136 and an inner surface of body 142'. Trigger spring 170 is adapted to exert a biasing force that urges trigger 136, and its attached trigger pin 164, outward toward the position shown in FIG. 27. When in this outward position, trigger pin 164 engages a slot 171 defined in one of fingers 144'. This engagement prevents the finger 144' from extending outward into the extended position shown in FIG. 28. However, when a user inserts the top portion of an oxygen bottle into upper portion 132' and presses the bottle against trigger 136, the force applied by the user to trigger 136 will overcome the biasing force of trigger spring 170, thereby allowing trigger 136 and trigger pin 164 to slide inwardly (toward spring 170) until pin 164 disengages from slot 171. When pin 164 disengages from slot 171, the biasing force of spring 156 will automatically urge fingers 144' to the outward configuration in the manner discussed above with respect to upper portion 132.

When a person wishes to remove the oxygen bottle from upper portion 132', he or she simply manually pushes on either or both of fingers 144' in a direction that urges the fingers 144' toward their retracted positions. By applying sufficient force to overcome the biasing of spring 156, fingers 144' will retract into body 142'. As one of fingers 144' retracts, an angled surface 169 will urge pin 164 inward, forcing trigger 136 to compress trigger spring 170. Angled surface 169 will continue to urge pin 164 inward until pin 164 reaches slot 171, at which point trigger spring 170 will urge pin 164 into slot 171, which will retain fingers 144' in their retracted positions (provided the top portion of the oxygen bottle has been removed sufficiently from upper portion 132' so as to provide clearance for trigger 136 extending outwardly).

Upper portion 132' therefore provides a convenient tool for easily inserting an oxygen bottle therein without requiring a user to manually manipulate fingers 144' prior to inserting the oxygen bottle therein. This frees the user's hands, thereby enabling him or her to use both of their hands for holding the bottle and/or for other purposes while positioning the bottle in holder 130. Trigger 136 therefore provides an automatic gripping or locking feature that automatically locks or grips the upper end of the oxygen when it is inserted into upper portion 132'. The amount of force necessary to activate trigger 136 can be made relatively low because trigger spring 170 exerts a force that does not directly prevent the extension of fingers 144'. In other words, trigger spring 170 exerts a force that is generally perpendicular to the movement of the adjacent finger 144', and it is the physical blocking action of pin 164 that resists the extension of fingers 144', not the force of spring 170. Therefore, trigger spring 170 can be configured such that relatively little force is necessary to overcome it so that a user inserting an oxygen bottle into upper portion 132' does not detrimentally notice the extra force necessary to compress spring 170.

As was noted, the finger 144' adjacent to trigger 136 includes an angled surface 169 that urges trigger 136 toward spring 170 when the finger 144' is pushed inwardly to its retracted position. Angled surface 169 also allows spring 170 to extend toward a more extended position while fingers 144' are in their extended position. Thus, trigger spring 170 is never left to remain in the fully compressed state (or the state where it is compressed enough to release finger 144'). This helps to reduce fatigue of spring 170 and ensure that spring 170 will always have sufficient resilience to urge pin 164 back into slot 171, even after long periods of use or non-use, including long periods of repetitive use and non-use.

Figure 30A:
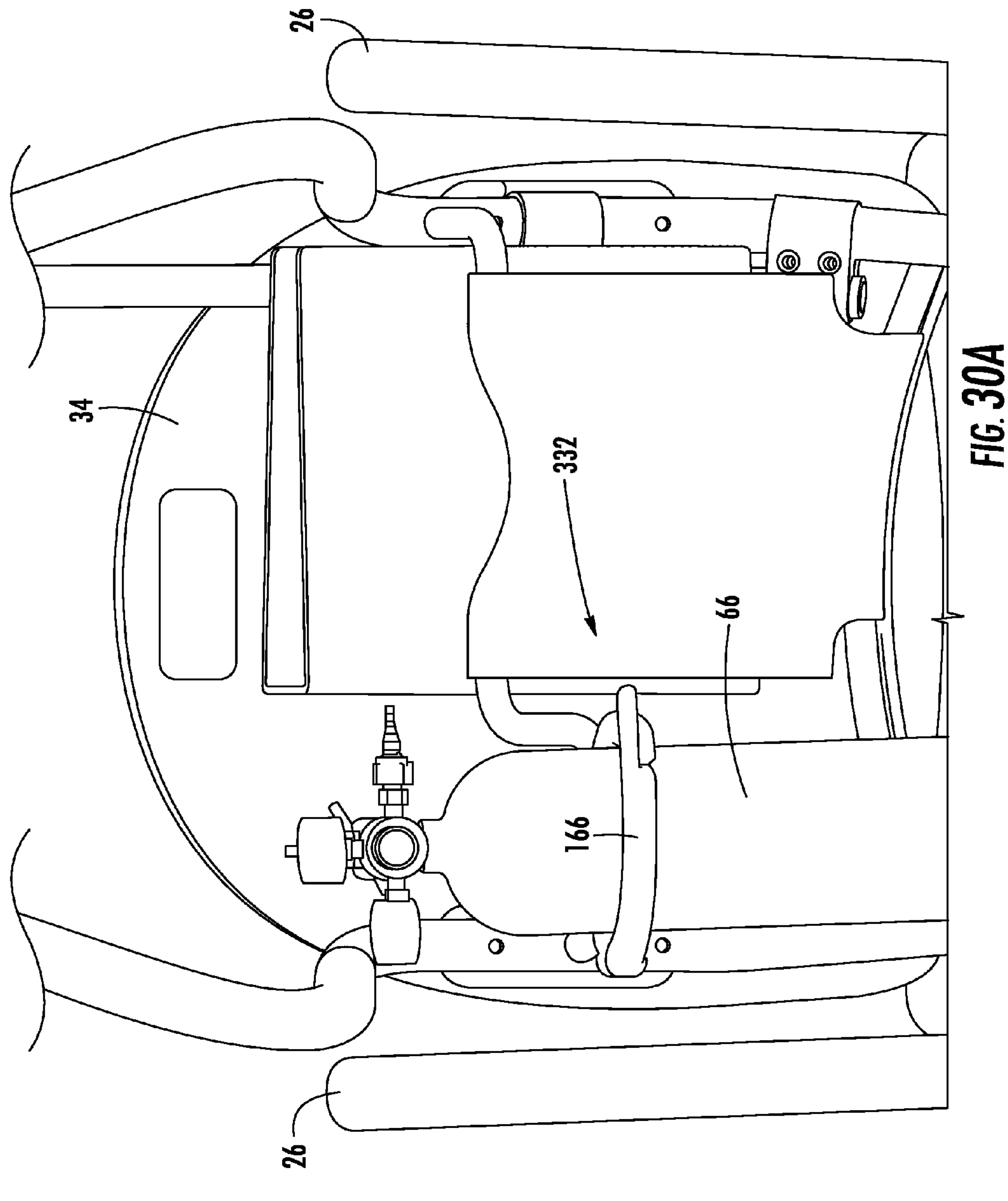
FIG. 30A is a rear view of the transport chair of FIG. 29A showing the top portion of the oxygen bottle holder in the lowered position.
Figure 30B:
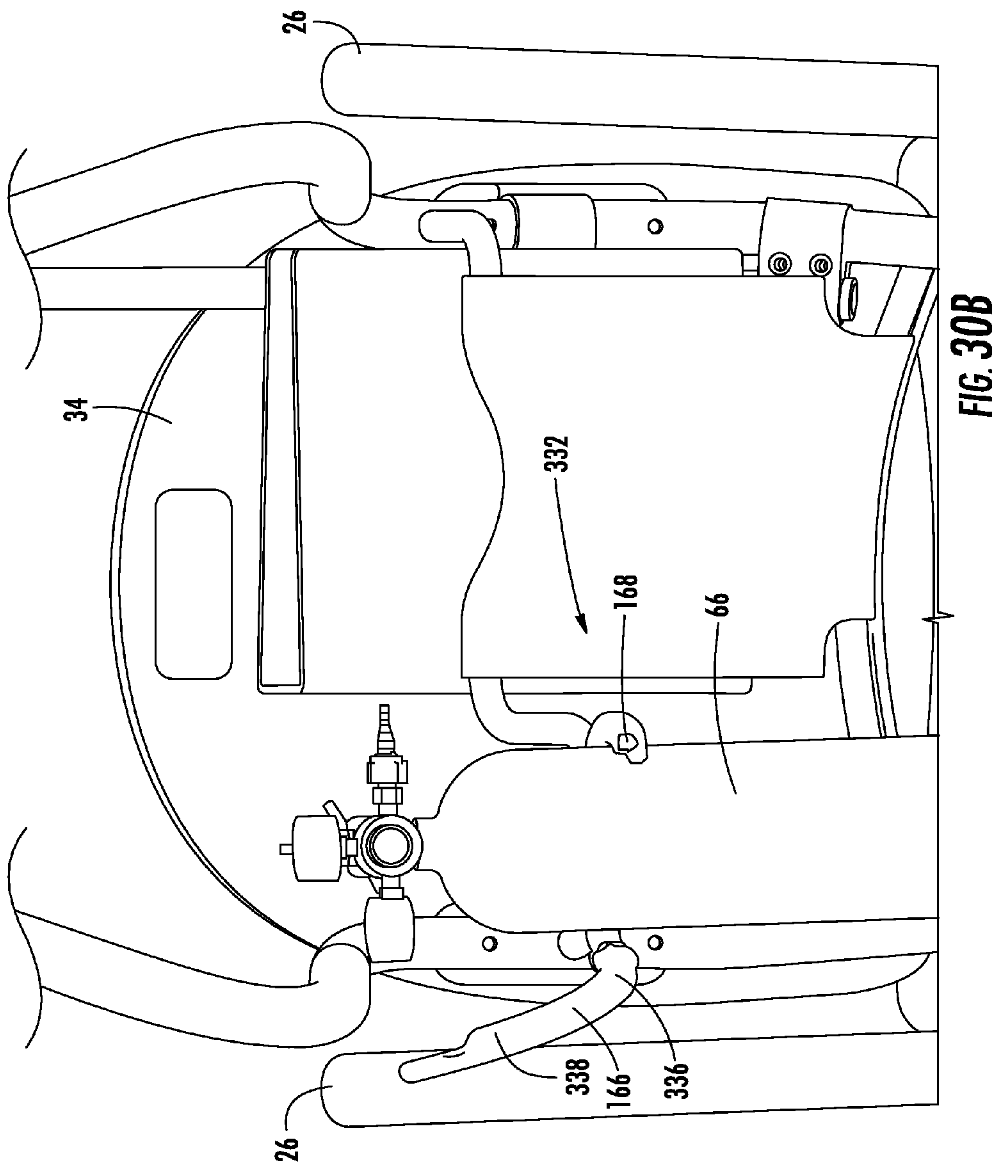
FIG. 30B is a rear view of the transport chair of FIG. 30A showing the top portion of the oxygen bottle holder in the raised position.
Figure 32:
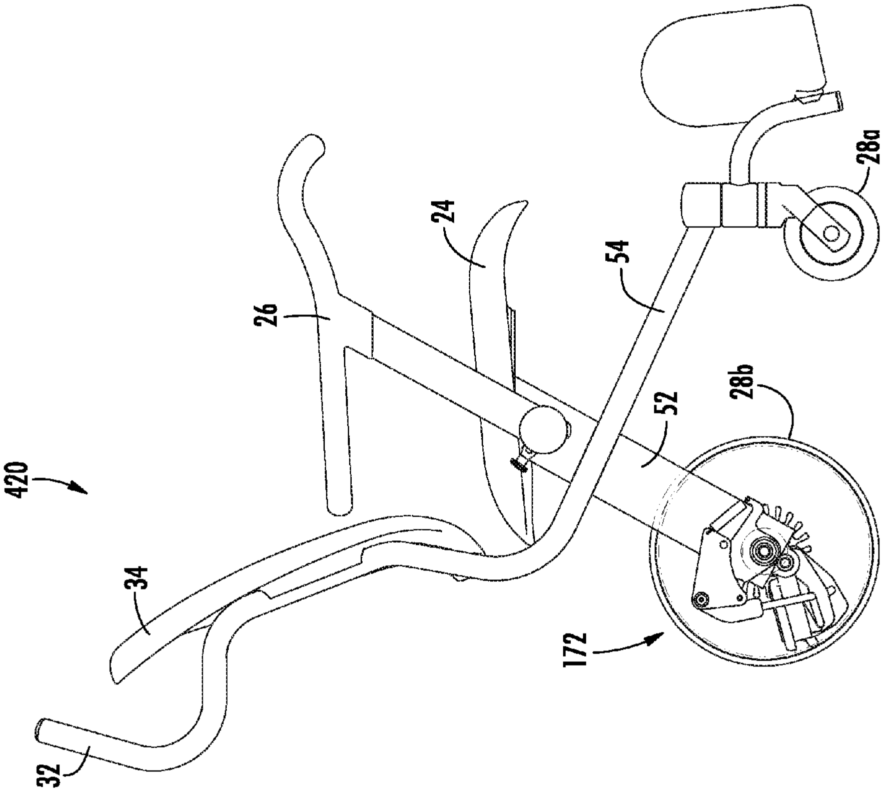
FIG. 32 is a side, elevational view of the transport chair of FIG. 31 showing one rear wheel in phantom in order to better illustrate some of the braking structure.
Figure 31:
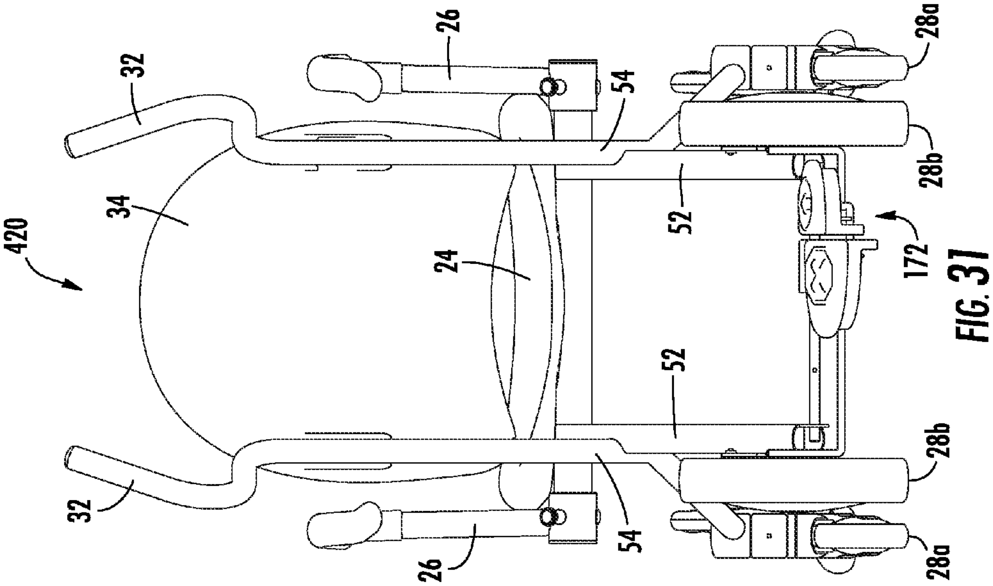
FIG. 31 is rear, elevational view of the wheeled transport chair of FIG. 11 shown with a brake pedal pressed.

FIGS. 29A-30B illustrate another alternative embodiment of a bottle holder 330 that may be used on any of the transport chairs discussed herein. Bottle holder 330 includes a base 134 that is, in one version, the same as base 134 of bottle holder 130. Bottle holder 330 further includes an upper portion 332 that is modified from the upper portions 132 and 132' of bottle holder 130. More specifically, upper portion 332 includes a movable arm 166 that is pivotable between a locked position (FIGS. 29A, 30A) and an unlocked position (FIGS. 29B, 30B). Movable arm 166 pivots between the locked and unlocked positions by a user grasping the arm 166 and either raising it or lowering it. When in the raised (unlocked) position of FIGS. 29B and 30B, a user may either insert a bottle 66 into upper portion 332, or remove a bottle 66 therefrom. When in the lowered (locked) position of FIGS. 29A and 30A, the arm 166 prevents the bottle 66 from being moved into or out of the upper portion 332.

Movable arm 166 may include a latching mechanism positioned adjacent its free end that releasably interacts with a stationary end 168 of upper portion 332 (FIG. 30B). The latching mechanism can be a magnet that magnetically couples to a magnet positioned on stationary end 168 to releasably hold movable arm 166 in the lowered position. Alternatively, the latching mechanism can be a pin that fits into a hole, wherein one of the pin and hole is defined on one of arm 166 and stationary end 168, and the other of the pin and hole is defined on the other of the arm 166 and stationary end 168. Other latching mechanisms may also be used, such as, but not limited to, hook and loop type fasteners (e.g. Velcro), snaps, or other types of structures.

Movable arm 166 pivots about a pivot axis 334 (FIG. 29A) that is angled with respect to horizontal. More specifically, pivot axis 334 slopes downwardly toward the ground in the front-to-back direction. This downward angle of pivot axis 334 helps provide clearance for movable arm 166 when it is raised or lowered while bottle 66 is present so that arm 166's range of motion will not be blocked by bottle 66. Additional clearance is also provided by the shape of movable arm 166. Rather than being curved in an arcuate shape of a constant radius, movable arm 166 is constructed to be curved in a manner wherein the radius of curvature is varied. More specifically, and as can be better seen in FIG. 29B, movable arm includes a first curved section 336 closest to pivot axis 334 and a second curved section 338 that is positioned closer to the free end of movable arm 166. First curved section 336 has a smaller radius of curvature than second curved section 338. This difference in curvature may be defined by way of discrete differences, i.e. there may be a total of two different radii (or another discrete number of different radii), or this difference in curvature may be continuous, i.e. there may be radii that continuously vary. Whether discrete or continuous (or combinations thereof), the different radii of curvature help to ensure that movable arm 166 is not prevented from moving to the locked position when a bottle 66 is held by holder 330.

It will be understood by those skilled in the art that, although bottle holders 130 and 330 have been described herein as being used for holding an oxygen bottle, any bottle or other structure—whether containing oxygen or some other substance—that are desirably transported with a patient on a transport chair may be secured to the transport chair by way of bottle holders 130 or 330. It will also be understood that, although trigger 136 has been described herein only in conjunction with upper portion 132', trigger 136 could also be adapted to be used with upper portion 332. When so adapted, upper portion 332 would include one or more springs, or other devices, that automatically lowered movable arm 166 into the downward, or locked position, (e.g. FIG. 28B) when a user inserted the upper end of an oxygen bottle into upper portion 332. Further, one or more additional springs, or other devices, could be added that—after movable arm 166 was manually lifted to the raised, or unlocked position—retained movable arm in this raised position until such time as a user inserted another bottle into upper portion 332 and thereby once again activated the trigger 136. Still other variations are possible.

Brake and Release Pedals

FIGS. 31-34 illustrate in greater detail a braking system 172 that, as illustrated, is incorporated into transport chair 420. It will be understood that braking system 172 is not limited to being used with transport chair 420, but instead can be incorporated into any of the different transport chair embodiments disclosed herein. FIGS. 35-42 illustrate in detail an alternative brake system 372 that also may be used on any of the transport chairs described herein, including, but not limited to, chair 420. It will also be understood that braking systems 172 and 372 can be used on other medical devices besides transport chairs and wheelchairs, such as, but not limited to, cots, stretchers, beds, gurneys, or any other medical device having wheels that are desirably braked and unbraked.

Transport chair 420 includes a brake pedal 126 and a release or go pedal 128 (FIGS. 31-34). Brake pedal 126 prevents rear wheels 28*b* from rotating when brake pedal 126 is pressed. Pressing release or go pedal 128 causes the brake pedal 126 to be released, and thereby allows rear wheels 28*b* to freely rotate. Front wheels 28*a*, in the illustrated embodiments, are casters that are both freely rotatable and freely swivelable at all times. In some embodiments, however, brake pedal 126 also activates brakes on front wheels 28*a* so that all four wheels 28 are braked. In such cases, release pedal 128 will release all four brakes when it is pressed.

FIGS. 31-34 illustrate one manner of constructing brake system 172. Brake system 172 is constructed using a pin-and-slot type of arrangement wherein a pin is inserted into a slot in order brake wheels 28*b* and removed therefrom in order to allow rotation of wheels 28*b*. It will be understood by those skilled in the art, however, that different types of brake systems 172 may be used, such as, but not limited to, drum brakes, disc brakes, other types of frictional brakes, and/or still other types of brakes.

Figure 33:
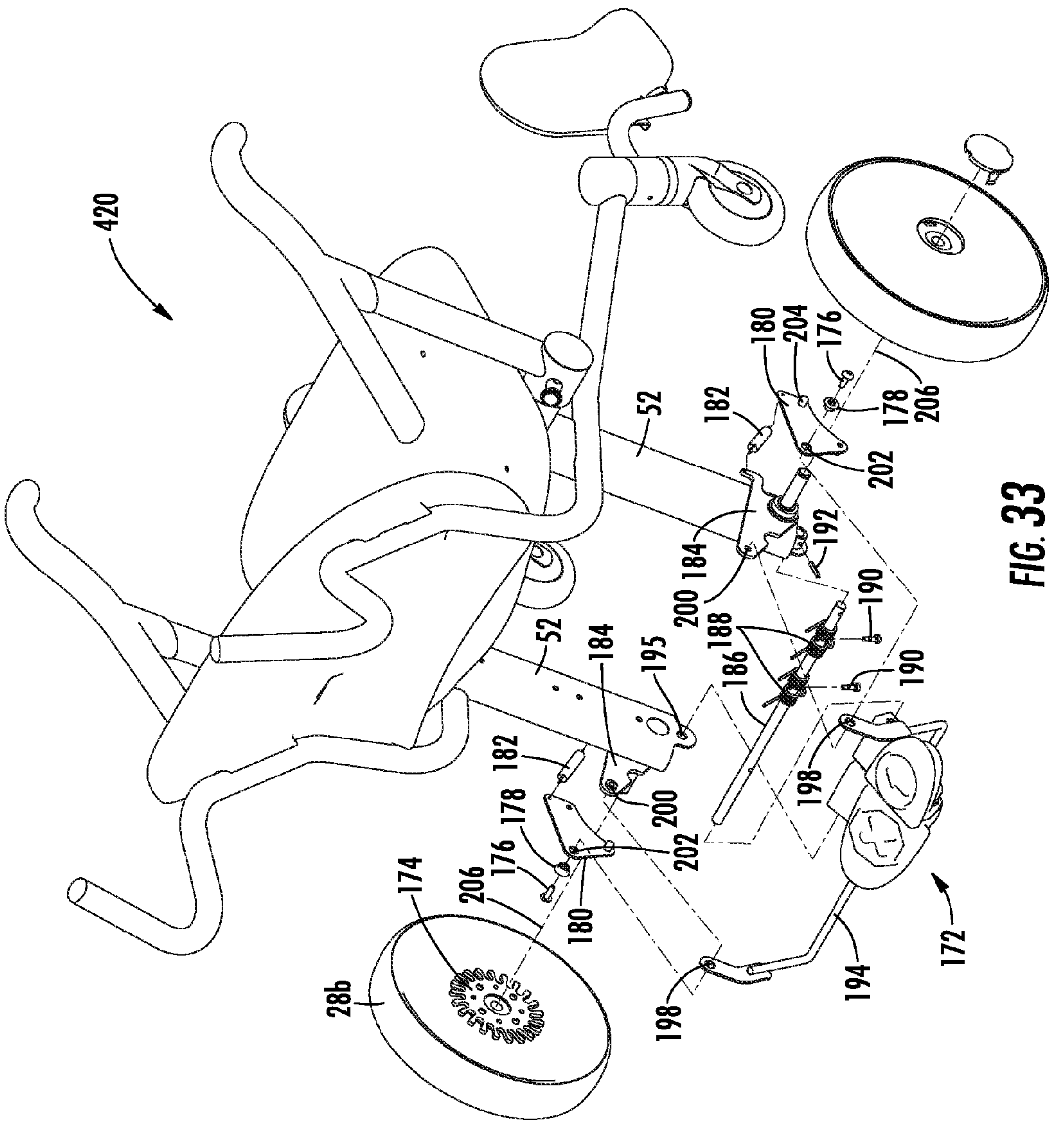
FIG. 33 is a perspective, exploded view of the braking system of the chair of FIG. 31.
Figure 34:
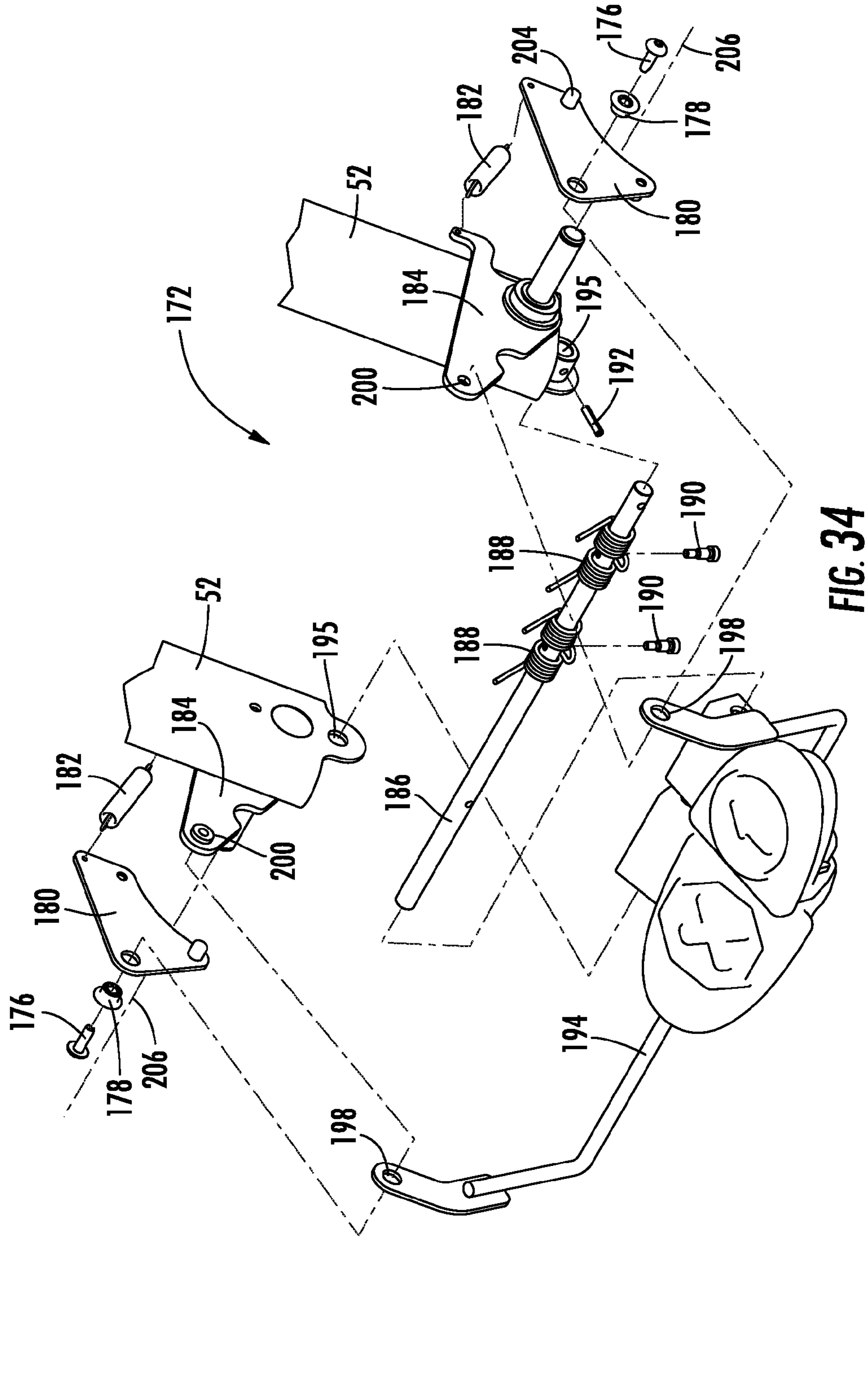
FIG. 34 is a close up perspective, exploded view of the braking system of the chair of FIG. 31.
Figure 35:
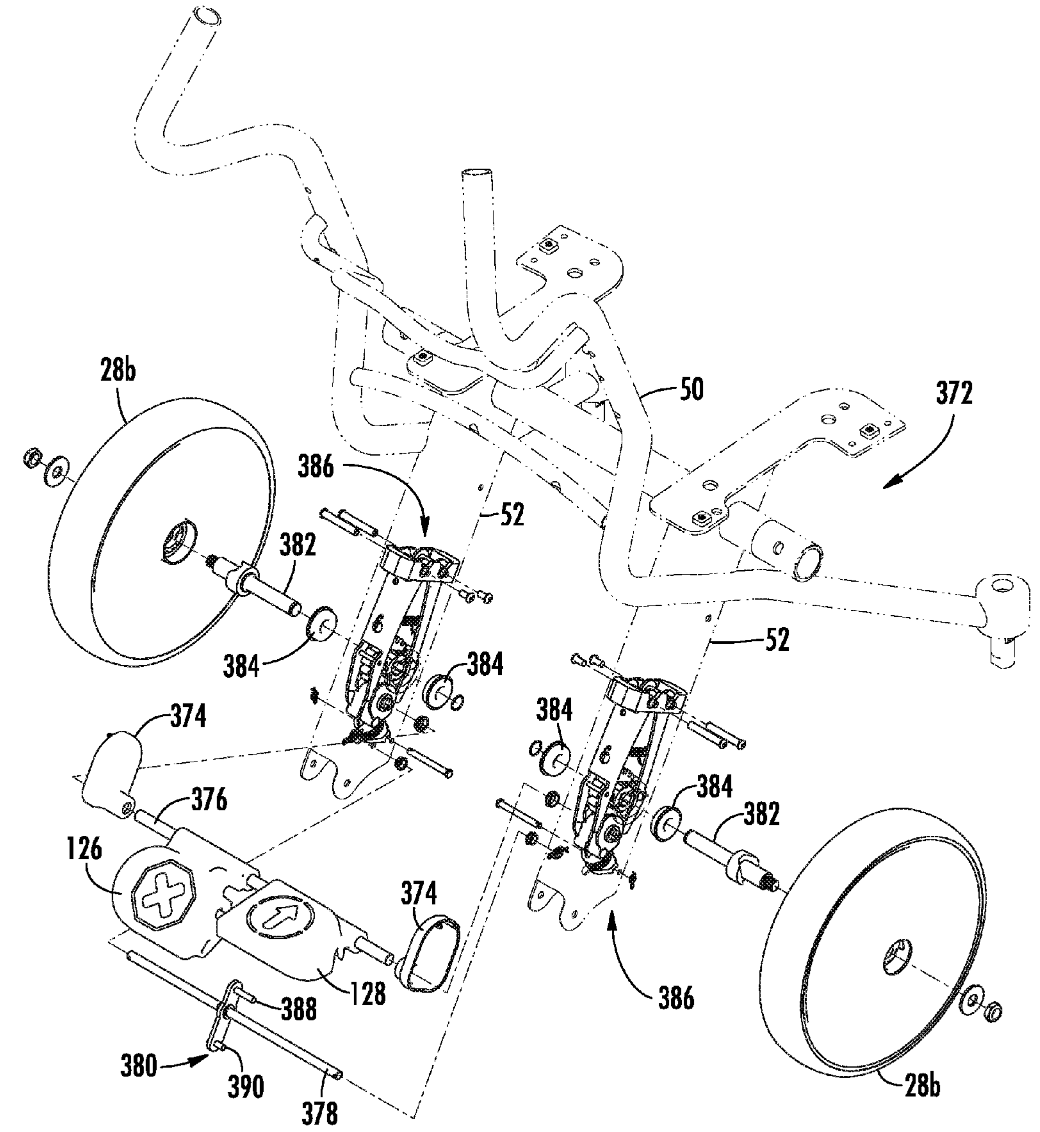
FIG. 35 is an exploded perspective view of an alternative braking system that may be used in any of the transport chair embodiments disclosed herein.

As best seen in FIGS. 33 and 34, brake system 172 includes a pair of toothed wheels 174, a pair of screws 176, a pair of bushings 178, a pair of brake pin links 180, a pair of springs 182, a pair of stationary mounting brackets 184, a brake rod 186, a pair of torsion springs 188, a pair of shoulder bolts 190, a spring pin 192, and a brake link 194. Spring pin 192 secures brake rod 186 within a pair of brake link apertures 195 defined at the lower ends of rear legs 52. Spring pin 192 connects brake rod 186 to legs 52 in a non-rotational manner. That is, brake rod 186 does not rotate, but instead remains in a fixed position. Brake link 194 is rotatably secured to mounting brackets 184 by screws 176 that are inserted through bushings 178 and link apertures 198 defined at each end of brake link 194. Screws 176 further extend into apertures 200 defined in mounting brackets 184. Apertures 200 may be internally threaded to threadingly receive screws 176 and secure screws 176 to mounting brackets 184. Screws 176 further extend through brake link apertures 202 defined in each brake pin link 180. This connection allows brake pin links 180 to rotate about a generally horizontal pivot axis that is aligned with the longitudinal extent of screws 176.

Each brake pin link 180 includes a brake pin 204 on its outward side that selectively fits between pairs of teeth on toothed wheels 174 in order to selectively brake chair 420. Springs 182 each bias brake pin links 180 such that each brake pin 204 is urged radially toward the rotational axis 206 of rear wheels 28*b*. Thus, each spring 182 urges each brake pin 204 towards a braking position. When brake pedal 126 is pressed, it enables each brake pin link 180 to rotate such that spring 182 is free to insert a brake pin 204 defined on each brake pin link 180 between the nearest pair of teeth on toothed wheels 174. The downward movement of brake pedal 126 does not force brake pin 204 into the space between pairs of teeth on toothed wheels 174. Instead, the force of springs 182 urges pin 204 into these inter-teeth spaces. Thus, if transport chair 420 is positioned such that brake pins 204 are not precisely aligned with a space between teeth on toothed wheels 174, it is not necessary for a caregiver to supply sufficient force to move chair 420 slightly (which may be difficult due to the weight of the patient, and/or the transport chair being positioned on an incline) in order to change the alignment of pins 204 with toothed wheels 174. Instead, this force is supplied by springs 182 and, if pins 204 are not precisely aligned with the spaces between teeth on wheels 174, any slight rolling of chair 420 will bring about an alignment of pins 204 with the inter-tooth spaces on wheels 174, at which point springs 182 will insert the pins 204 between the teeth, thereby braking chair 420. Such rolling movement does not need to occur immediately at the time of pressing brake pedal 126, but may occur at any time after brake pedal 126 is pressed. As soon as such movement occurs, pins 204 will be urged by springs 182 into spaces between the teeth on wheel 174, thereby locking wheels 28*b* and preventing any further movement.

Brake system 172 therefore avoids the requirement that a user must press down on brake pedal 126 with sufficient force to urge pins 204 between the teeth on wheel 174. As a result, the amount of force necessary to push down on brake pedal 126 is the same, regardless of whether pins 204 are aligned with spaces between the teeth on wheel 174 or not. This gives the user of the transport chair a consistent feel when using brake pedal 126. It also avoids the problem of some prior art toothed-wheel-and-pin braking systems where, depending upon the relative position of the pin and toothed wheel when the brakes are applied, the user may have to apply an enormous force to activate the brakes in some cases, and may only have to apply a small force in other cases.

Pressing release pedal 128 will rotate brake rod 186 and brake pin links 180 such that pins 204 are moved out of engagement with toothed wheel 174, thereby allowing rear wheels 28*b* to freely rotate. The pressing of release pedal 128 and rotation of brake pin links 180 will overcome the spring forces exerted by springs 182 such that pins 204 are able to move out of engagement with toothed wheel 174. Generally speaking, a portion of the energy expended by the user in fully pushing release pedal 128 down will be devoted to stretching springs 182, which will therefore store this energy as potential energy that is later used to urge the pins 204 back into engagement with toothed wheels 174 when brake pedal 126 is later pressed. Release pedal 128, when pressed, will remain in the pressed condition by way of a slot (not shown) defined on the underside of release pedal 128. Similarly, brake pedal 126 will remain in the pressed condition when pressed by way of a slot (not shown) defined on the underside of brake pedal 126. Torsion springs 188 each urge brake pedal 126 and release pedal 128 toward their upward positions so that, when one pedal is pressed, the other is released (i.e. moved upward). Thus, pressing brake pedal 126 will cause release pedal 128 to be released (i.e. moved upward). Similarly, pressing release pedal 128 will cause brake pedal 126 to be released.

As noted, brake system 172 is configured such that at least some of the energy required to press release pedal 128 is stored as potential energy in springs 182. This potential energy remains stored in springs 182 until a user presses brake pedal 126. Upon pressing brake pedal 126, the movement of brake rod 186 and brake pin links 180 allows springs 182 to pull brake pins 204 into locked engagement with toothed wheels 174, thereby releasing the potential energy. Such potential energy is therefore stored while the chair is free to be pushed, and released when braked.

FIGS. 35-42 illustrate an alternative brake system 372 that may be used on any of the transport chair embodiments discussed herein. Brake system 372, like brake system 172, includes a brake pedal 126 and a go pedal 128, and pressing on brake pedal 126 prevents rotation of rear wheels 28*b*. Further, pressing on go pedal 128 automatically causes the release of brake pedal 126, thereby enabling rear wheels 28*b* to freely rotate. Brake system 372, like brake system 172, is based upon a toothed gear and pin system, although brake system 372 uses multiple sets of pins, unlike brake system 172. Brake system 372 differs from brake system 172 in that, among other things, brake system 372 is contained within rearward legs 52 of frame 22. Legs 52 thereby provide a housing for brake system 372 that helps shield it from dirt, dust, and other contaminants, as well as providing a more visually pleasing exterior. Further, rearward legs prevent objects from getting caught in the toothed gears, and other components, of brake system 372. The detailed construction of brake system 372 will now be described.

In addition to go pedal 128 and brake pedal 126, brake system 372 further includes a pair of bearing covers 374, a brake shaft 376, a toggle shaft 378, a toggle link 380, a pair of wheel shafts 382, a plurality of roller bearings 384, and a pair of brake gear assemblies 386. Toggle shaft 378 and toggle link 380 operate to pivot upwardly one or the other of brake pedal 126 and go pedal 128. That is, toggle shaft 378 and toggle link 380 toggle the up and down pressing of pedals 126 and 128 so that only one of these pedals can ever be pressed at a given moment. Pressing on the pedal that is currently raised will cause that pedal to lower while simultaneously causing the other pedal to release (move upward). This toggling action is accomplished through an upper pin 388 and a lower pin 390 defined on toggle link 380.

Figure 41:
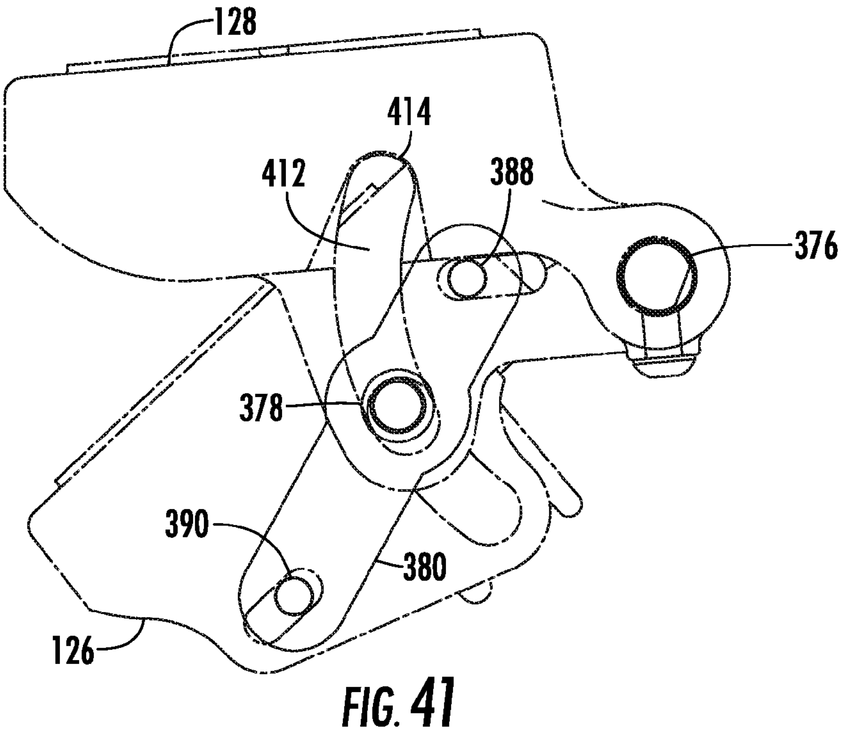
FIG. 41 is a side, elevational view of the pedals of FIG. 35 showing the brake pedal pressed.
Figure 42:
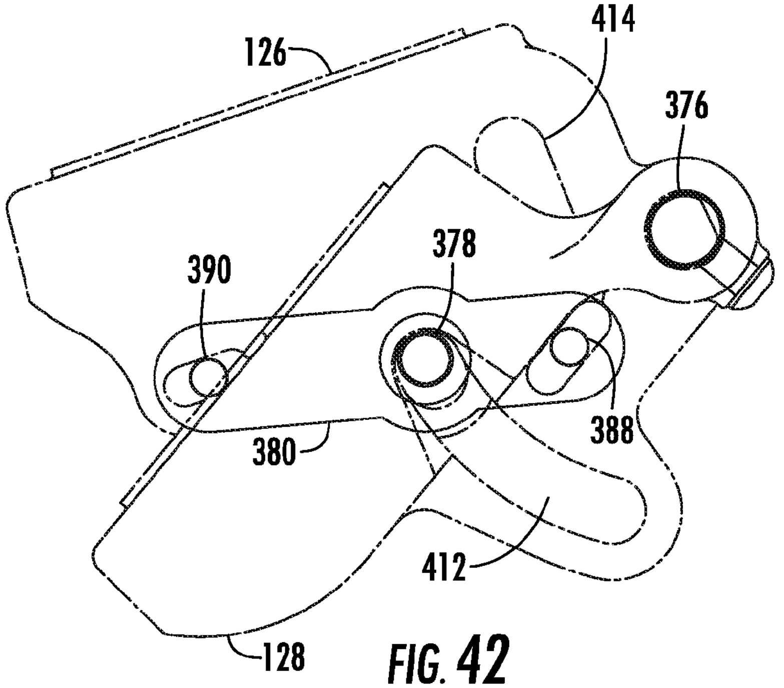
FIG. 42 is a side, elevational view of the pedals of FIG. 41 showing the go pedal pressed.

As can more easily be seen in FIGS. 41 and 42, toggle link is rotatable about the pivot axis defined by toggle shaft 378. In the braked position shown in FIG. 41, lower pin 390 is position at a location lower than the pivot axis of toggle shaft 378. When a user presses on the go pedal, the downward force exerted by the user on the go pedal is transferred to upper pin 388, which in turn causes link 380 to rotate clockwise (in FIGS. 41 and 42). This clockwise rotation causes lower pin 390 to move upwardly, thereby causing brake pedal 126 to move upwardly and thereby release the brake (in a manner to be described below). Brake pedal 126 and go pedal 128 are held in either the up or down configuration by way of a pair of springs, brake cam link assemblies, and a brake cam spring pads that are contained within each brake gear assembly 386, as will be discussed in greater detail below.

Figure 36:
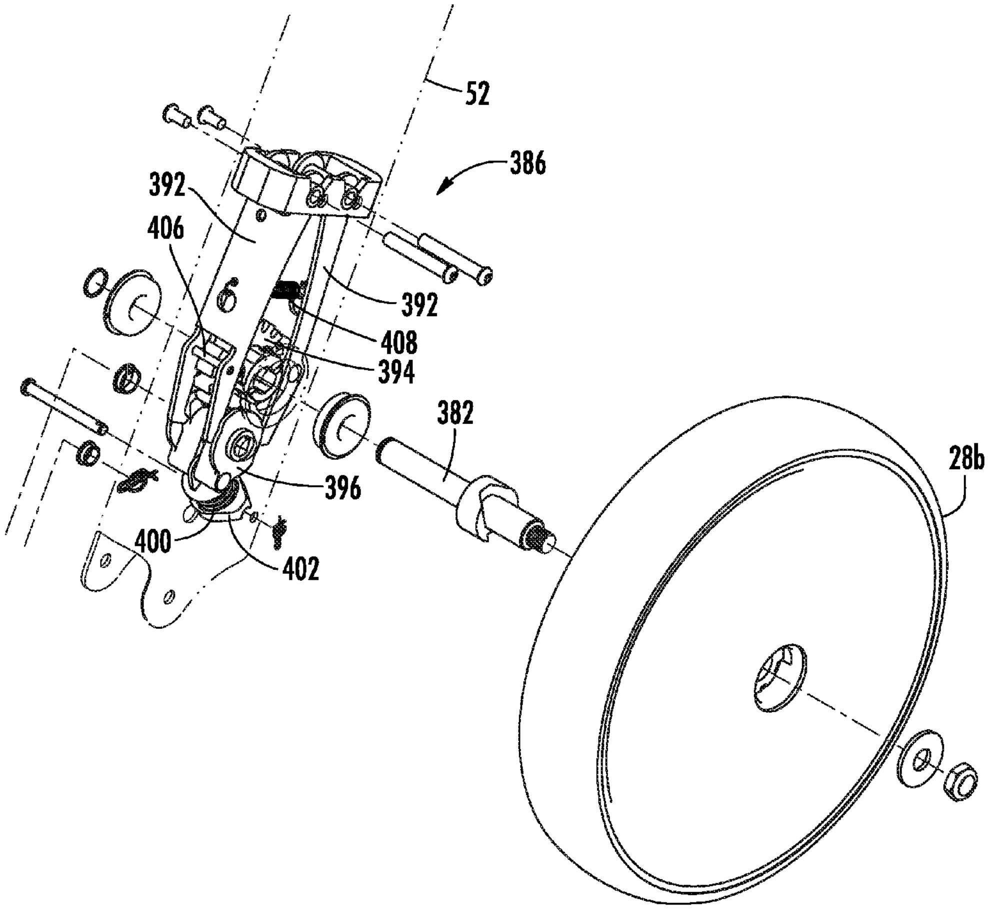
FIG. 36 is a close up perspective view of some of the components of the braking system of FIG. 35.
Figure 37:
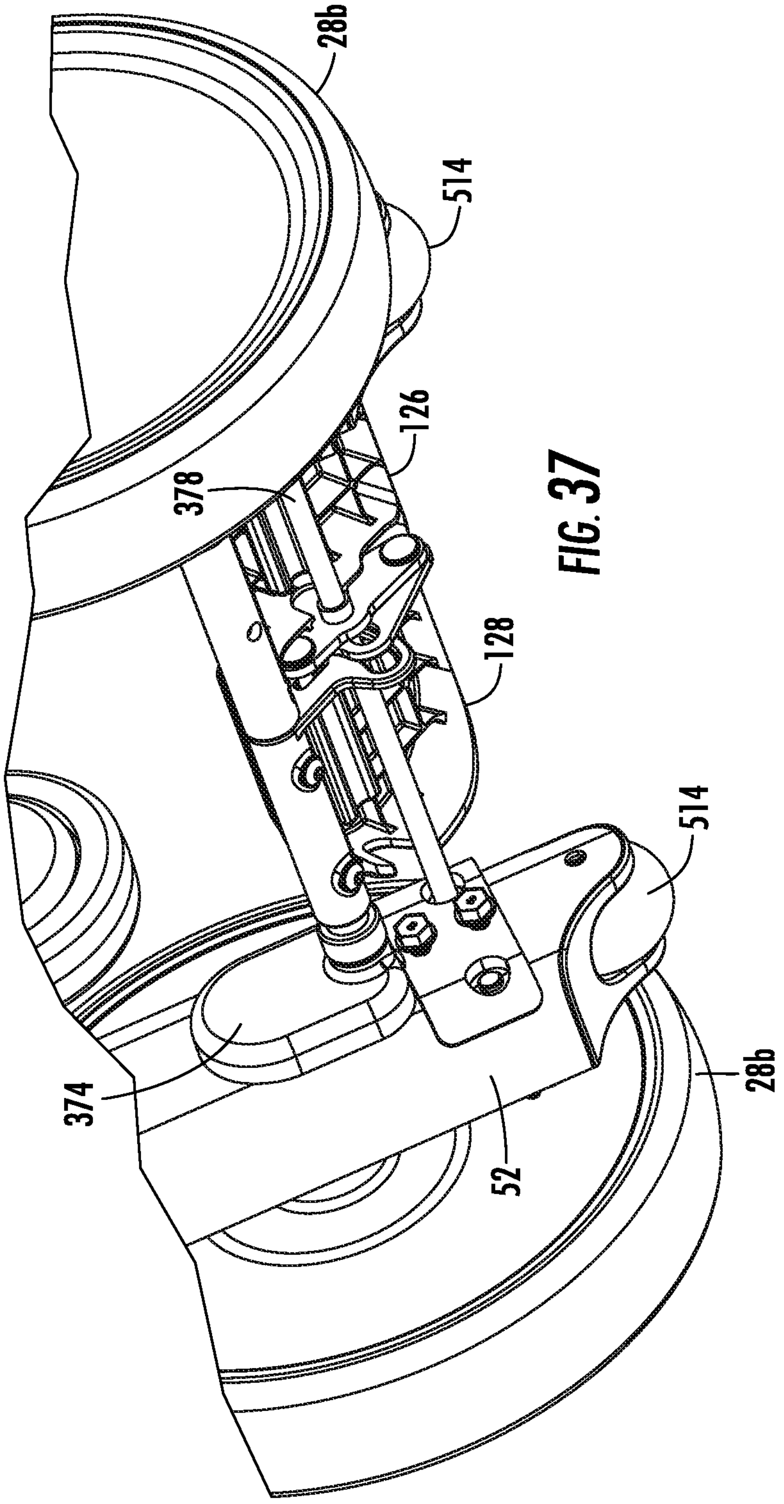
FIG. 37 is perspective view of the underside of the braking system of FIG. 35 shown coupled to a transport chair.
Figure 38:
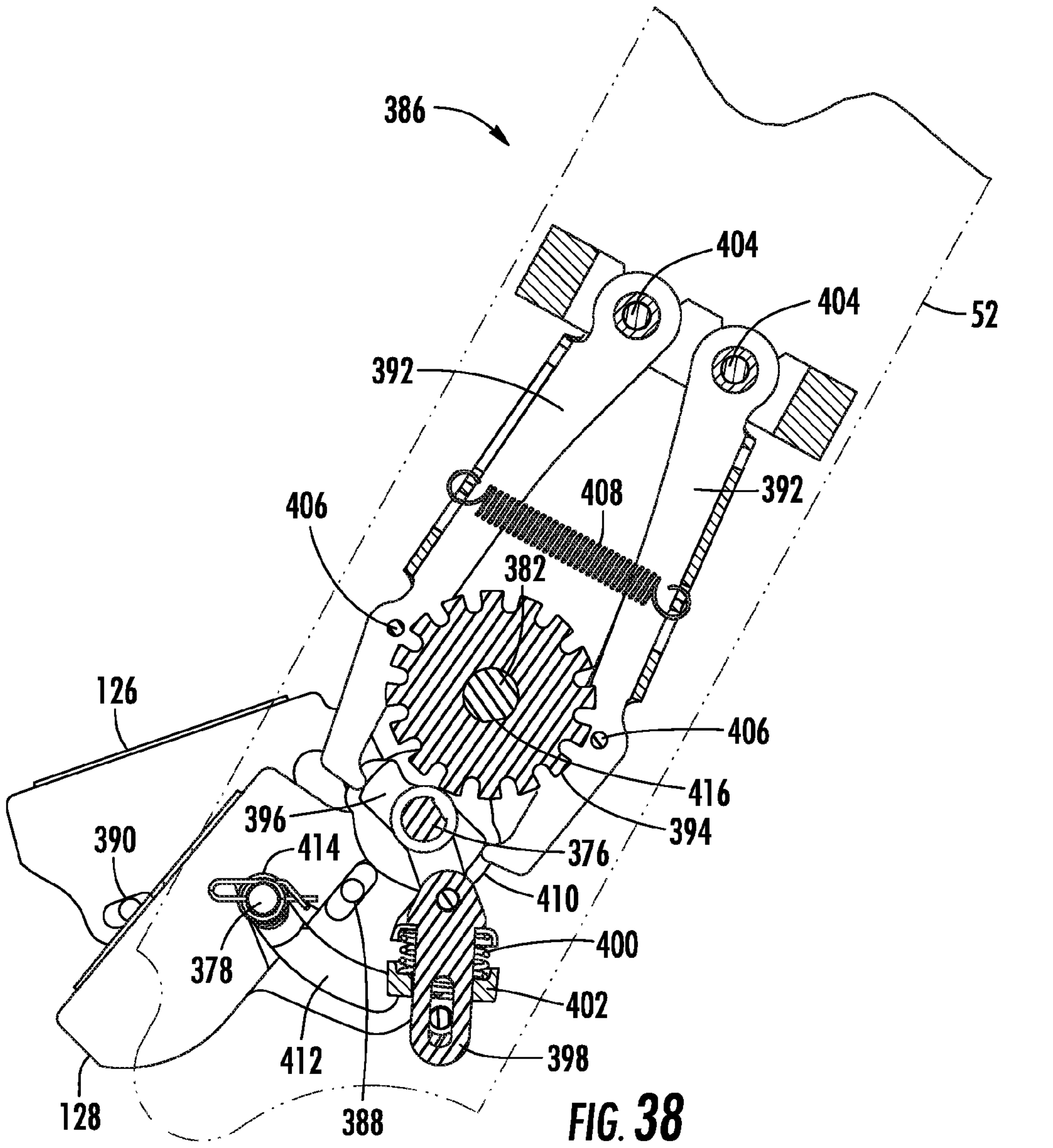
FIG. 38 is a side, elevational view of some of the braking system components of FIG. 35 showing the brakes in a disengaged state.
Figure 39:
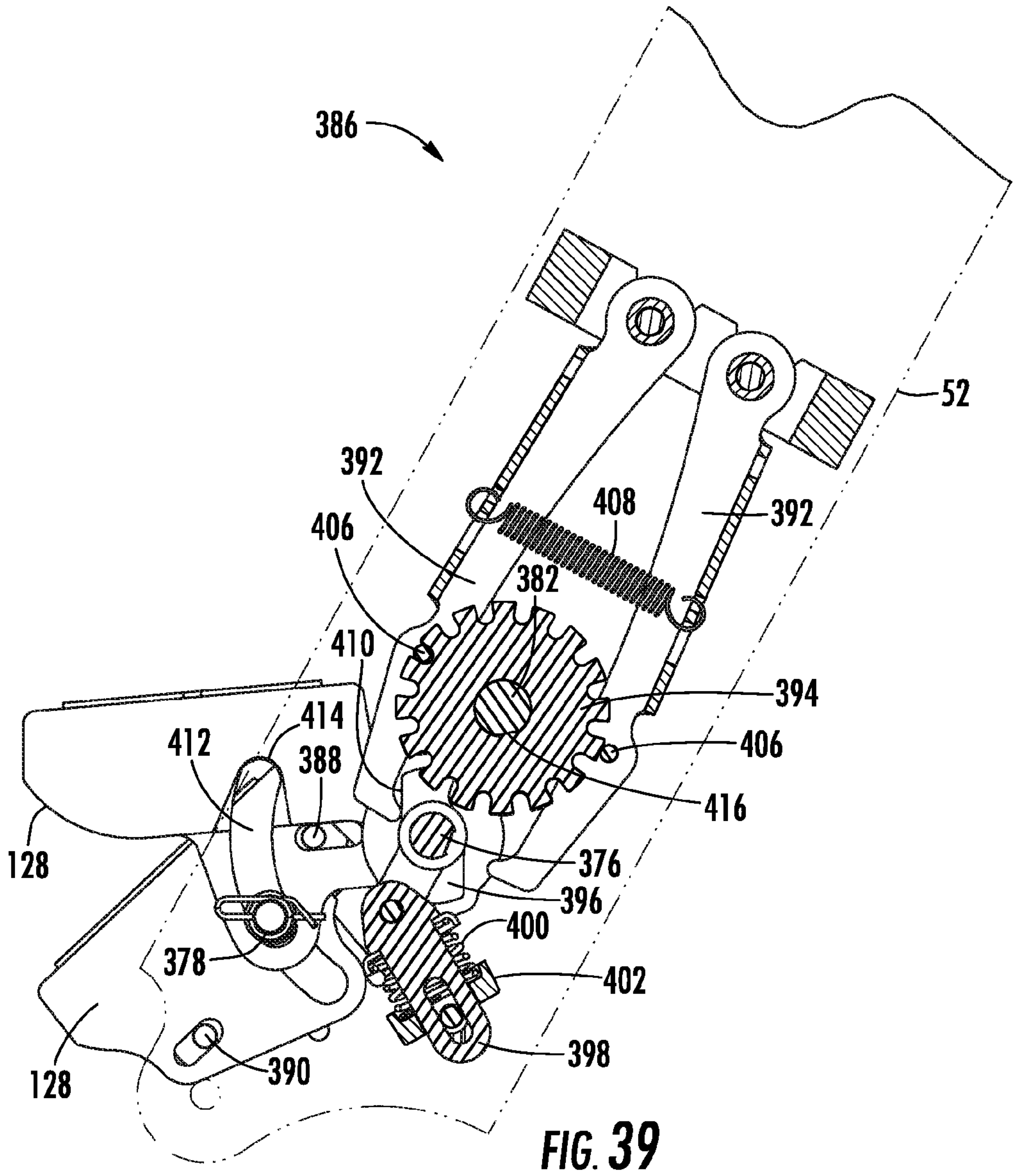
FIG. 39 is a side, elevational view of the braking components of FIG. 38 showing the brakes in an engaged state.

As can be seen more clearly in FIGS. 36 and 38-39, each brake gear assembly 386 includes a plurality of components that are positioned inside of each respective rear leg 52 of frame 22. These components include a pair of brake fingers 392, a toothed wheel 394, a brake cam 396, a brake cam link assembly 398, a spring 400, and a brake cam spring pad 402. Each brake finger 392 is pivotable about a brake finger pivot axis 404. Further, each brake finger 392 includes a braking pin 406 that has a longitudinal axis that extends out of the plane of FIGS. 38 and 39. When the transport chair is in the braked condition, one of the braking pins 406 from each set of brake fingers 392 will be positioned in one of the slots defined in toothed wheel 394. As shown in FIG. 39, which illustrates brake gear assembly 386 in the braked position, the braking pin 406 from the left brake finger 392 is positioned between a pair of teeth defined on toothed wheel 394. Toothed wheel 394 is fixedly attached to wheel shaft 382 such that, when toothed wheel 394 is prevented from rotating (by way of a pin 406), wheel shaft 382 is also prevented from rotating. Still further, wheel shaft 382 is fixedly attached to one of the rear wheels 28*b*. Consequently, when a pin 406 prevents toothed wheel 394 from rotating, the attached rear wheel 28*b* is also prevented from rotating, and is thus in a braked condition.

As can be seen more clearly in FIGS. 38 and 39, pins 406, brake fingers 392, and toothed wheel 394 are constructed such that only a single pin 406 may engage the teeth of toothed wheel 394 at any given time. That is, pins 406 are positioned so as to be at staggered locations with respect to the spaces between teeth on toothed wheel 394. If one of the pins 406 is contacting the crest of one of the teeth, and is thus prevented from inserting itself in the gap between adjacent teeth, the other of the pins 406 will be positioned between a pair of teeth, and therefore able to insert itself a pair of teeth. By having pins 406 oriented in this staggered condition, it effectively doubles the number of teeth, thereby reducing the total number of angular orientations the rear wheels 28*b* may have where one of pins 406 is not able to insert itself between a pair of teeth on wheel 394.

A spring 408 is connected between each set of brake fingers 392 and urges the brake fingers 392 toward each other. This urging also urges the brake pins 406 radially toward the center of toothed wheel 394. When one of the pins 406 is aligned with one of the spaces between adjacent teeth, spring 406 will therefore urge that pin 406 into that space and keep the pin there until a user presses the go pedal 128. As will be discussed in greater detail below, when a user steps on go pedal 128, fingers 392 are forced apart, causing spring 408 to stretch, and also causing the one pin 406 that is lodged in toothed wheel 394 to become dislodged. A person stepping on go pedal 128 therefore must press down with sufficient force to stretch spring 408. As a result, spring 408 will store potential energy while the go pedal is pressed, and release this energy when the brake pedal is pressed. The released energy will cause fingers 392 to pivot toward each other, and one of pins 406 will become lodged in toothed wheel 394.

As with brake system 172, the user who pushes down on brake pedal 126 does not directly force any of pins 406 into the slots of toothed wheel 394. This means that, in those situations where neither one of pins 406 may not be perfectly aligned with a slot, the user does not have to push down on the brake pedal with any additional force in order to force one or both rear wheels 28*b* to rotate a small amount so that one of pins 406 will become aligned with a slot. Instead, the user pushes down on the brake pedal 126 with the same amount of force regardless of whether or not any pins 406 are aligned with the slots on wheel 394. If none are aligned, then the chair won't be braked until one or both of the rear wheels 28*b* rotates sufficiently to allow a pin 406 to enter one of the slots of toothed wheel 394. This, however, will happen automatically due to the force applied by spring 408. Thus, if the chair does not become completely immobile after brake pedal 126 is pressed, it will become completely immobile once one or both of the rear wheels 28*b* rotate a tiny amount.

The manner by which fingers 392 are forced apart when the go pedal 128 is pressed can be more easily understood with respect to FIGS. 38-39. Pressing on the go pedal 128 causes brake shaft 376 to rotate, as was discussed above. This rotation, in turn, causes brake cam 396 to rotate. Brake came 396 includes a cam surface 410 that engages the ends of brake fingers 392. Because of the shape of cam surface 410, when brake cam 396 is oriented as shown in FIG. 38 (unbraked condition), fingers 392 will be forced apart by cam surface 410 sufficiently far so that neither pin 406 is positioned in a slot of toothed wheel 394. When brake cam 396 is rotated, however, as shown in FIG. 39, the shape of cam surface 410 allows fingers 392 to move closer to each other (as urged by spring 408), thereby enabling one of pins 406 to enter a slot on toothed wheel 394.

Spring 400, spring pad 402, and brake cam link assembly 394 function to keep brake cam 396 in either the braked orientation or the unbraked orientation. That is, these elements prevent the brake system from staying in an intermediate position where the system is neither completely braked or completely free. When either the brake pedal 126 or the go pedal is pressed, spring 400 is compressed, and thus exerts an expansive force against brake cam link assembly 398. This expansive force will translate into either a clockwise or counterclockwise rotational force against brake cam 396. More specifically, when the brakes are engaged, spring 400 will exert a clockwise force on brake cam 396, as shown in FIG. 39. When the brakes are disengaged, spring 400 will exert a counterclockwise force on brake cam 396, as shown in FIG. 38. In either case, the force of spring 400 will act to resist toggling of brake and go pedals 126 and 128. A channel 412 defined in each of the bodies of pedals 126 and 128 will prevent further rotation of brake cam 396 in the direction it is being urged by spring 400. More specifically, as can be seen in FIGS. 41-42, an upper end 414 of each channel 412 will define the amount of allowable rotation of brake cam 396, and will therefore limit the rotation of brake cam 396 between the range defined in FIGS. 38 and 39.

Figure 40:
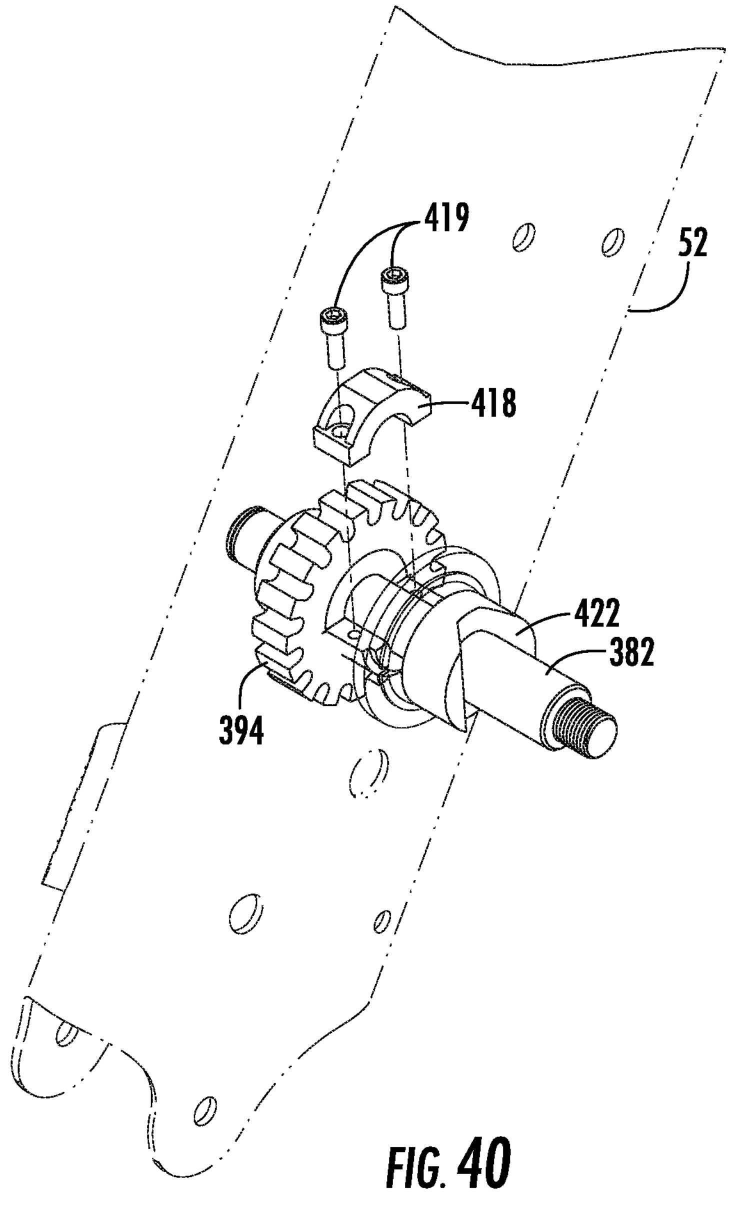
FIG. 40 is a perspective view of the braking disc and collar of the braking structure of FIG. 35.

FIG. 40 illustrates in better detail the manner in which each toothed wheel 394 and each rear wheel 28*b* are coupled together. Because the rear wheel 28*b* is positioned outside of rear leg 52, while the toothed wheel 394 is positioned inside of the rear leg 52, the toothed wheel 394 and rear wheel 28 cannot be directly attached to each other. Because of this lack of direct coupling, there is the potential for an undesirable amount of mechanical slop between the toothed wheel 394 and the rear wheel 28*b*. That is, there is the potential that, while toothed wheel 394 is prevented from rotating by one of pins 406, the corresponding rear wheel 28*b* might be able to rotate a small amount because of the indirect coupling of the rear wheels 28*b* to the toothed wheel. This would otherwise give the transport chair an undesirable feel when the brake was activated because each rear wheel 28*b* would still be able to rotate a tiny amount. This would also have the potential for giving the patient less confidence in the stability of the chair when he or she was exiting and entering the chair, in which case he or she might not place as much force on, or otherwise rely on the stability of, the transport chair. This could then make entering and exiting the chair more difficult for the patient.

Consequently, it is desirable to reduce the amount of mechanical slop between the rear wheels 28*b* and their corresponding toothed wheels 394. This is accomplished through several design features. First, each wheel shaft 382 includes a flat surface 416 defined in the area where toothed wheel 394 attaches to shaft 382. This flat surface 416 can be seen in FIGS. 38 and 39. Flat surface 416 prevents any rotation of shaft 382 that does not also involve a corresponding amount of rotation of toothed wheel 394. In other words, were the exterior surface of shaft 382 completely round in the area of wheel 394's attachment thereto, it would potentially be possible for wheel 394 to slip on shaft 382. Flat surface 416 prevents any such slippage. Further, toothed wheel 394 is tightly coupled to shaft 382 by way of a collar 418 (FIG. 40) that is secured to toothed wheel 394 by a pair of screws 419, or other suitable fasteners. The tight attachment of toothed wheel 394 to wheel shaft 382, including the engagement between flat surface 416 and toothed wheel 394, means there is very little, if any, mechanical slop between toothed wheel and shaft 382. That is, when one rotates, the other rotates the same amount.

Rear wheels 28*b* are coupled to shaft 382 in a manner that also reduces, or eliminates, any mechanical slop between the wheels and shaft 382. Shaft 382 includes a keyed surface 422 that tightly engages a complementarily shaped keyed surface defined on the interior side of each rear wheel 28*b* (not shown). When a threaded fastener is attached to the threaded end of shaft 382 (after wheels 28*b* is attached to shaft 382), the tightening of the threaded fastener urges the keyed surface of 422 tightly against the corresponding keyed surface of the rear wheel 28*b*, thereby reducing or eliminating any mechanical slop between the rear wheel 28*b* and shaft 382. As a result, when toothed wheel 394 is prevented from rotating by a pin 406, rear wheels 28*b* are also prevented, and have little, if not any, freedom of movement. This provides the user and patient with a stable chair, when braked, to help facility ingress and egress into and out of the chair.

It will be understood that various modifications can be made to brake system 172 and/or brake system 372. For example, while brake system 372 illustrates spring 408 biasing both pins 406 toward toothed wheel 394, system 172 could be modified to have two separate springs, or other biasing mechanisms, so that each pin 408 was biased by its own separate spring or biasing mechanism. Brake system 372 could also be modified to include more than two pins 408 that are urged into braking engagement between the teeth of wheel 394. By including more than two pins 408, the resolution of toothed wheel 394 would be effectively increased, thereby decreasing the amount of rotational movement that wheel 394 (and the rear wheel 28*b* to which it is coupled) could experience prior to at least one of the pins 408 lodging itself between teeth when the brake pedal is pressed. Still further, the alignment of each of the pair of pins 408 relative to toothed wheel 394 within a first one of rear legs 52 could be offset from the alignment of the pair of pins 408 relative to the other toothed wheel 394 within the second rear leg 52. By making the alignment of pins 408 to their adjacent toothed wheel 394 different for each rear wheel 28*b*, the effective resolution of the toothed wheels is increased such that, when the brake pedal is pressed, there are more opportunities for at least one of the pins 408 in one of the rear legs 52 to be aligned an inter-tooth space in its adjacent wheel 394. This will result in increasing the probability that, when the brake pedal is pressed, at least one of the two rear wheels 28*b* will immediately lock without any further rotation of the wheels 28*b*, while the other rear wheel will thereafter lock when it rotates sufficiently to allow one of its corresponding pins 408 to insert itself into the adjacent toothed wheel 394.

In yet another modification, brake system 372 could be modified so that both pins 408 are positioned at the same relative orientation to the teeth of wheel 394. When so positioned, both pins 408 will either be jointly inserted between different pairs of teeth on wheel 394, or they will jointly be out misaligned with the space between different pairs of teeth on wheel 394. Although such a modification would decrease the overall resolution of the slots on the toothed wheel 394, the use of multiple pins simultaneously lodged in these slots could provide increased braking strength. Further, the loss of resolution could be mitigated by having the pins 408 in one rear leg 52 offset from the pairs of pins 408 in the other rear leg 52, as discussed above.

In yet another modification, brake system 172 and/or 372 can be modified to use different brake activation and brake de-activation structures than the brake pedal 126 and release pedal 128. For example, in one embodiment, the control of the brakes is carried out using hand controls, instead of foot controls. That is, instead of activating and deactivating the brakes by pressing on pedals with a foot, the user activates and deactivates the brakes by manipulating a control using his or her hands. Such controls may be positioned at any suitable location on the transport chair where a user is able to touch the controls without having to bend over, or otherwise make uncomfortable movements. As but one example, handles 32 could include—or have positioned adjacent thereto—one or more buttons, switches, pivotable members, or other structures that, upon pushing, switching, or pivoting, activate and/or deactivate the brakes. The transmission of the movement of these controls to the area adjacent rear wheels 28*b* and toothed wheels 194, 394 could be carried out in any suitable manner, such as, but not limited to, one or more Bowden cables. Still other variations are also possible.

Footrests

Figure 43:
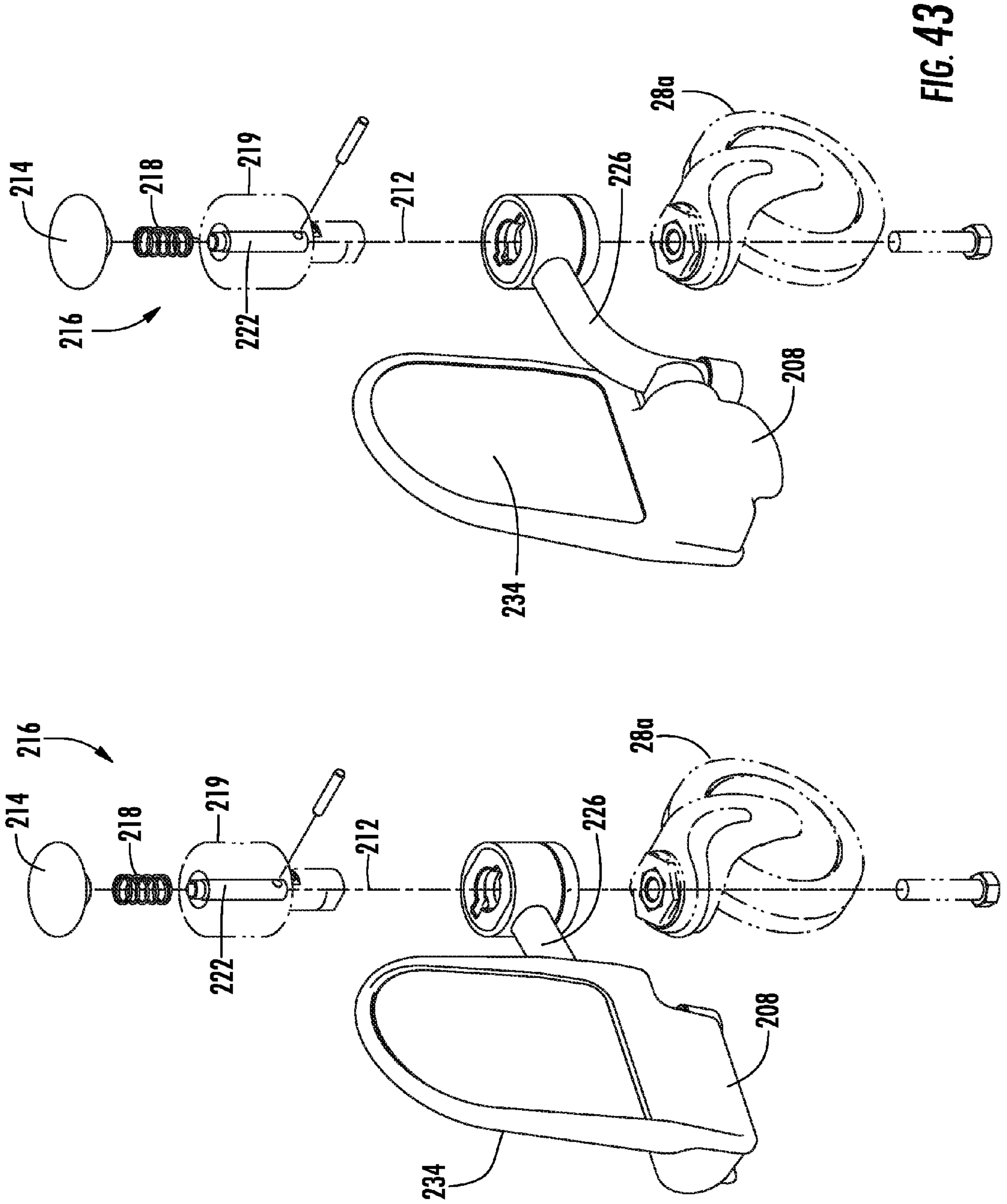
FIG. 43 is an exploded perspective view of a first embodiment of a pivot mechanism for the footrests that may be used in any of the transport chairs disclosed herein.
Figure 44:
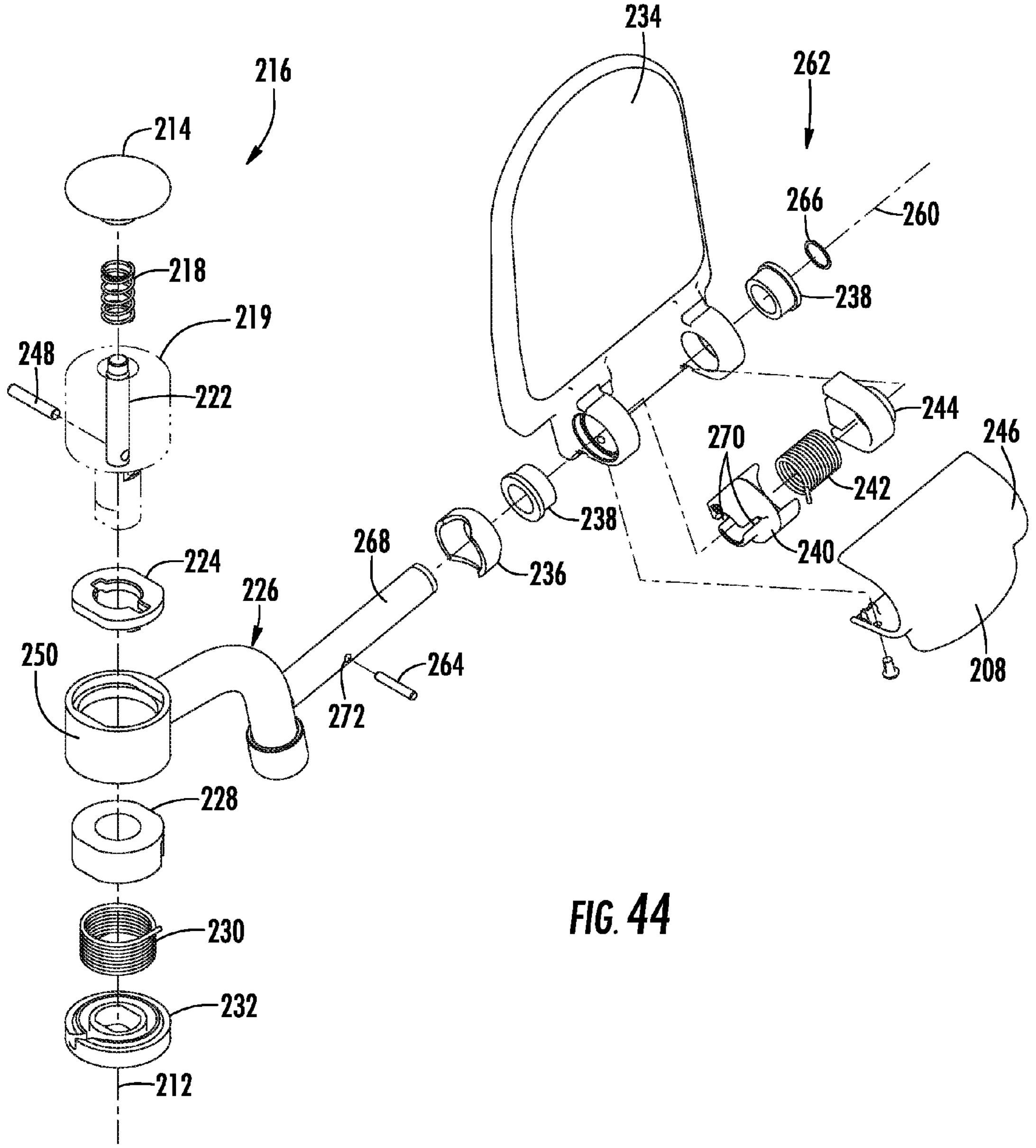
FIG. 44 is an exploded perspective view of the pivot mechanism of FIG. 43.
Figure 45:
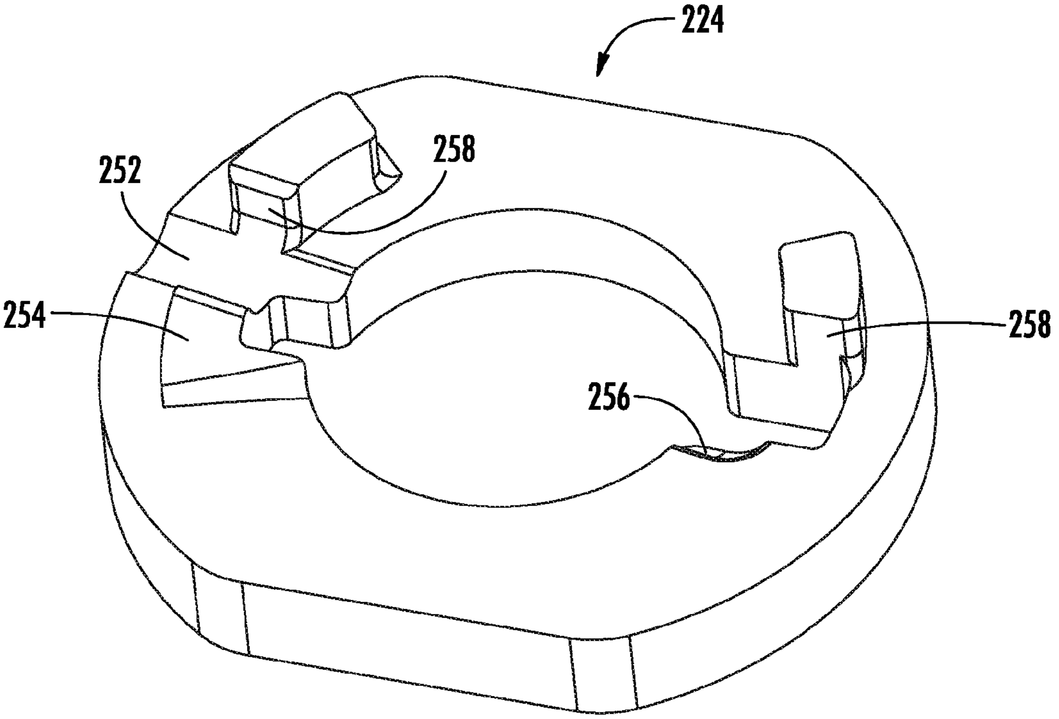
FIG. 45 is a perspective view of the lock insert of FIG. 44 showing an underside of the lock insert.

FIGS. 43-45 illustrate one embodiment of a swing mechanism for footrests 30. As was briefly described above, any of the transport chair embodiments described herein may be equipped with footrests 30 that automatically pivot from the use position (FIGS. 4-8) to the stowed position (FIG. 9) when a user presses on a button 214 (FIGS. 43-44). This automatic pivoting clears the space in front of seat 24, thereby providing more space for a patient to enter or exit the transport chair. The swing mechanism shown in FIGS. 43-45 may be used on any of the transport chair embodiments discussed herein. Alternatively, different swing mechanisms may be used in place of the specific embodiment shown in FIGS. 43-45. Still further, in some embodiments, footrests 30 are configured so that they do not automatically swing away, but instead require a user to manually push the footrests 30 into a stowed position. In still other embodiments, footrests 30 are configured so that they do not swing or pivot between a use and stored position at all, but instead remain in the use position at all times.

A swing or pivot mechanism 216 is shown in more detail in FIGS. 43 and 44. Swing mechanism 216 includes button 214, a spring 218, a caster post 219, a push shaft 222, a lock insert 224, an extend tube 226, a spring bushing 228, a torsion spring 230, a spring holder 232, and a pin 248. All of these components are positioned inside of, or coupled to, a cylindrical body portion 250 of extend tube 226. Spring holder 232 is fixedly coupled to caster post 219. Spring bushing 228 and extend tube 226 are fixedly coupled to each other so that they will rotate with each other when footrest 30 moves between the stowed and use positions. When footrest 30 is in the use position, rotation of extend tube 226 is prevented by the position of pin 248 within a main channel 252 defined in lock insert 224. More specifically, lock insert 224, spring bushing 228, are prevented from rotating with respect to caster post 219 (which is attached to frame 22) because of the position of pin 248 in channel 252. When button 214 is pressed downwardly, push shaft 222 is also pushed downwardly, which in turn relieves the upward pressure exerted by spring 218 on pin 248 that otherwise keeps pin 248 lodged in channel 252 (note: lock insert 224 is shown in FIG. 45 upside down with respect to its orientation in FIG. 44). By relieving this pressure, the torsional force of torsion spring 230, which is coupled by way of spring bushing 228, and cylindrical body 250 to lock insert 224, is sufficient to overcome the rotational resistance created by the interaction of pin 248 against a detent 254 defined on lock insert 224. Therefore, lock insert, as well as cylindrical body 250 (and extend tube 226) are free to rotate due to the force of torsional spring 230. This rotation causes the extend tube 226, to which footrest 30 is coupled, to pivot to the stowed position. This pivoting motion is slowed by the frictional engagement of detent 254 with pin 248. Footrest 30 therefore pivots with a more controlled, and less jerky movement, to the stowed position that it otherwise would with detent 254.

When footrest 30 reaches the stowed position, lock insert 224 will have rotated sufficiently far to allow pin 248 to engage a lip 256 defined generally opposite main channel 252 (FIG. 45). This engagement of lip 256 with pin 248, along with the force exerted by spring 218, will resist rotation of footrest 30 out of the stowed position. However, as can be seen in FIG. 45, lip 256 is sufficiently sloped such that a person can manually overcome the resistance offered by the interaction between lip 256 and pin 248. Therefore, in the absence of any additional user applied force, footrests 30 will automatically swing to the stowed position after button 214 is pressed and remain there. Further, they will remain there unless a force is applied manually by a user to pivot them back to the use position. Once in the use position, the force of spring 218 will cause pin 248 to re-lodge itself in main channel 252, thereby preventing footrests 30 from moving out of the use position in the absence of someone pressing the corresponding button 214. A pair of hard stops 258 (FIG. 45) prevent rotation of footrests 30 beyond the range of motion defined between the use position and the stowed position. This range of motion is chosen so that the footrests 30 will not bang into any portion of frame 22, or any other portion of the transport chair, when they are automatically pivoted from the use position to the stowed position.

Other than the buttons 214, the automatic swinging of the footrests 30 from the use position to the stowed position upon pushing buttons 214 is carried out in a manner wherein the components for swinging the footrests 30 are all self-contained within caster post 219 and cylindrical body portion 250. Thus, there are no components that stick out, no latches that need manual re-positioning, no arms that need to be manually re-adjusted upon one or the other of the swinging motions, and no other structures that extend outside the compact and combined unit of the caster post 219 and the cylindrical body portion 250. Further, the caster posts 219 and cylindrical body portions 250 are positioned on top of the part of forward legs 54 to which front wheels 28*a* are attached. The addition of caster posts 219 and/or cylindrical portion 250 at the front end of front legs 54 therefore does not add to the physical footprint of the chair beyond what is already required for supporting the front wheels 28*a*. This means that swinging the footrests 30 between the use position and the stowed position does not require additional structures that otherwise clutter the front area of the transport chair more than if such swinging abilities were not present. Swinging mechanisms 216 therefore enable swinging movement of footrests 30 without increasing clutter that would otherwise hinder patient ingress and egress to and from the chair.

It will be understood by those skilled in the art that other types of triggers for activating the swinging or pivoting mechanism 216 may be used as an alternative to button 214. Further, the location of the trigger, whether it includes button 214 or some other type of trigger, can be changed from being positioned atop cylindrical body portion 250 to another suitable location. Still further, in one alternative embodiment, no triggering mechanism is included and the swinging of footrests 30 between their use and stowed position is carried out by manually applying forces to the footrest 30, or any component physically attached thereto, in the direction of either the use position or the stowed position. In this manual embodiment, the cylindrical body 250 can include one or more components that help retain the footrests in either the use or stowed position, such as one or more detents, or the like. Such components will require a person to exert a slightly greater force to initially move the footrest 30 out of either the use or stowed position than is required to swing the footrest after it has become dislodged from either the use or stowed position. Still other variations are possible.

In the illustrated embodiments, the swinging of footrests 30 between the use and stowed positioned takes place about a generally vertical axis 212 (FIGS. 43-44). As can best be seen in FIG. 43, generally vertical axis 212 is also the axis about which front caster wheels 28*a* swivel. That is, in the illustrated embodiments, front wheels 28*a* are caster wheels that are able to both rotate about a generally horizontal rotational axis, which allows movement of the chair, and to swivel about generally vertical axis 212, which allows swiveling of the caster wheels so that they may turn in the direction of movement of the chair. A more compact design is achieved by having both the swiveling of front wheels 28*a* and the swinging of footrests 30 about a common axis 212.

In addition to the pivoting or swinging of footrests 30 between the use and stowed positions, each footrest 30 includes a footrest pan 234 that is pivotable about a generally horizontal pivot axis 260 (FIG. 44) between an upright position (shown in FIG. 44) and a generally flat position (not shown). In the generally flat position, footrest pan 234 is oriented generally horizontally so that it provides a platform on which a user may position his or her feet.

FIG. 44 illustrates one embodiment of a pivoting assembly 262 that may be used with any of the footrests 30 of any of the transport chairs disclosed herein. Pivoting assembly 262 is adapted to maintain its associated footrest pan 234 in the upright position shown in FIG. 44 (as well as other figures, e.g. FIGS. 4-10) in the absence of a patient positioning his or her feet thereon. Thus, when a patient is about to enter seat 24, footrest pans 234 will be oriented vertically upright, thereby creating more space for the user to enter seat 24 (assuming the footrests have been pivoted to the use position—even more space will be created if the footrests 30 are kept in the stowed position until after the patient enters seat 24). In order to pivot the pans 234 to their horizontal orientation, the patient lifts his or her feet and places them on top of the pans 234, forcing them down to their horizontal orientation. When it is time for the patient to exit the transport chair, the patient lifts his or her feet off of the pans 234, and the pans will automatically pivot upwardly, creating more clearance in the front area of the transport chair so that either egress from the chair, or having the patient rest his or her feet directly on the ground, is easier.

Pivoting assembly 262 includes footrest pan 234, a spacer bushing 236, a pair of bushings 238, a slotted spring holder 240, a torsion spring 242, a spring housing 244, a pivot cover 246, a pin 264, and a retaining ring 266. Spacer bushing 236, bushings 238, pan 234, slotted spring holder 240, torsion spring 242, spring housing 244, and pivot cover 246 are all coupled to a generally straight section 268 of extend tube 226. Pin 264 fits into a slot 270 defined in slotted spring holder 240. Pin 264 also fits into an aperture 272 defined in straight section 268. Pin 264, as well as slotted spring holder 240, therefore do not pivot about pivot axis 260. Torsion spring 242 is coupled at one end to slotted spring holder 240. The other end of torsion spring 242 is coupled to spring housing 244, which in turn is coupled to pan 234. The manner of the coupling between torsion spring 242 and pan 234 is such that, when pan 234 is in the upright position, relatively little torsional force is being exerted by spring 242 on pan 234. Further, to the extent such a torsional force is being applied, it is urging pan 234 to remain in the upright position. When a person presses down on pan 234, they must overcome the resistance of torsion spring 242. The energy expended in overcoming this resistance is stored as potential energy in spring 242 and released when a person removes his or her feet from pan 234. This released potential energy is used in rotating pan 234 back to its upright position.

By configuring footrests 30 so that they automatically return to their upright position, not only does this create greater clearance for the patient, but this also allows the transport chairs to nest together. Examples of such nesting are shown in FIGS. 62-65. When the footrests 30 of a first transport chair are in their upright position and the first chair is nested into the back side of a second chair, the upright position of the footrests 30 of the first chair allow the first chair to be nested without having the footrests come into contact with the rear wheels 28*b*. By automatically returning the footrests to their upright position, a user therefore does not need to manually alter the configuration of the footrests prior to nesting one into another, which reduces the amount of work that would otherwise be necessary to nest the chairs together.

Figure 8:
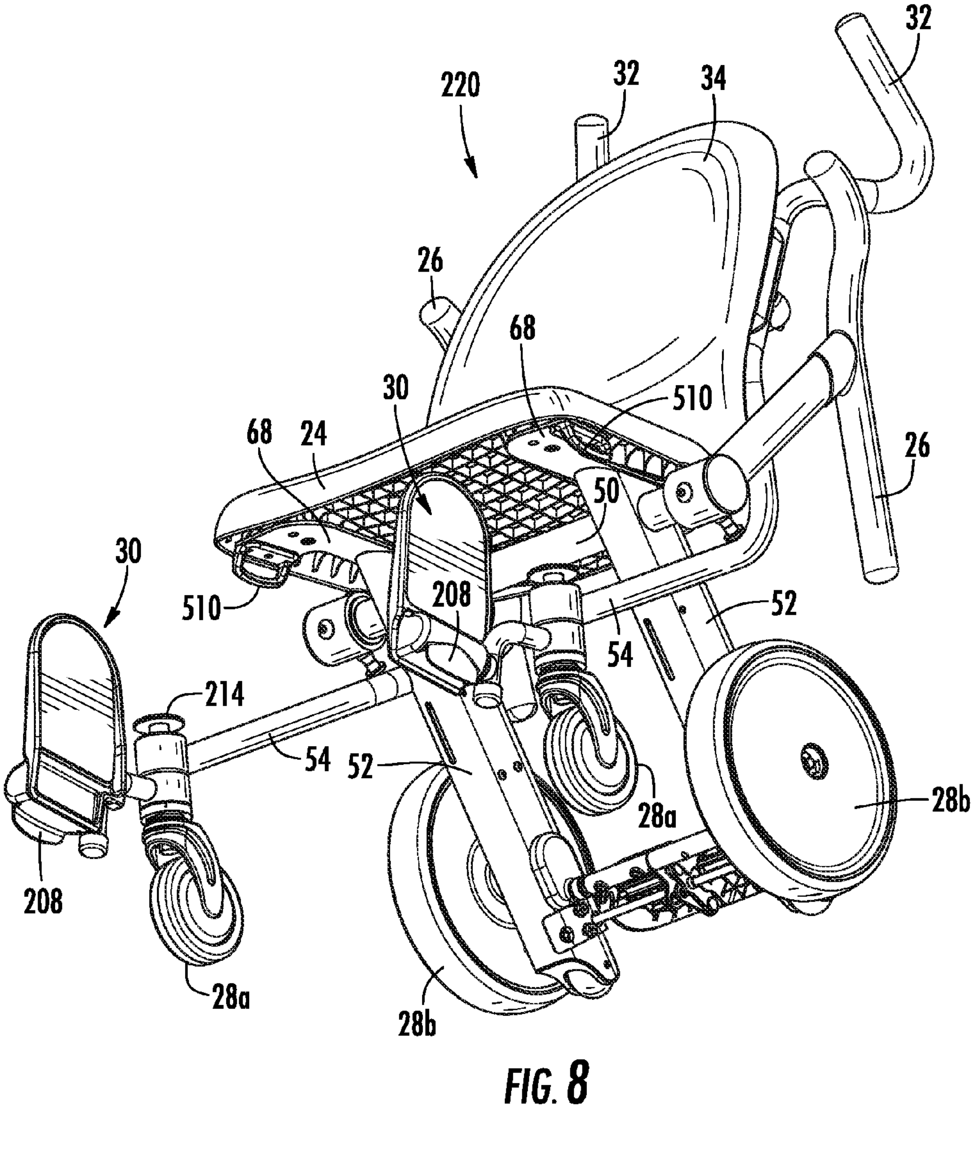
FIG. 8 is a bottom, perspective view of the transport chair of FIG. 4.
Figure 9:
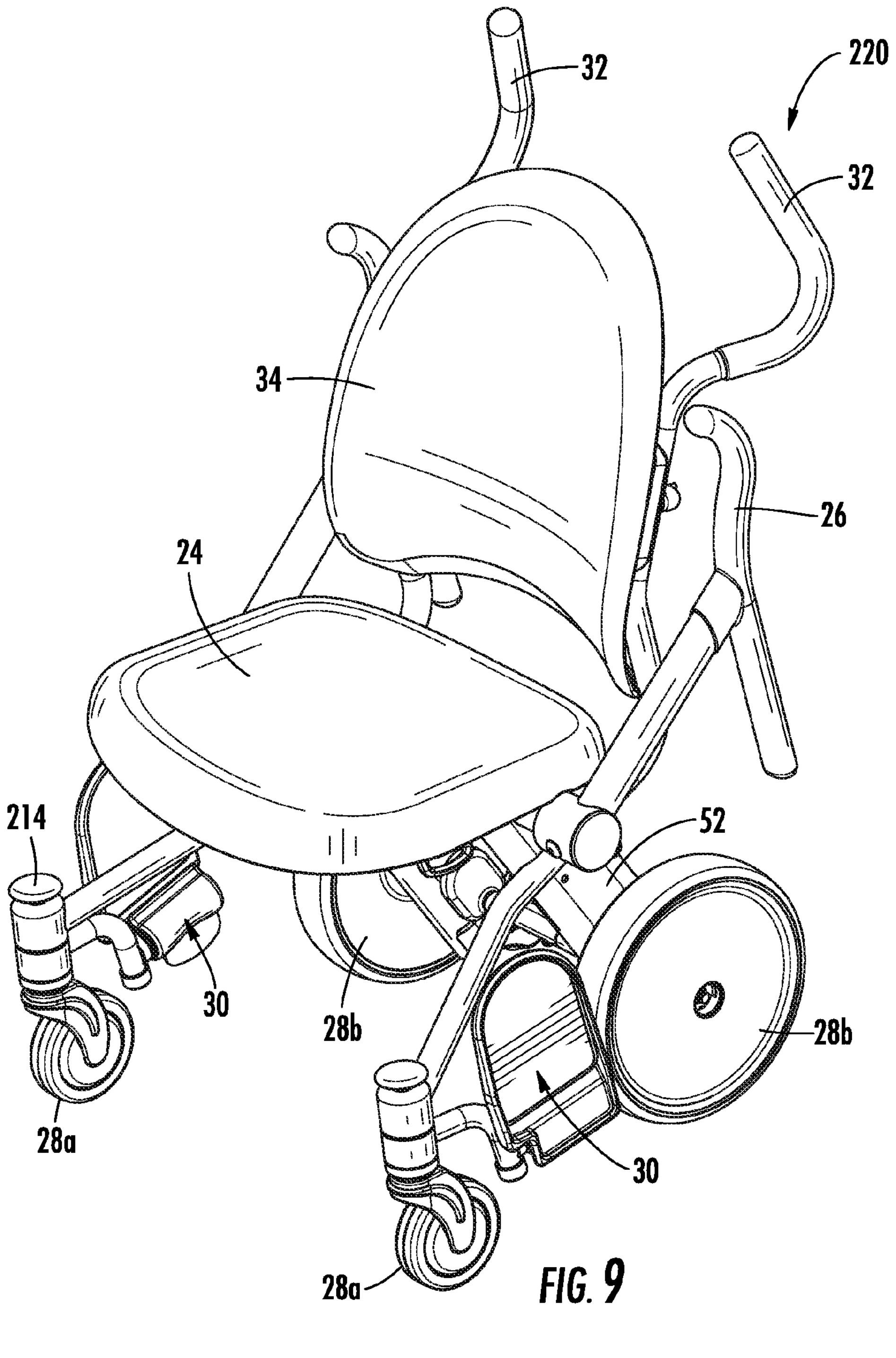
FIG. 9 is a perspective view of the transport chair of FIG. 4 shown with the foot rests pivoted to a retracted, stowed position.
Figure 10:
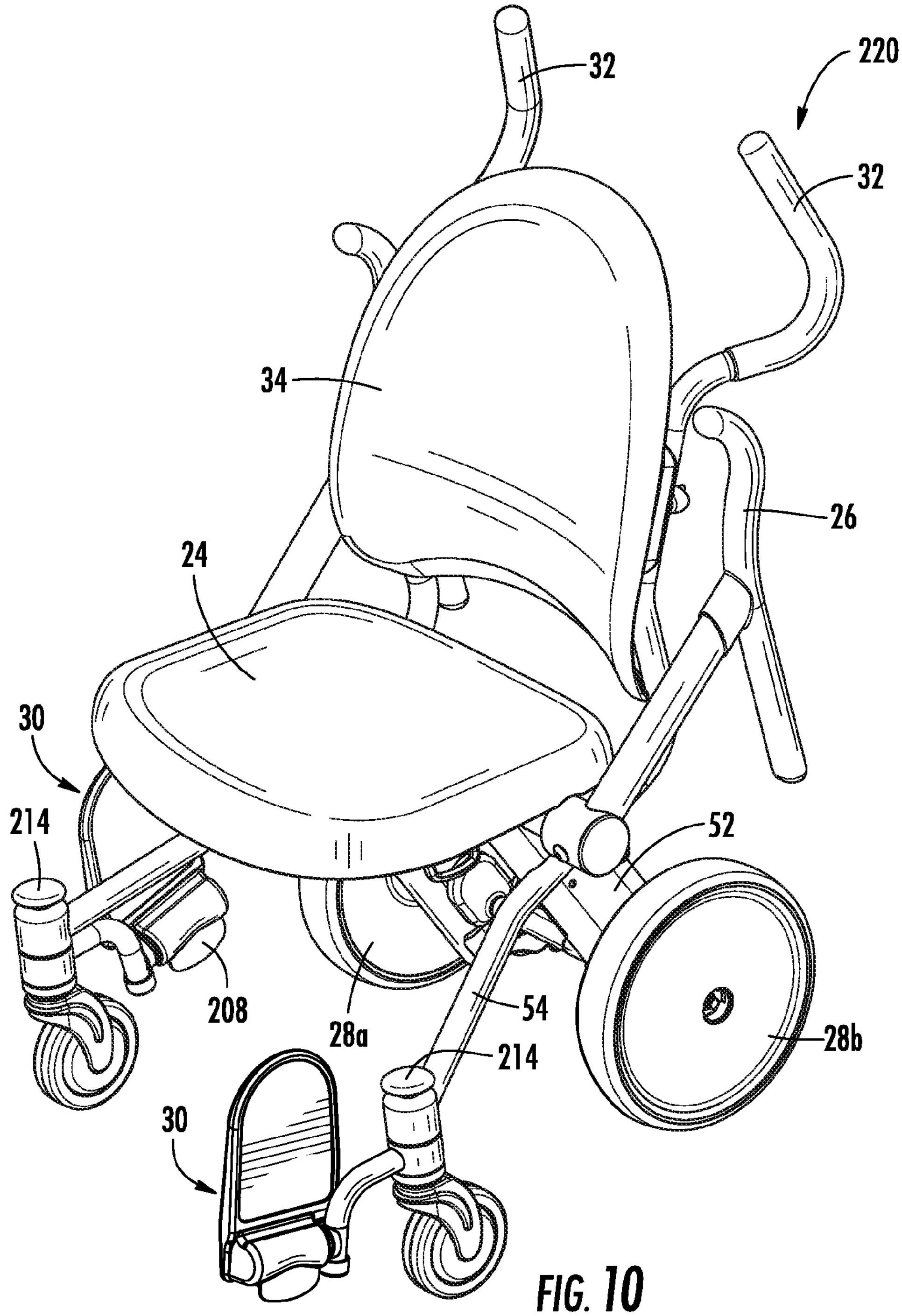
FIG. 10 is a perspective view of the transport chair of FIG. 4 shown with one foot rest pivoted to the forward use position and the other foot rest pivoted to a backward stowed position.

As can be seen more clearly in the embodiments shown in FIGS. 43-44 and 8, each footrest 30 also includes a pivot extension 208 defined in pivot cover 246. Pivot extension 208 is adapted to allow a caregiver to easily use his or her foot to manually flip the attached footrest 30 from the upward orientation to the downward orientation. The caregiver can accomplish this by inserting the toe of his or her shoe underneath pivot extension 208 while footrest 30 is in the upright position and then pivoting his or her shoe upwardly and slightly outwardly (i.e. away from the footrest 30 on the opposite side of the chair). This will cause the pivot extension 208 to pivot upwardly and the footrest pan 234 to pivot downwardly to the use (e.g. generally horizontal) orientation. When in this use position, pivot extension 208 is oriented generally horizontally (see FIG. 52), while when in the stowed position, pivot extension 208 is oriented generally vertically (FIGS. 43-44). By being oriented generally vertically when footrest 30 is in the stowed positioned, pivot extension 208 does not extend outwardly from footrest 30, and therefore does not create an extra obstruction in this orientation. Pivot extension 208 provides a convenient structure for enabling a caregiver to move footrests 30 to their lowered position without requiring the caregiver to bend down and manually manipulate the footrests 30. Such manual lowering can assist a patient who is in the process of putting his or her feet onto footrests 30.

IV Pole and Toppers

Figure 46:
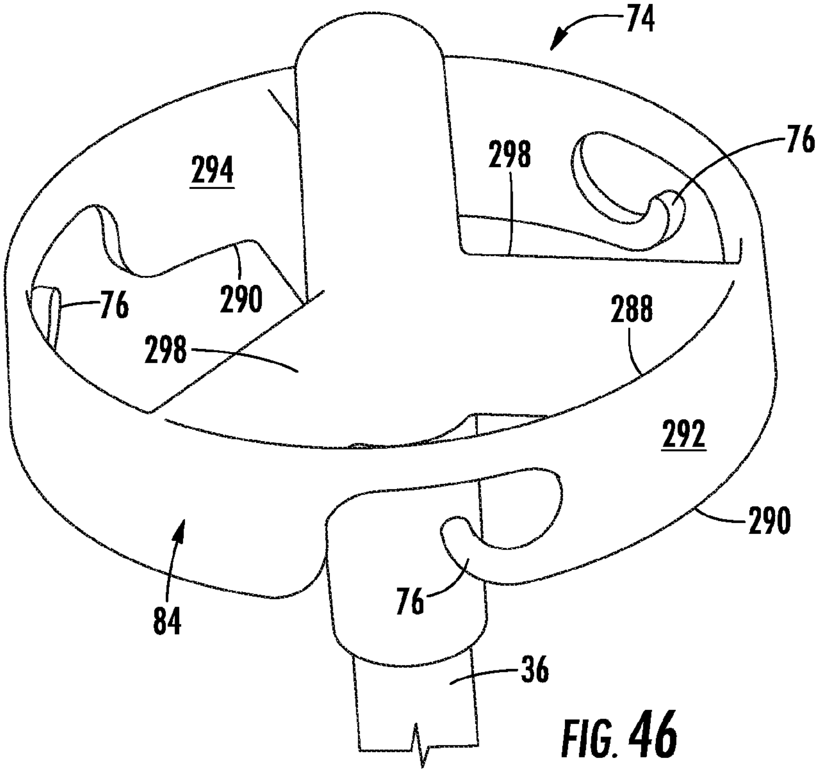
FIG. 46 is a perspective view of a first embodiment of an IV pole topper.

As was noted previously, IV pole 36 includes an IV pole topper attached to its top end, such as, but not limited to, the IV pole toppers 74 and/or 274 shown in FIGS. 46 and 47. Each IV pole topper 74, 274 includes a plurality of hooks 76 on which an IV bag, or other medical equipment may be hung. While some transport chair embodiments shown herein do not include an IV pole 36 attached thereto, it will be understood by those skilled in the art that such transport chair embodiments may be modified to include an IV pole having an IV pole topper. Further, those embodiments showing an IV pole 36 may be modified to eliminate the IV pole 36.

IV pole topper 274 includes an attachment aperture 276 (FIG. 47) defined in its center that is adapted to receive a fastener 278 (FIG. 48) that is also received in the top end of IV pole 36. The fastener 278 may be any suitable fastener, such as, but not limited to, a screw or other threaded fastener. The threads of the fastener 278 matingly engage internal threads defined in the top end of IV pole 36 (not shown), to thereby secure IV pole topper 274 to IV pole 36. In one embodiment, fastener 278 is configured to attach IV pole topper 74 and/or 274 to IV pole 36 such that the topper 74 and/or 274 is free to rotate about the generally vertical axis defined by the upper portion of pole 36. In another embodiment, fastener 278 is configured to rigidly attach IV pole topper 74 and/or 274 to pole 36 such that the attached topper is not able to rotate about this generally vertical axis.

Because IV pole topper 274 is attached to pole 36 by way of a fastener 278 that fits into the top of topper 274, fastener 278 is largely invisible to people in the vicinity of the transport chair. This is because the IV pole topper 274 is often positioned at a height generally at, or above, the normal eye level of a standing person. Thus, unless a person is positioned above the generally horizontal plane defined by topper 274, he or she will not see fastener 278 positioned in aperture 276. That is, fastener 278 is not visible from any vantage points at or below the horizontal plane defined by the main body of topper 274.

IV pole topper 274 is, in some embodiments, colored in a manner that signifies information to a caregiver. In some embodiments, topper 274 is a uniform color. In other embodiments, topper 274 may be multi-colored. Regardless of whether it is single or multi-colored, the color of topper 274 can be used to provide information to caregivers in a healthcare facility where there are multiple transport chairs. For example, a healthcare facility may choose to have all of its transport chairs that are assigned to a specific floor of a building, or a specific department of the facility, a first color, while all of its transport chairs that assigned to a different floor or department are given a different color. This provides an easy visual indication to caregivers of where the transport chair is to be returned to if it is moved to a different location. Further, owners of the transport chair can easily change the assignment of a particular transport chair by replacing the topper 274 with one of a different color.

Alternatively, the color or colors toppers 274 may be used to provide visual information about one or more aspects of the patient assigned to that chair. For example, one particular color of toppers 274 may be used to indicate that the patient assigned thereto is an infection risk, or that the patient assigned thereto is not an infection risk. In other embodiments, the color may indicate the language spoken by a particular patient, whether the chair is clean or in need of cleaning, or it may indicate medical information about the particular patient, such as, but not limited to, allergies, fall risks, medication information, whether the patient is blind, whether the patient is deaf, or any other useful classification where a visual indicator is helpful to the caregivers, staff, or other individuals who use the transport chair. Still other categories of patient information may be indicated by the colors of toppers 274 (or 74).

The different colored toppers 74, 274 may be made available to users of the transport chairs in a variety of different manners. In one manner, the customer who is purchasing the transport chair orders different colored toppers 74, 274 from the manufacturer of the transport chair during the initial purchase of the transport chair. In an alternative manner, the customer may separately order toppers 74, 274 in the desired colors subsequent to the initial transport purchase, either from the manufacturer of the transport chair, and/or from designated dealers who are authorized by the manufacturer of the transport chair. In still other manners, colored toppers 74, 274 may be available for purchase or lease from third parties that have no affiliation with the manufacturer of the transport chair.

In still other embodiments, IV pole 36 may be used with other objects besides toppers 74, 274 to indicate any of the above-mentioned information. That is, different types of toppers may be used that do not provide IV hooks for hanging IV bags. Such toppers may be configured and designed in any manner. In some embodiments, such toppers serve only to indicate information, and do not provide any other functionality. In other embodiments, such as with toppers 74, 274, the toppers are configured to indicate information and to provide an additional function, such as providing hooks for IV bags. When the toppers are used to visually convey information, such toppers, for example, may act in the same manner as a flag that indicates information. Indeed, in some embodiments, the toppers are flags, and such flags may be made of flexible material or more rigid material. In other embodiments, the toppers are configured to hold paper on which symbols or words can be written or printed. In still other embodiments, the toppers include other types of writing surfaces (e.g. whiteboard-type surfaces, or other types of surfaces) built therein on which messages or other indications may be written.

When used to provide information to caregivers, the toppers to IV pole 36 may be configured in different manners from that of toppers 74, 274. That is, the topper may be of a conventional hook configuration that is color coded, or otherwise altered or configured in some manner to provide information. Such alterations or configuration may include changes to the shape of all or a portion of the topper. Such changes or configurations can be implemented in a manner that is visually apparent to caregivers not only while they are positioned next to the transport chair to which the IV pole 36 is attached, but also from greater distances, such as the distances the caregivers may encounter in their work environment (e.g. the lengths of hallways, corridors, etc.)

In summary, a variety of different types of toppers—whether configured like toppers 74, 274 or otherwise—may be used to create a system of visual communication that provides caregivers information about the patient in the transport chair, or the transport chair itself. It will be understood that, in still other embodiments, this system of visual communication can be applied to other medical devices besides transport chairs. For example, toppers 74, 274, and all of the variations discussed herein, may be used with beds, stretchers, operating tables, cots, or other devices that support and/or transport patients. In still other embodiments, this system may be applied to medical devices that are used to treat patients, such as ventilators, pumps, dialysis machines, and other medical devices. As discussed above, when the toppers are applied to non-transport chair medical devices, the toppers may be configured like toppers 74 and/or 274, or they may be differently configured, including, but not limited to, configurations that do not provide any hooks or support for IV bags.

Figure 48:
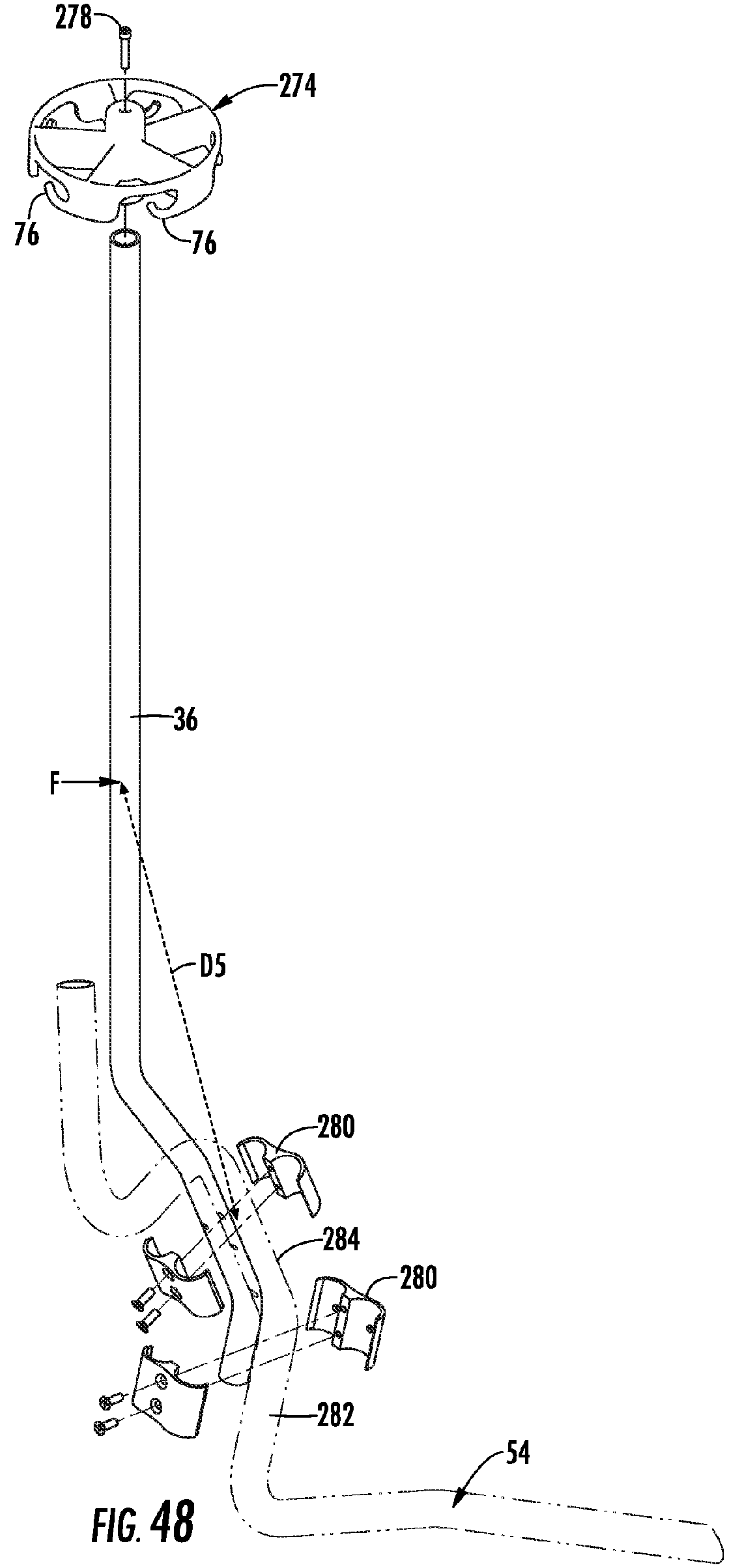
FIG. 48 is a perspective view of the IV pole topper of FIG. 47, an IV pole, and a pair of clamps used to secure the IV pole to the transport chair.
Figure 49:
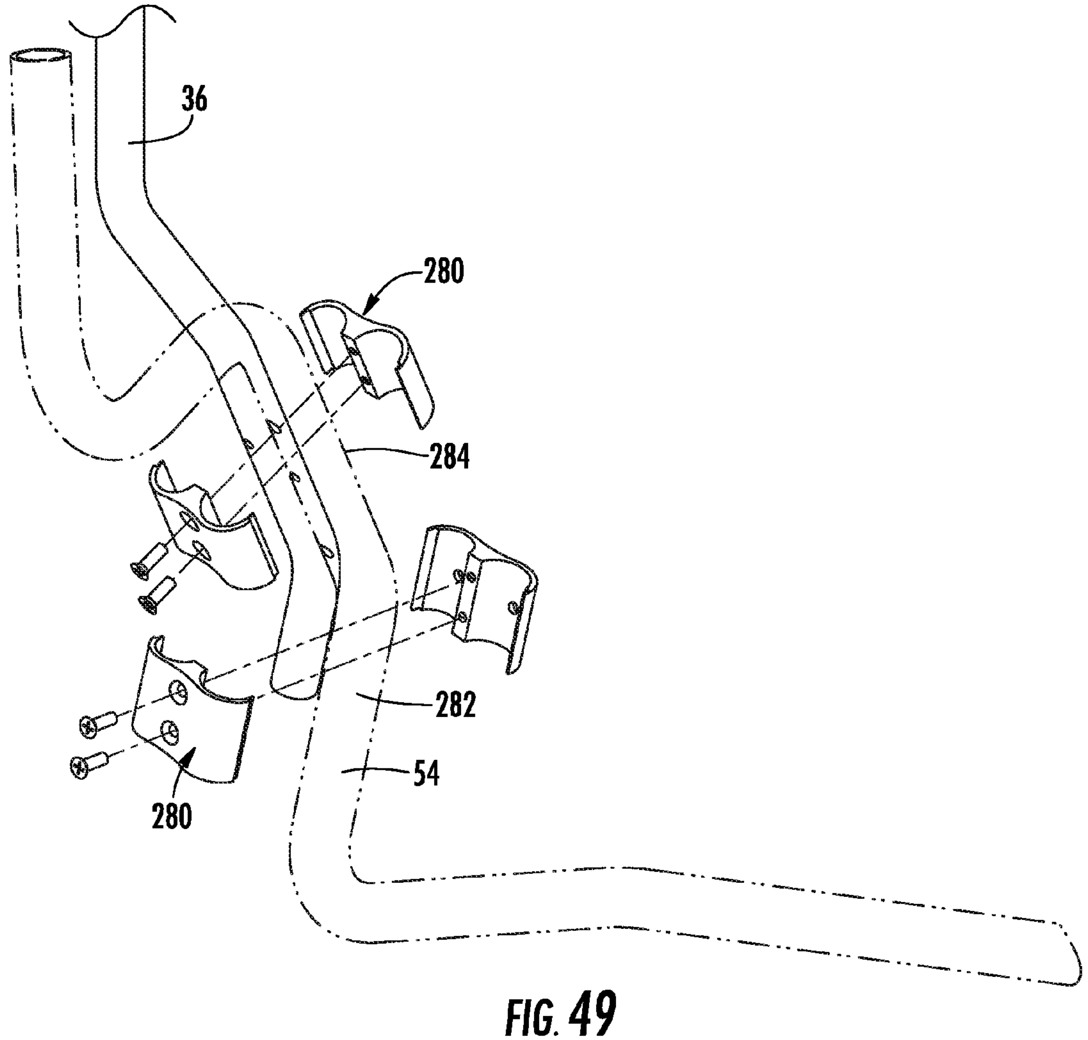
FIG. 49 is a close-up, perspective view of the clamps and IV pole of FIG. 48.
Figure 50:
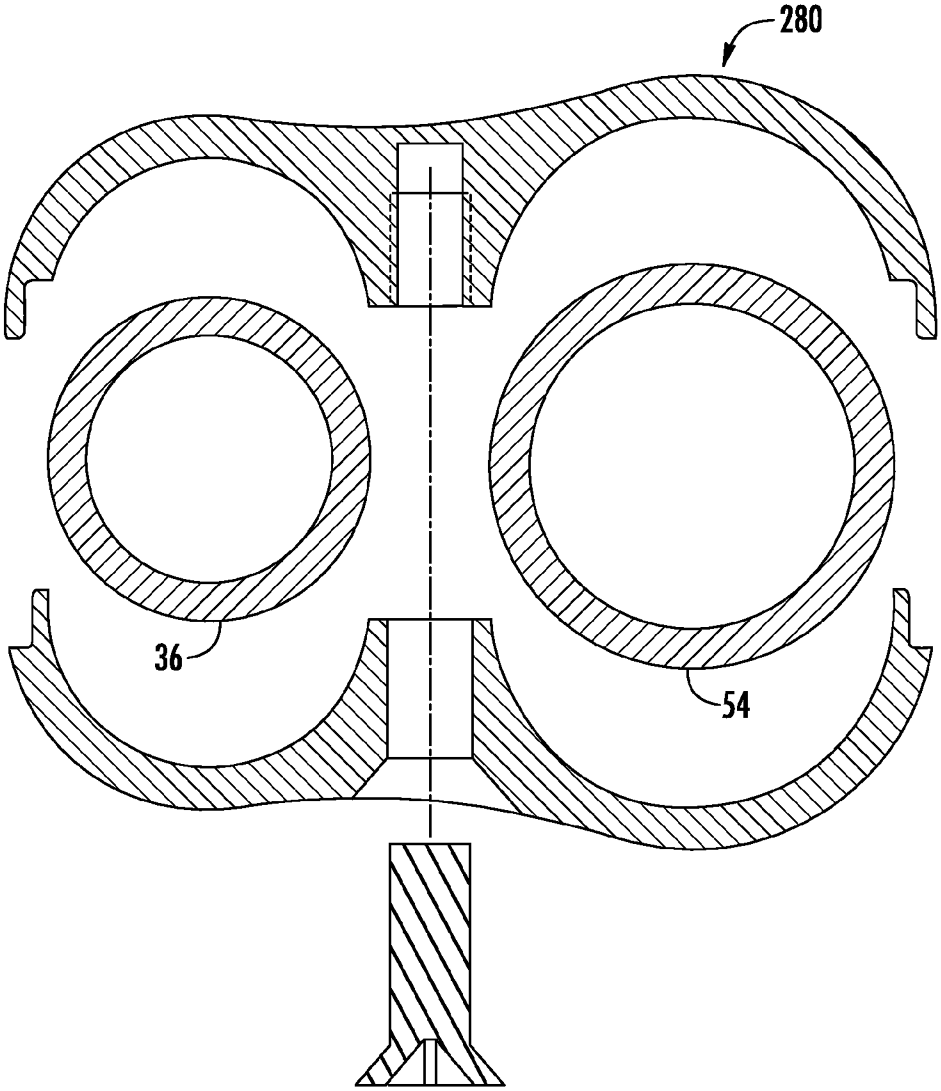
FIG. 50 is a sectional view of the clamps, IV pole, and handlebar of FIG. 48.

FIGS. 48 and 49 illustrate one manner in which IV pole 36 may be attached to frame 22 of a transport chair. As shown, a plurality of clamps 280 are used to secure IV pole 36 to one of the forward legs 54 of frame 22. More specifically, in the region of the forward leg 54 where IV pole 36 is secured, forward leg 54 includes a first section 282 and a second section 284. First and second sections 282 and 284 are angled with respect to each other. One of clamps 280 is attached to first section 282 and IV pole 36, while the other of clamps 280 is attached to second section 284 and IV pole 36. Because first and second sections 282 and 284 are angled with respect to each other, a more secure attachment of IV pole 36 to forward leg 54, and thus the entire transport chair, is effected. The reasons for this are explained below.

Often times a caregiver or other user of the transport chair will push or pull on the chair by grasping IV pole 36 instead of handles 32. When the person does this, they may exert a significant amount of force on IV pole 36 and the clamps 280 used to secure pole 36 to the transport chair. This applied force can itself be significant and/or this applied force can be, and often is, amplified by the lever arm distance between the location where the force is applied to pole 36 and the location of the uppermost clamp 280. For example, FIG. 48 illustrates an applied force F applied to pole 36 at a distance D5 from the uppermost clamp 280. Regardless of whether the applied force itself is significant, or the multiplicative effect of the lever arm distance is amplifying the force, the clamp or clamps 380 need to be able to withstand such forces over time.

In the past, IV poles have been attached to wheelchairs using only a single clamp. When a person pushes, pulls, or otherwise exerts a force on the IV pole, this has tended to loosen that clamp, particularly over time. Further, the use of a single clamp only structurally restrains the IV pole in four degrees of freedom (forward-backward movement, lateral movement, and rotations about perpendicular horizontal axes). Movement in the vertical direction, as well as rotation about the vertical axis of the pole, is only frictionally restrained by the clamp, not structurally restrained. This frictional restraint can be overcome with time. Further, even the structural restraints can be loosened over time due to the magnitude and repetition of the applied forces. The loosening of the restraints (structural, frictional, or both) can happen even if multiple clamps are used and they are attached in a collinear arrangement with respect to each other.

The clamp arrangement shown in FIGS. 48 and 49 (and elsewhere herein), however, overcomes the aforementioned issues and provides structural restraint in all six degrees of freedom. It achieves this by using a pair of clamps 280 that are located at different which are not parallel or aligned with each other (sections 282 and 284). Each clamp 280 structurally restrains pole 36 in four degrees of freedom (forward backward movement, lateral movement, and rotation about perpendicular horizontal axes). Further, the combination of the two clamps 280 being arranged in a non-collinear fashion structurally restrains both vertical movement and rotation about a vertical axis defined by the vertical upper portion of IV pole 36. Rotational movement is structurally resisted because the two clamps 280 are not rotationally aligned (they don't have center axes that are collinear). Vertical movement is also structurally resisted because at least one, if not both, of sections 282 and 284 are not vertically oriented, and their corresponding clamps 280 are also not vertically oriented. Consequently, by having angled sections 282 and 284 in leg 54, as well as corresponding angled sections in IV pole 36 (not separately labeled), and using clamps 280 at each section, a coupling is achieved between IV pole 36 that structurally resists any movement in all six degrees of freedom. This solid coupling helps to prevent any wiggling over time between pole 36 and the chair, even in the presence of excessive forces, and even after such forces are repeated and accumulated over lengthy periods of time. This solid coupling also gives the user a robust feeling when grabbing the IV pole 36, and further allows the user to push and/or pull on the transport chair without causing damage to the pole 36, or loosening the connection between the pole 36 and the transport chair.

As an alternative to arranging clamps 280 in the manner shown in FIGS. 48 and 49, it would be possible to achieve a similar level of robustness and structural restraint in six degrees of freedom if clamps 280 were parallel, but not collinear, and they were properly positioned to abut the bends or elbows in the leg 54. By being parallel but not collinear, rotation about a vertical axis would be structurally resisted by the two clamps. Further, by positioning the clamps 280 adjacent the bends or elbows in leg 54, vertical movement of the IV pole 36 would be prevented by the bends or elbows contacting one or both of the clamps 280.

In addition to its use on transport chairs and wheel chairs, the clamps 280 and attachment methods shown and described herein may be used to attach IV poles 36 to other medical devices, such as, but not limited to, stretchers, beds, cots, surgery tables, pumps, ventilators, dialysis equipment, or still other types of medical equipment. By clamping the IV pole 36 to the medical device at two locations that are not parallel and collinear with respect to each other—or that are parallel but not collinear with each other and the clamps are arranged adjacent the bends or elbows in the attachment structure—the IV pole may be secured in a fashion that structurally resists motion in all six degrees of freedom and provides a robust coupling between the medical device and the IV pole.

It will also be understood that any of the toppers discussed herein can be used with a modified IV pole that is different from IV pole 36. For example, the IV pole could be modified so that it was a telescoping pole whose vertical height was adjustable in a telescoping manner. Thus, if no IV bag needed to be hung and/or no communication information was desired to be displayed in a highly visible manner on the transport chair, or other mobile medical device, the telescoping IV pole could be lowered to its lowest height so as to not be an obstruction or obstacle. If an IV bag were later to be hung, or if it were later desired to use the pole for visually displaying information, the IV pole could then be extended vertically. The topper could remain on the IV pole in both its extended and retracted positions, or it could be removed when the pole was retracted to its lowest position. Still other variations of the IV pole could be implemented.

As was described previously, IV pole toppers 74 and 274 are each generally circularly shaped with arcuate hooks 76 defined in, and aligned with, the overall circular shape of toppers 74 and 274. This configuration not only leads to no outwardly pointing hooks 76 that could be inadvertently bumped against, it also leads to no outwardly point extensions, prongs, or other structures that could directly come into contact with a person's head, eye, or other body part that was positioned at the same height as the topper 74, 274. Toppers 74 and 274 each include a ribbon 84 that has a top edge 288, a bottom edge 290, an outer surface 292, and an inner surface 294. Ribbon 84 is connected to a central body 296 by way of a plurality of spokes 298. Ribbon 84 is arranged to define a circular shape in both toppers 74 and 274. Top edge 288 is continuous around the entire circular shape of ribbon 84 in both toppers 74 and 274. Bottom edge 290 is not continuous around the entire circular shape, but instead is interrupted several times in areas of ribbon 84 that are adjacent to each hook 76. These interruptions provide space for a user to insert a loop, or other structure, that is attached to an IV bag over one of hooks 76. Hooks 76 themselves are circular and defined within ribbon 84.

Although ribbon 84 is depicted as circular shaped in FIGS. 46 and 47, it can be modified to have different shapes in other embodiments. In one alternative embodiment, ribbon 84 is shaped as a polygon. When shaped as a polygon, ribbon 84 can include a hook 76 defined on each side of the polygon. Alternatively, multiple hooks 76 may be defined on each side of the polygon, or hooks 76 may be defined in less than all of the polygon sides. Although changing the shape of ribbon 84 from a circular shape to a polygonal shape will create some vertical edges, such edges can be smoothed or blunted, particularly in cases where the polygon is more than three or four sided. In still other embodiments, ribbon 84 may be curved in the vertical direction as well as the horizontal direction, having, for example, an outer surface 292 that, when traveling vertically downward from top edge 288 to bottom edge 290, traces a curved path. Other shapes besides curved shapes may also be used.

As shown in the accompanying drawings, ribbon 84 is endless in the sense that it does not include an end or a beginning. Instead, it forms a complete circle which, as noted, can be modified to other shapes. In addition to modifying ribbon 84 to other shapes, ribbon 84 may be modified to not be endless. As but one example, ribbon 84 could be made of several discrete sections that are spaced from each other, but are still each arcuately shaped so that the sections, in combination, still generally defined a circle. Still other variations are possible.

Calf Rests

Figure 51:
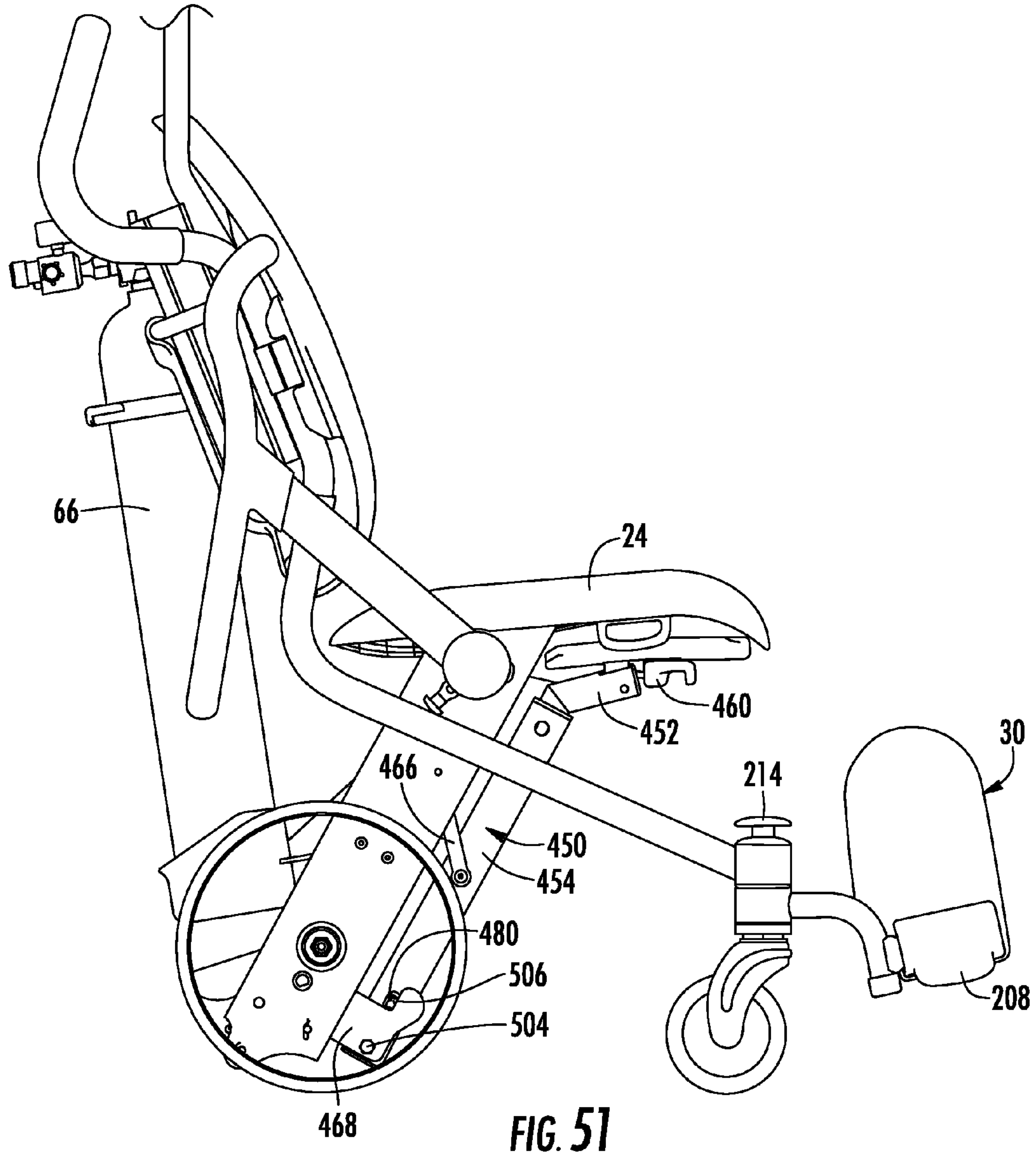
FIG. 51 is a side, elevational view of the transport chair of FIG. 29A showing a calf rest extension that is in a retracted position and that may be included in any of the transport chair embodiments disclosed herein.
Figure 52:
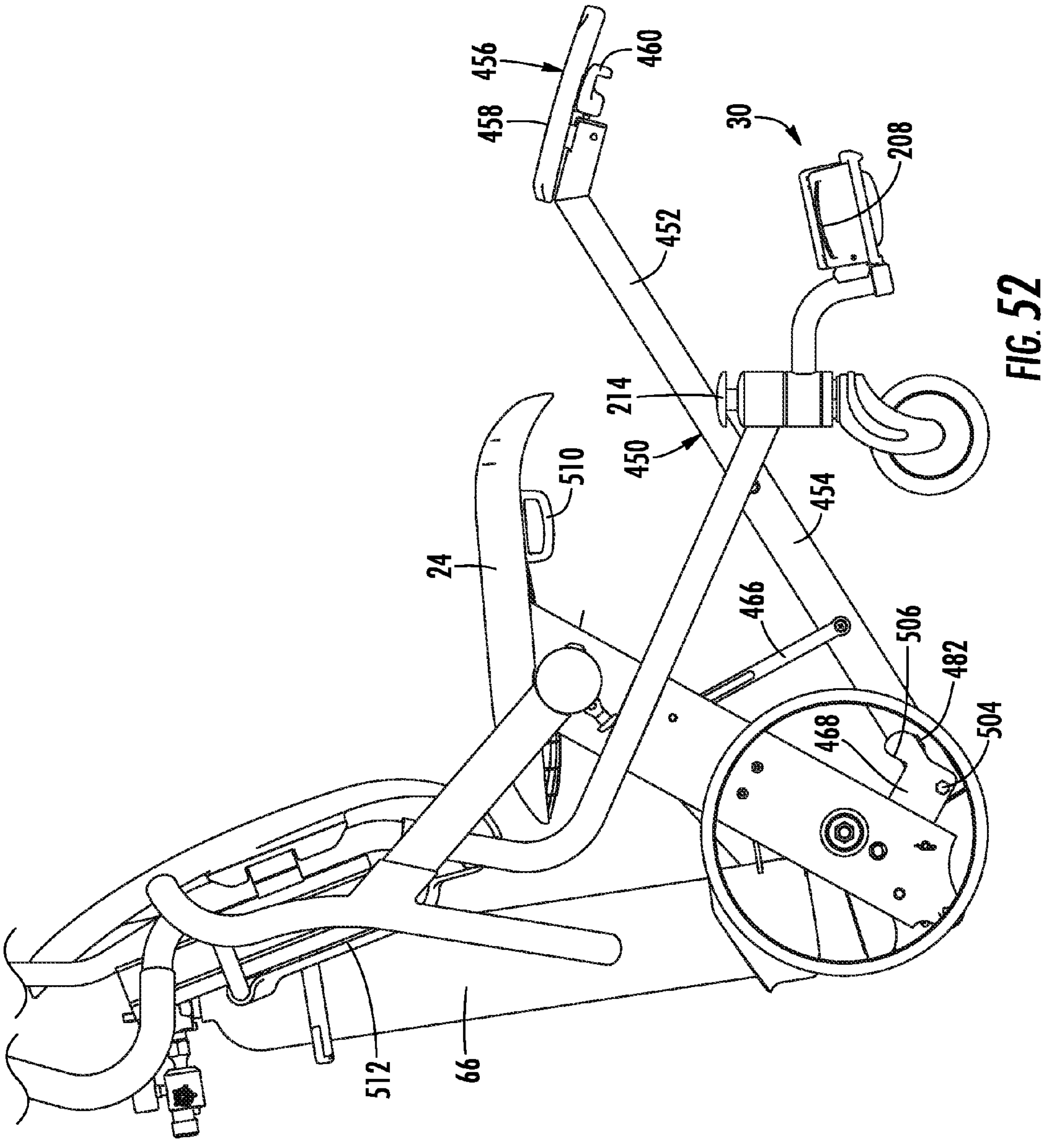
FIG. 52 is a side, elevational view of the transport chair of FIG. 51 showing the calf rest extension in an extended position.

In any of the transport chair embodiments disclosed herein, one or more calf rests 450 may be included. Examples of such calf rests 450 are shown in FIGS. 29A-29B and 51-61, among other figures. Calf rests 450 are adapted to support a patient's legs while sitting in seat 24. Further, calf rests 450 are adapted to be extendable and retractable between a stowed position (FIG. 51) and a use position (FIG. 52). In the embodiments of the transport chair shown in FIGS. 51-52, there is only one calf rest shown. However, it will be understood that two calf rests 450 may be incorporated into a single transport chair, such as is shown in FIGS. 29A and 29B. It will also be understood that calf rests 450 can be incorporated into other medical devices besides transport chairs, including, but not limited to, examination tables, operating tables, or any other patient support apparatus where it is desirable to be able to selectively support one or both of a patient's lower legs.

As shown in more detail in FIGS. 51-61, calf rests 450 include an inner extrusion 452, an outer extrusion 454, and a pad assembly 456. Pad assembly 456 includes an upper surface 458 upon which a patient may rest his or her calf, or leg. Upper surface 458 may be padded, or it may provide a surface to which a pad may be fastened. As is shown more clearly in FIGS. 60 and 61, pad rest assembly 456 is pivotable about a generally horizontal pivot axis so that pad rest assembly 456 may be oriented at an angle that generally aligns with the patient's calf. Further, inner extrusion 452 is able to translate with respect to outer extrusions 454 in a telescoping manner—that is, inner extrusion 452 can slide into, and extend out of, outer extrusion 454.

When calf rest 450 is in the retracted position, it is retained therein by way of a locking mechanism that will be discussed in greater detail below. In order to release the locking mechanism, a user pulls on a handle 460 that is coupled to an upper end of inner extrusion 452. Pulling on handle 460 releases the locking mechanism, thereby enabling a user to pull inner extrusion 452 out of outer extrusion 454. Once calf rest 450 is pulled to the fully extended use position, any upward pivoting of calf rest 450 is resisted by the weight of the patient's calf resting on pad assembly 456 and any further downward pivoting is prevented by a suspension linkage 466 coupled between frame 22 and calf rest 450. In terms of the relative translation of inner extrusion 452 with respect to outer extrusion 454, such relative translation is prevented in the extended position because a latch, such as an outer end 480 of a peg 474, will be inserted into a use position aperture 522 (FIGS. 55, 56, and 59) defined in the upper end of outer extrusion 454. That is, when a user has fully translated inner extrusion 452 out of outer extrusion 454 and into the extended or use position, and the user releases handle 460, outer end 480 of peg 474 will be pulled by a spring 476 in such a manner that it will insert itself into use position aperture 522, and thereby prevent retraction of calf rest 450 back into the stowed position. This is described in greater detail below.

In order to retract calf rest 450 back to its retracted position, a user pulls on handle 460 again, which causes peg 474 to be rotated (overcoming the force of spring 476) out of use position aperture 522, thereby allowing inner extrusions 452 to translate with respect to outer extrusion 454. While still holding handle 460, the user pushes the inner extrusion 452 back toward the outer extrusion 454. Once fully retracted, the locking mechanism automatically re-engages, and the calf rest is not able to extend, nor pivot downwardly, without once again pulling on handle 460.

The detailed construction of a locking assembly 462 that may be used with calf rest 450 will now be described with respect to FIGS. 53-58. Locking assembly 462, in addition to inner and outer extrusions 452 and 454, further includes an outer bushing 464, a suspension linkage 466, a lower pivot bracket 468 that are coupled to outer extrusion 454. Locking assembly also includes a cassette 470 that is positioned inside of inner extrusion 452, an inner bushing 472, peg 474, a spring 476, and a Bowden cable 478. Peg 474 is positioned so that an outer end 480 will extend through an aperture 482 defined in outer extrusion 454 when calf rest 450 is in the retracted position, as well as through use position aperture 522 when in the extended position—as discussed above. When peg 474 is positioned in aperture 482, cassette 470 is unable to slide within outer extrusion 454 because the engagement of end 480 of peg 474 with the edges of aperture 482. Further, because cassette 470 is fixedly attached to inner extrusion 452, inner extrusion 452 is also unable to slide within outer extrusion 454, thereby preventing calf rest 450 from extending to the use position.

Figure 53:
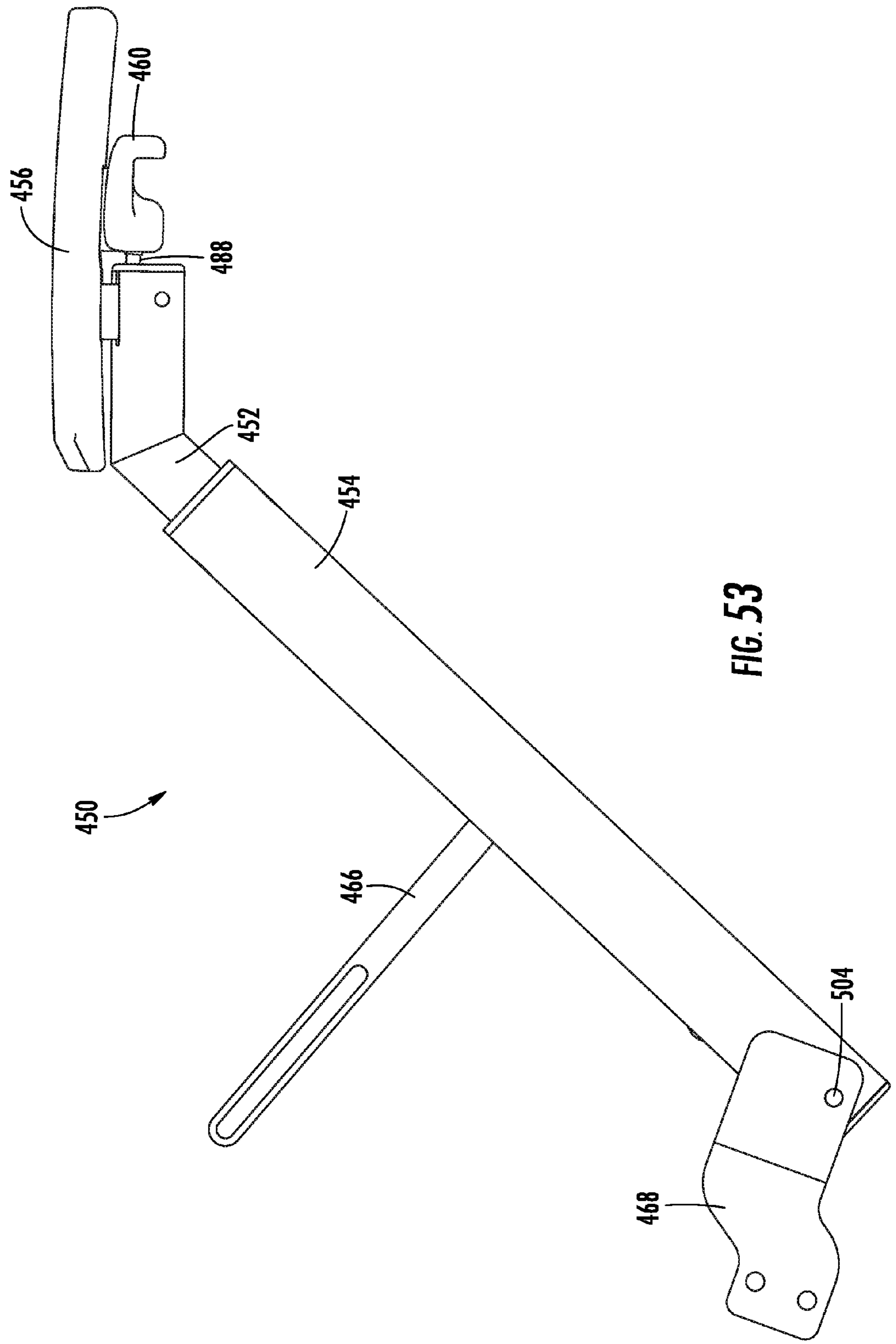
FIG. 53 is a side, elevational view of the calf rest extension of FIG. 51 shown with the handle in an un-pulled position.
Figure 54:
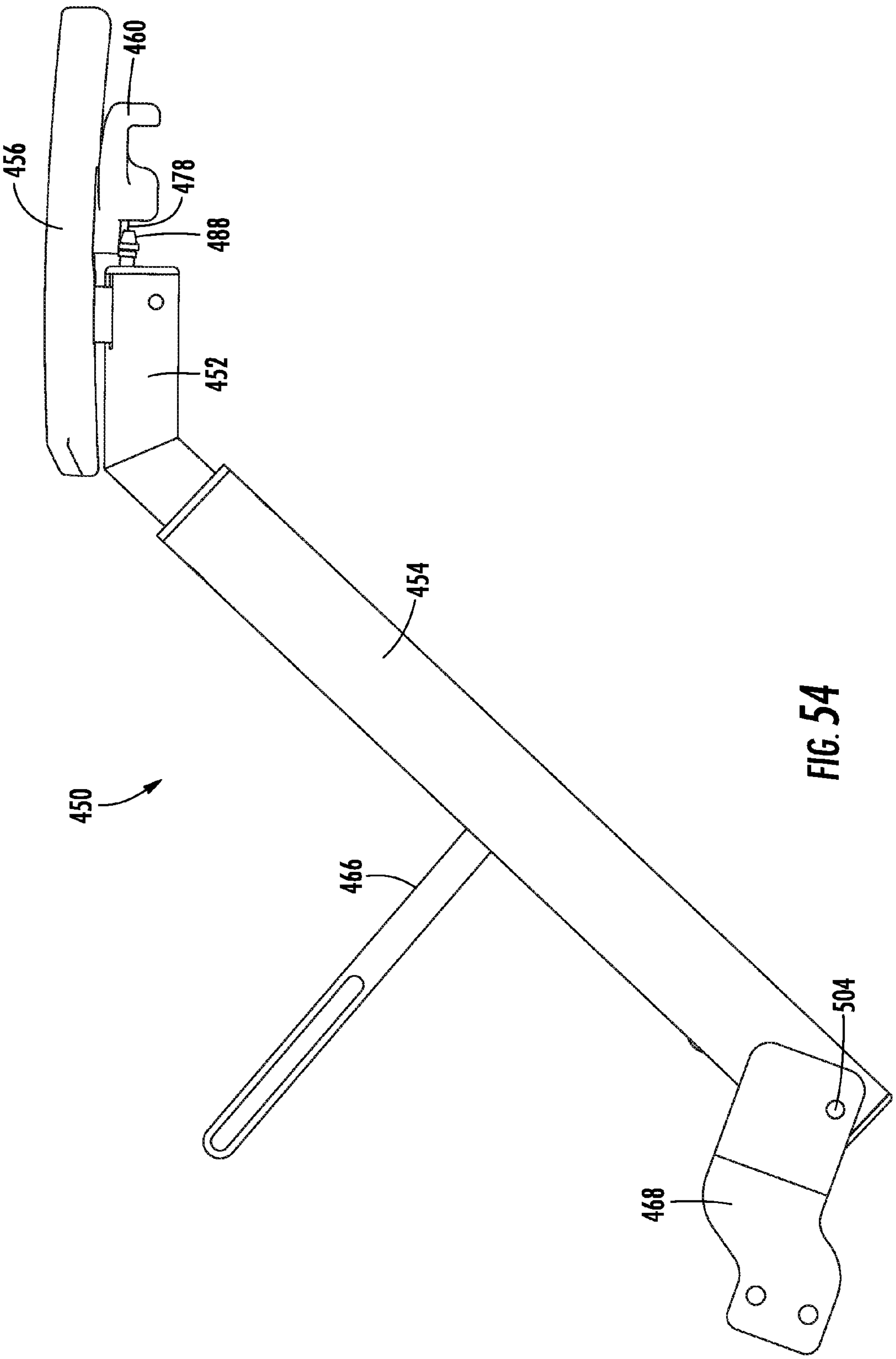
FIG. 54 is a side, elevational view of the calf rest extension of FIG. 53 shown with the handle in a pulled position.
Figure 55:
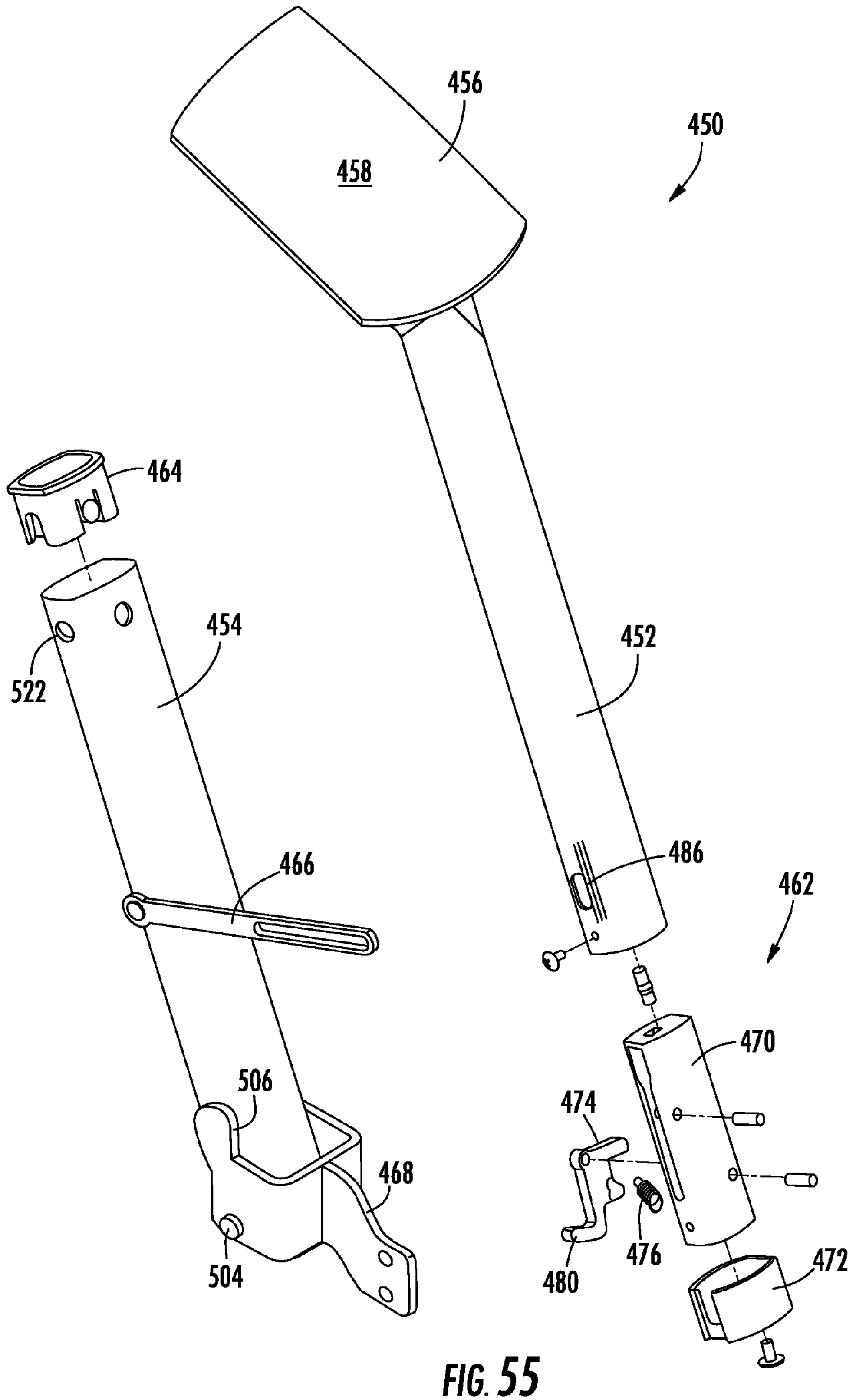
FIG. 55 is a perspective, exploded view of several of the components of the calf rest extension of FIGS. 51-53.
Figure 56:
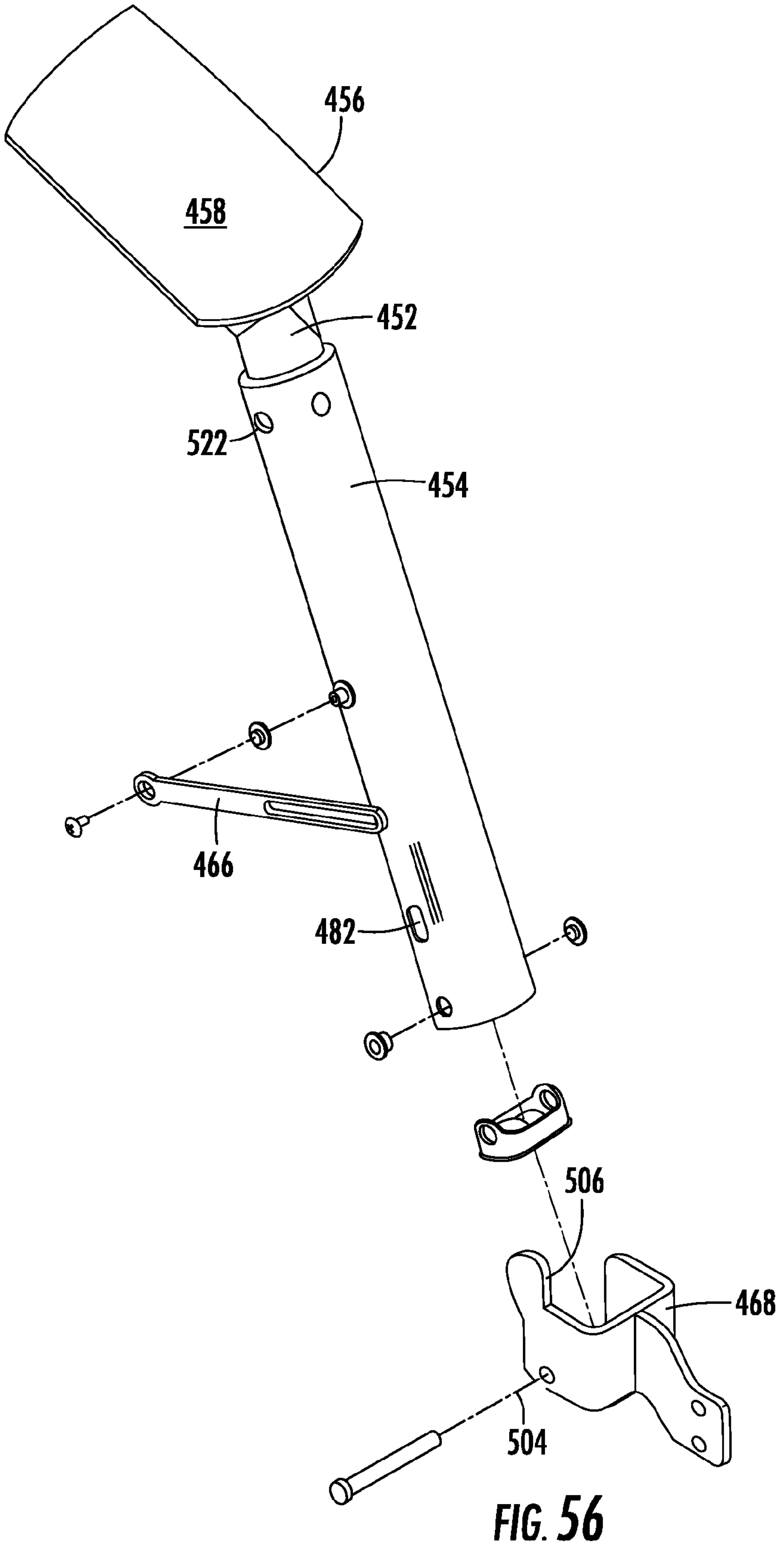
FIG. 56 is another perspective, exploded view of several of the components of the calf rest extension of FIGS. 51-53.
Figure 57:
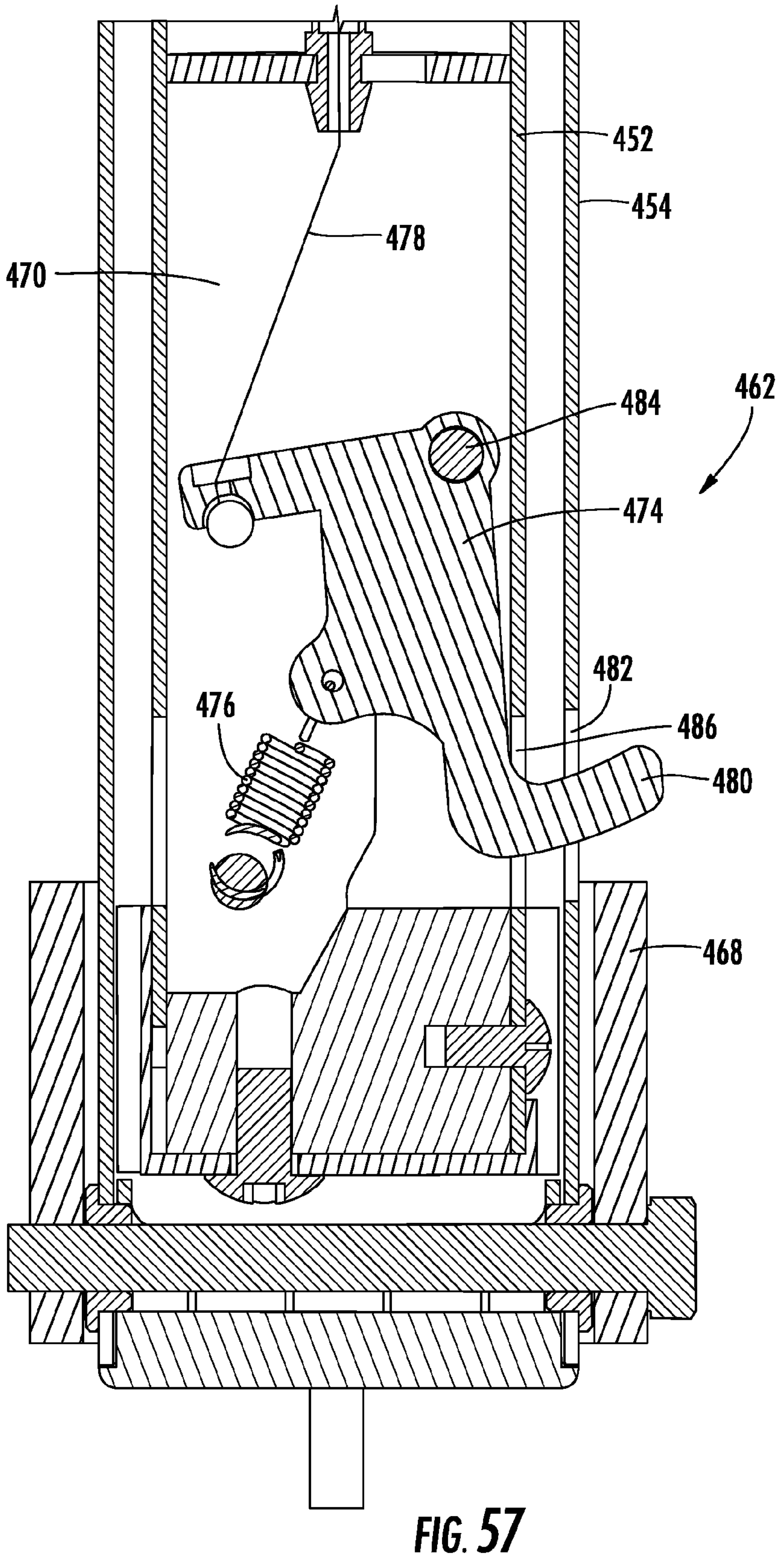
FIG. 57 is a sectional view of the locking mechanism of the calf rest extension of FIGS. 51-53 illustrating the locking mechanism in a locked position.
Figure 58:
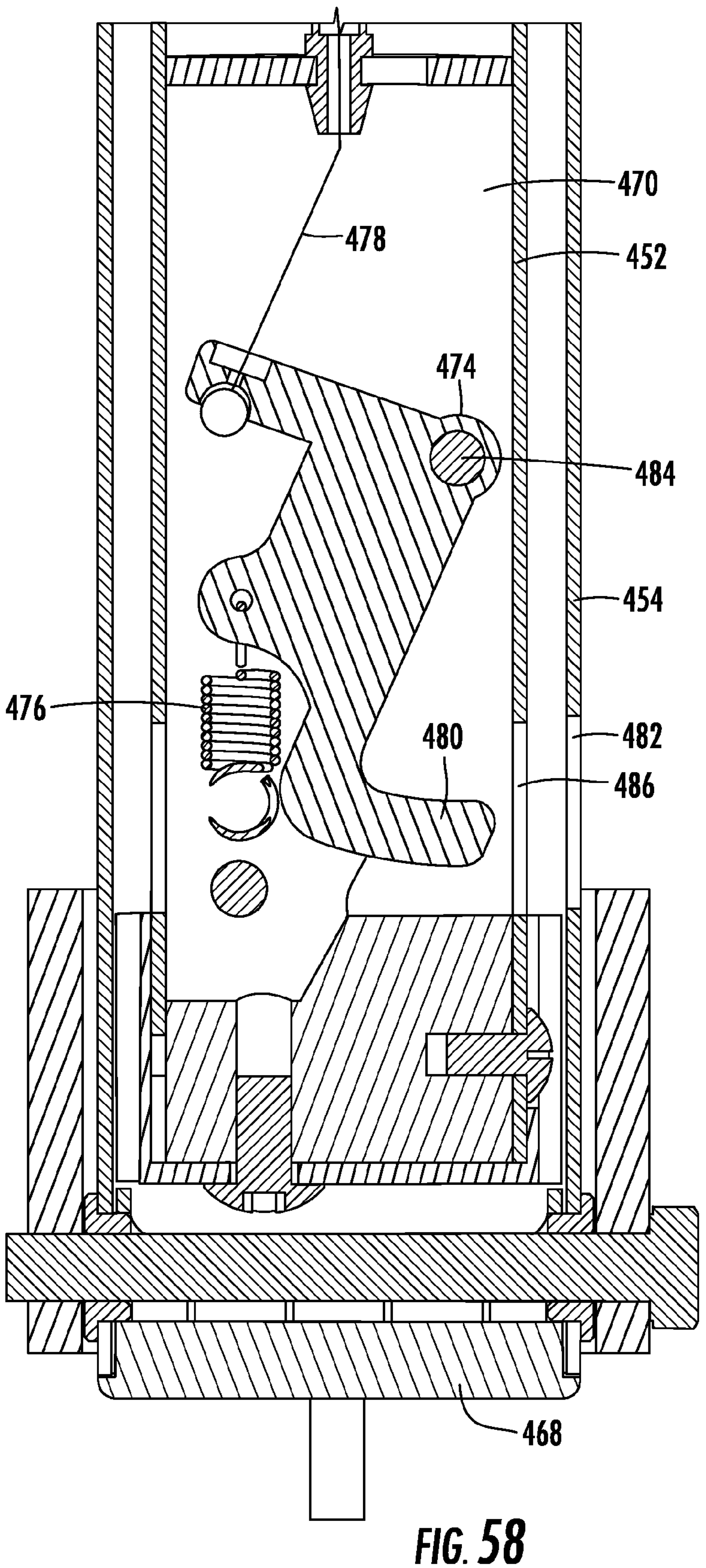
FIG. 58 is a sectional view of the locking mechanism of FIG. 57 illustrating the locking mechanism in an unlocked position.

As is more clearly shown in FIGS. 57 and 58, peg 474 is rotatable about a pivot axis 484. Spring 476 is coupled to peg 474 and exerts a biasing force that urges peg 474 about pivot axis 484 in a direction that causes end 480 to extend into aperture 482 (if aligned therewith). That is, spring 476 exerts a force that tends to re-engage the locking mechanism whenever aperture 482 is aligned with aperture 486 in inner extrusion 452 (through which outer end 480 of peg 474 also extends). When peg 474 is rotated (counterclockwise in FIG. 57), outer end 480 of peg 474 will recede out of aperture 482 defined in outer extrusion 454, as well as aperture 486 defined in inner extrusion 452. As a result, when peg 474 is oriented in the manner shown in FIG. 58, inner extrusion 452 will be free to slide within outer extrusion 474, thereby enabling a user to extend inner extrusion 452 outwardly to a use position. The rotation of peg 474 is effected by Bowden cable 478, which has its other end 488 coupled to handle 460. As shown in FIGS. 53 and 54, pulling on handle 460 will cause the Bowden cable 478 to pull on peg 474 in such a manner so as to retract its outer end 480 out of apertures 482 and 486, thereby allowing calf rest 450 to be extended.

When calf rest 450 is in the stowed position and a user pulls on handle 460, not only does pulling on handle 460 release calf rest 450 such that it may extend outwardly in front of the transport chair, it also releases the pivoting ability of calf rest 450. That is, once handle 460 is pulled and calf rest 450 is unlocked, not only does inner extrusion 452 become free to translate out of outer extrusion 454, but both inner and outer extrusions 452 and 454 become free to pivot about a pivot axis 504 (FIGS. 51-56). Pulling on handle 460, which only requires movement in a single direction, therefore causes a release of movement ability in two different degrees of freedom. The downward pivoting of inner and outer extrusions 452 and 454 is limited by suspension linkage 466.

In addition to retaining inner extrusion 452 within outer extrusion 454, outer end 480 of peg 474 also retains calf rest 450 in the stowed position underneath seat 24. That is, peg 474—when in the locking position—not only prevents inner and outer extrusions 452 and 454 from translating with respect to each other in a telescoping type of movement, but peg 474 also prevents inner and outer extrusions 454 and 454 from pivoting about pivot axis 504 when peg 474 is in the locked position. Peg 474 prevents this pivoting motion by contacting a latch surface 506 defined on one side of lower pivot bracket 468 (see, e.g., FIGS. 55-56). When in the stowed position underneath seat 24, outer end 480 of peg 474 abuts against latch surface 506 and this abutment prevents calf rest 450 from pivoting downward about pivot axis 504. When a user pulls on handle 460, however, outer end 480 of peg 474 recedes within inner extrusion 452 through aperture 486 (in the manner described above), which moves outer end 480 of peg 474 out of contact with latch surface 506, thereby enabling calf rest 450 to pivot downwardly about axis 504. Thus, when in the locked position, outer end 480 of peg 474 extends out of aperture 486 sufficiently far to not only block relative movement of outer extrusion 454, but also relative pivoting (about axis 504) of both inner and outer extrusions 452 and 454 with respect to bracket 468. The single act of pulling on handle 460 therefore releases two different locking mechanisms—one that locks translation and another that locks pivoting.

Figure 59:
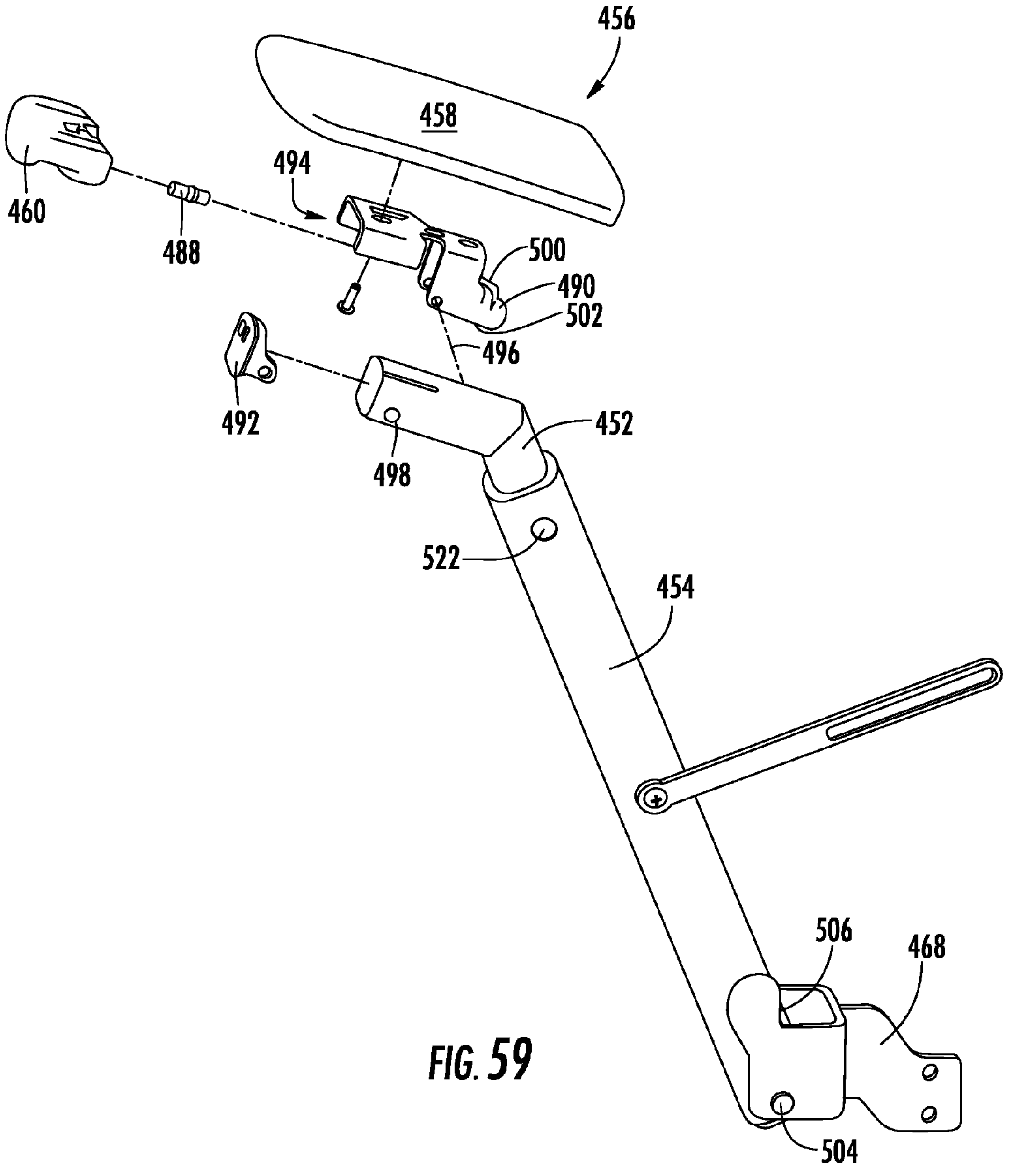
FIG. 59 is a perspective, exploded view of several other components of the locking mechanism of FIGS. 51-53.
Figure 60:
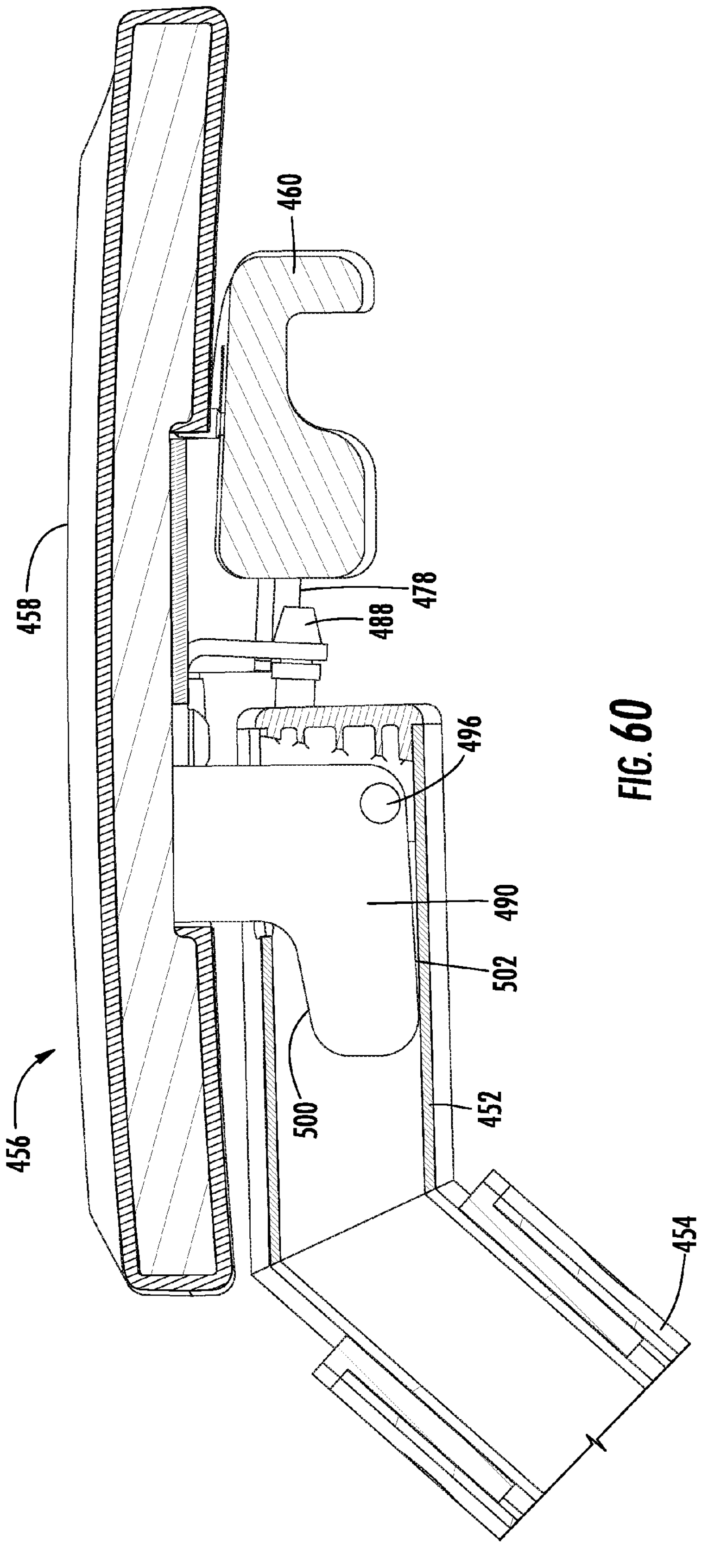
FIG. 60 is a side, sectional view of the upper portion of the calf rest showing the calf support in a generally horizontal orientation.
Figure 61:
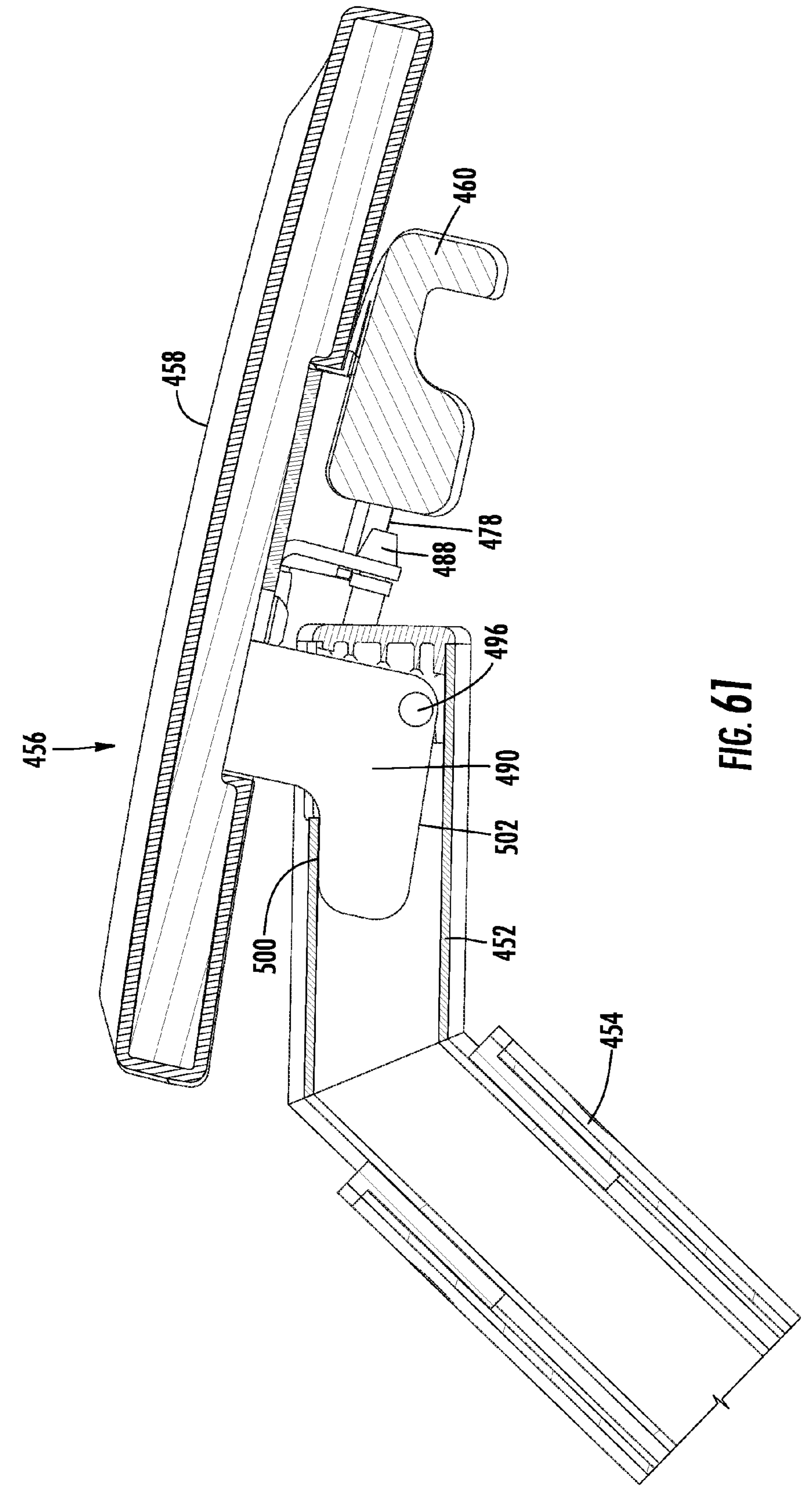
FIG. 61 is a side, sectional view of the upper portion of the calf rest showing the calf support in a pivoted orientation.
Figure 62:
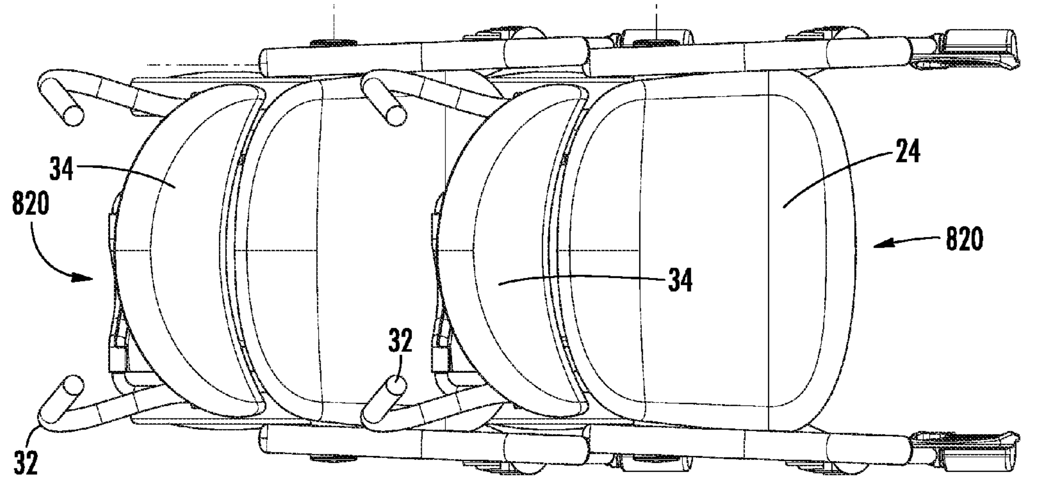
FIG. 62 is a plan view of a pair of transport chairs illustrating the nesting ability of the transport chairs.
Figure 63:
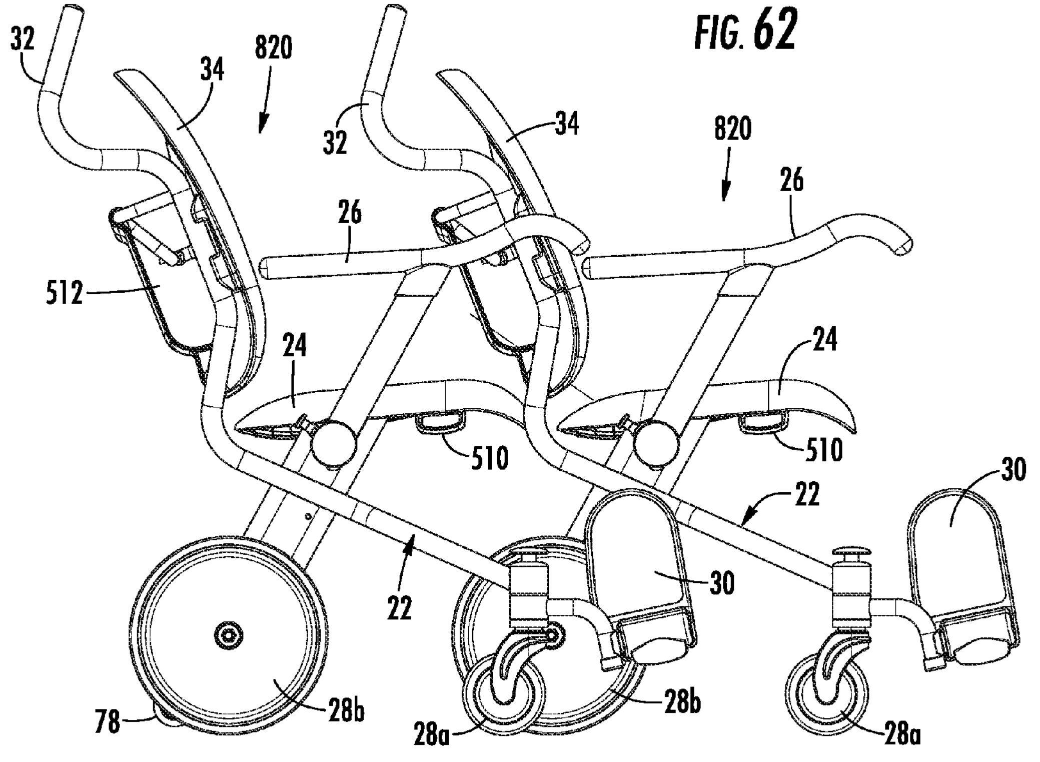
FIG. 63 is a side, elevational view of the chairs of FIG. 62.
Figure 64:
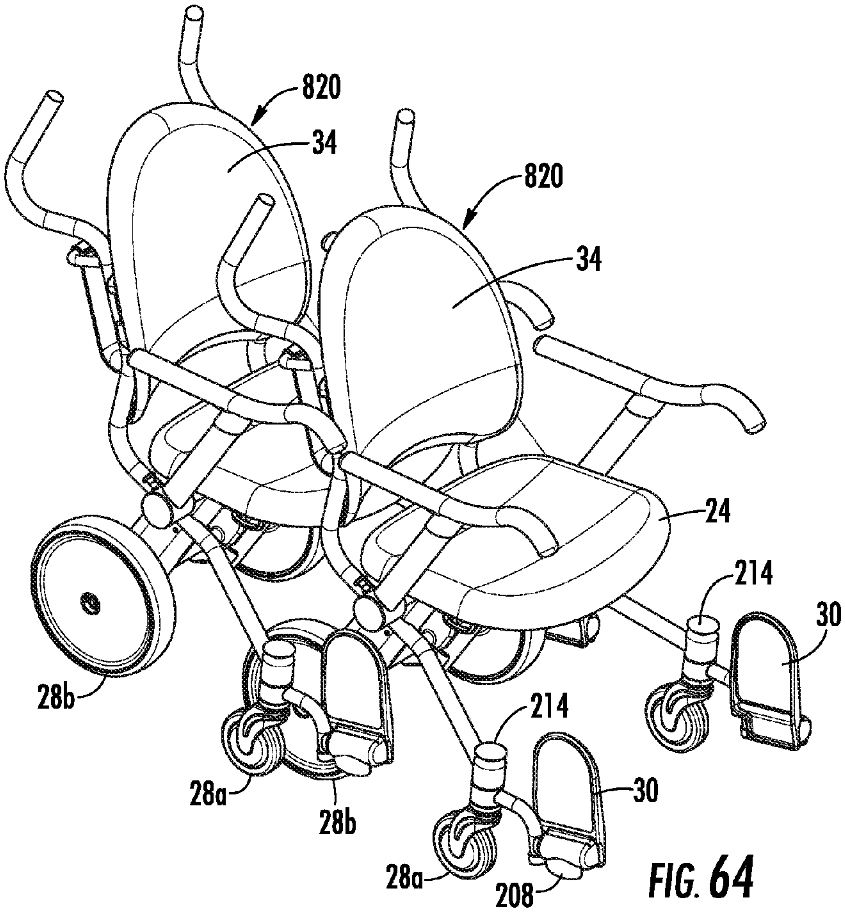
FIG. 64 is a front perspective view of the chairs of FIG. 62.
Figure 65:
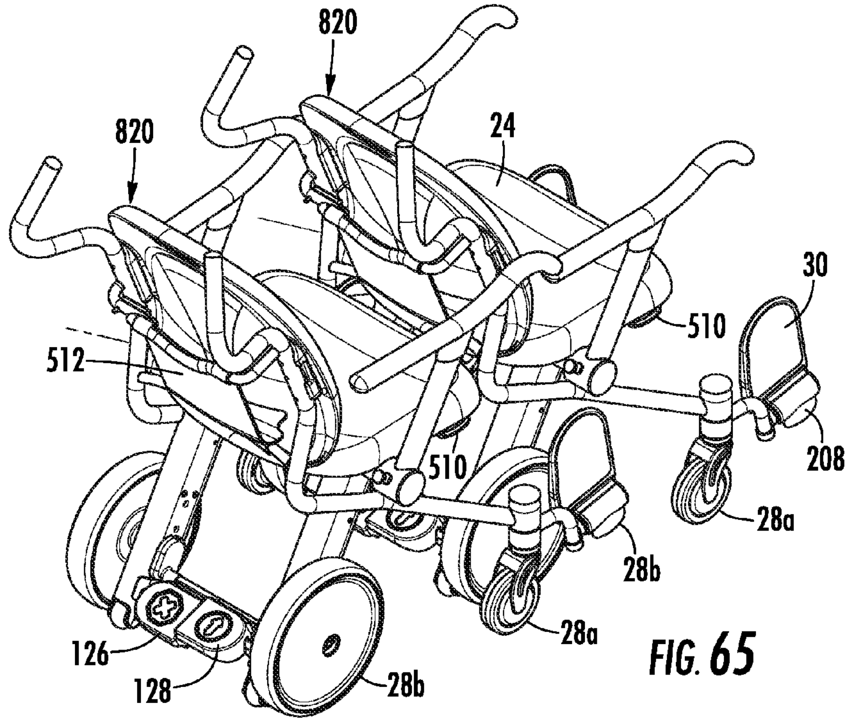
FIG. 65 is a rear perspective view of the chairs of FIG. 62.

FIG. 59 shows more detail of the construction of pad assembly 456. Pad assembly 456 includes a pivot rail bracket 490, an inner extrusion cover 492, an end 488 of the Bowden cable, and handle 460. Pivot rail bracket 490 provides a track 494 along which handle 460 slides when a user pulls thereon. Pivot rail bracket 490 is also pivotable about a pivot axis 496 that is aligned with a hole 498 defined at the upper end of inner extrusion 452. Pivot rail bracket 490 may therefore pivot in the manner shown in FIGS. 60 and 61. Further, because upper surface 458 is coupled to pivot rail bracket 490, upper surface 458 is able to pivot to accommodate a patient's leg angle.

Pivot rail bracket include a rear top surface 500 and a rear bottom surface 502 that together define the limits of the pivoting of pivot rail bracket 490. That is, when rear bottom surface 502 contacts the interior bottom surface of inner extrusion 452 (FIG. 60), pivot rail bracket 490 is prevented from pivoting further in a counterclockwise direction (with respect to FIG. 60). Similarly, when rear top surface 500 contacts the interior top surface of inner extrusion 452 (FIG. 61), pivot rail bracket 490 is prevented from pivoting further in a clockwise direction (with respect to FIG. 61).

Other Features

FIGS. 61-65 illustrate the ability of a transport chair embodiment 820 to nest with another similar transport chair 820. Transport chair 820 is similar to the other transport chairs described herein, and they all have the same nesting ability as transport chair 820. Those components of transport chair 820 that are the same as those of the other transport chairs described herein are labeled with the same reference numbers, and the description of those components applies equally to transport chair 820. This nesting ability is facilitated by the overall configuration of the transport chairs (820 and other embodiments) wherein the front end of the chair is generally wider than the rear end of the chair. By having the front end of the chair more expansive than the rear end, the front end of a first chair is able to fit around the more narrow rear end of a second chair, thereby allowing them to nest together. Further, as has been noted already, by having the front end more expansive than the rear end, there is more space in the front end of the chair for a patient to stand, thereby facilitating ingress into, and egress out of, the transport chair.

Chairs 820 may be modified so that, when nested, one or more portions of frame 22, or other components of the chair, will frictionally engage a portion of the other nested chair so that there is frictional engagement between the nested chairs. This frictional engagement can facilitate movement of the entire group of nested chairs, particularly where steering or motive forces are applied to the rearmost chair in the group in a direction other than forward, or in situations where steering or motive forces are applied to one of the other chairs in the group other than the rearmost chair. As an alternative to frictional engagement between the nested chairs, a latch or other releasable physical coupling may be included on the chairs so that the nested chairs are generally held together when in the nested condition. Regardless of whether frictionally or mechanically engaged, the coupling of the chairs together also helps ensure that, if the brake pedal of one of the chairs (e.g. the rearmost in the group) is pressed, the entire group of chairs will be effectively braked through the braking of that single chair.

In yet another alternative embodiment, the transport chairs include one or more physical structures that are configured to come into physical contact with, and press on (if not already pressed), the go pedal 128 of a second chair positioned in front thereof when the chairs are nested together. This ensures that, as multiple chairs are nested together, all of the chairs in the nested group will have their brakes released with the sole possible exception of the rear-most chair in the group (which can be manually turned on and off by pressing on the brake and go pedals). This helps avoid the scenario where a user has nested a group of chairs together and, after attempting to push the entire group, discovers that one of the chairs in the group has its brake pedal pressed, thereby impeding movement of the entire group.

In still other embodiments, this automatic release of the brakes in the forward chair by the immediately rearward chair can be accomplished by other physical structures that don't necessarily physically push on go pedal 128. For example, each chair could be configured with an alternative structure for activating go pedal 128, such as a hand switch, or other alternative structure. When so configured, each chair could further include an activating mechanism that automatically released the brakes of the forward chair via the alternative structure (e.g. hand switch). Still other variations are possible.

Transport chair 820 further includes a pair of Foley catheter bag hooks 510 that are positioned generally underneath seat 24 on either side of seat 24. In the illustrated embodiments, hooks 510 are coupled to seat brackets 68 (FIG. 8). Hooks 510 provide a structure for hanging a Foley catheter bag, which a patient riding in transport chair 820 may be using. Hooks 510 are positioned out of the way so that they do not obstruct normal use of transport chair 820, yet provide a convenient location for hanging such a Foley bag. Further, when hung on either of hooks 510, the Foley catheter bag is positioned along the side of transport chair 820, which is out of the way of the patient's legs and the caregiver's legs. Hooks 510 are positioned near the front of transport chair 820, but do not stick out in either a forward direction or a lateral direction. Hooks 510 may be added to any of the other transport chair embodiments disclosed herein.

Transport chairs 820 also include an optional chart holder 512 positioned behind back rest 34. Chart holder 512 provides a location for storing medical charts, papers, records, or other items that a caregiver may want to transport while pushing a patient with chair 820.

Figure 66:
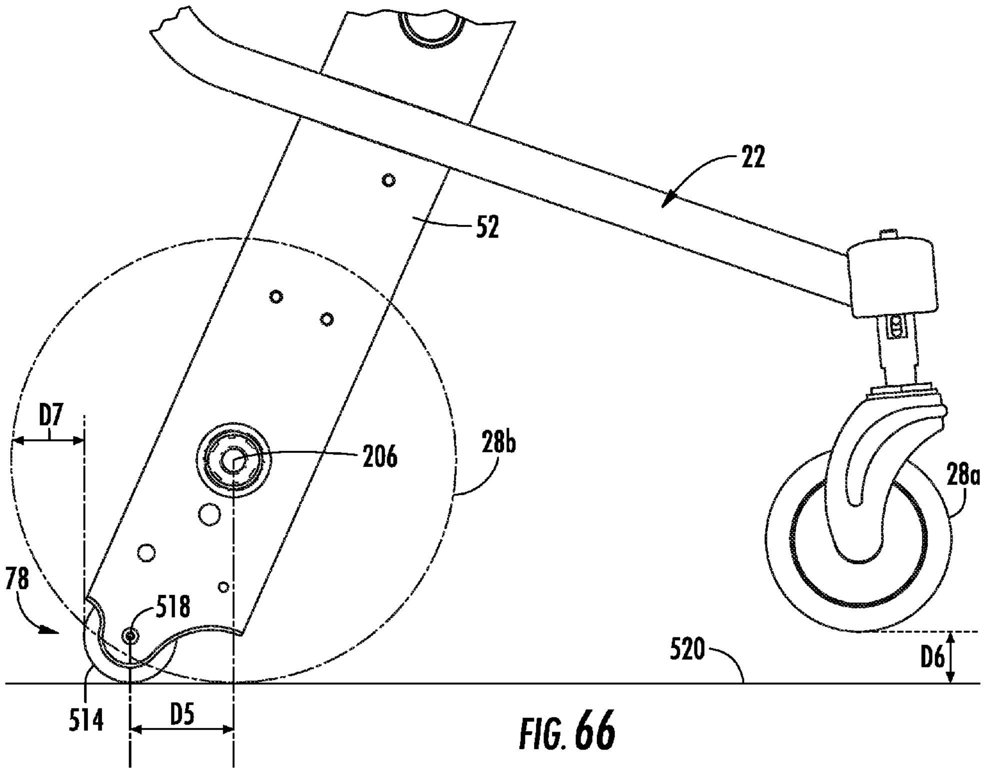
FIG. 66 is a side, elevational view of the bottom portion of a transport chair having a rear wheelie set.
Figure 67:
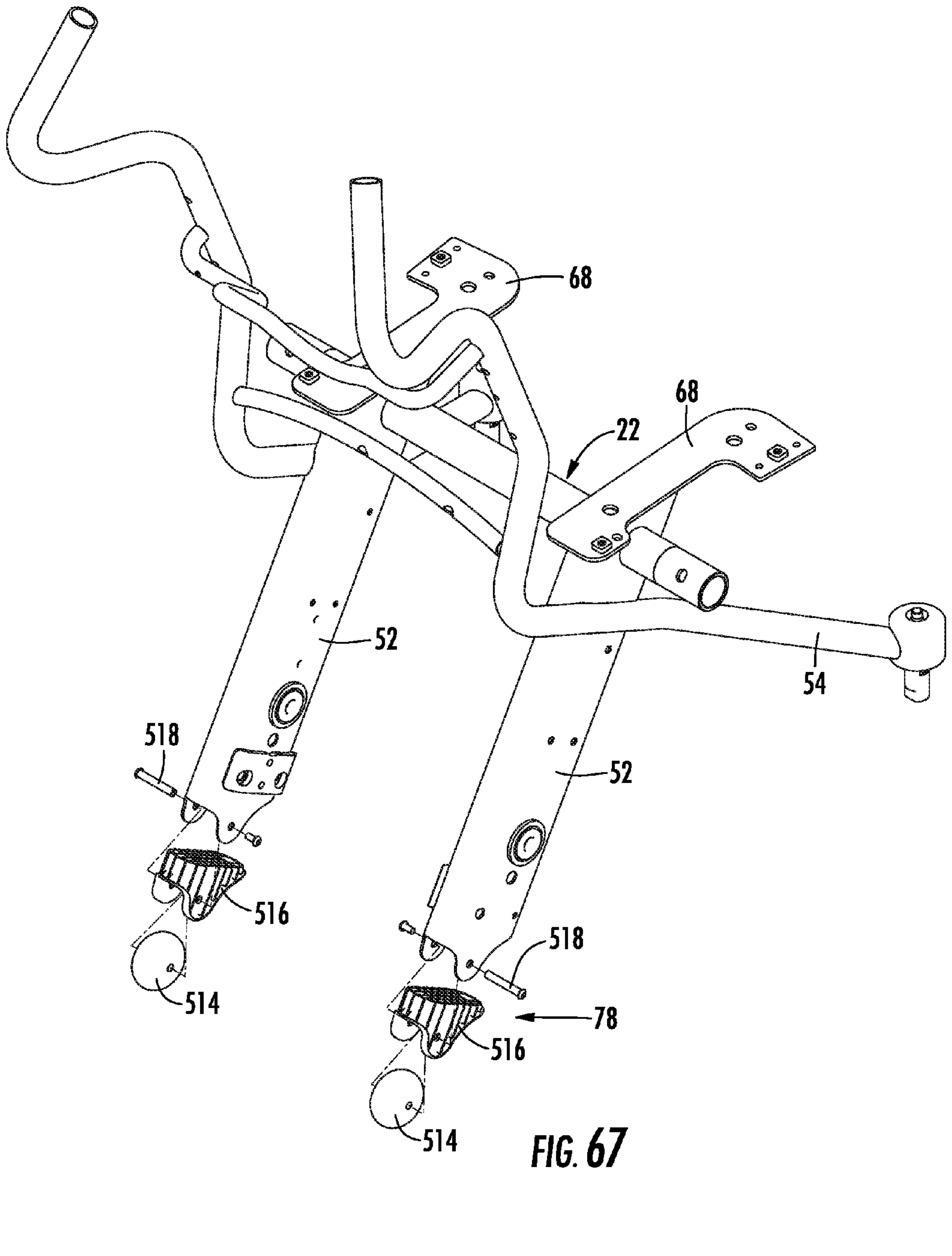
FIG. 67 is an exploded perspective view illustrating the construction of the wheelie set of FIG. 66.

FIGS. 66 and 67 illustrate in greater detail a wheelie roller set 78 that helps prevent tipping of the transport chair. Wheelie roller set 78 may be used in any of the chair embodiments described herein, or it may be omitted. Wheelie set 78 includes rollers or wheelies 514, wheelie brackets 516, and wheel attachment pins 518 which serve as the axles for the rotation of wheelies 514. As can be seen in FIG. 66, wheel axles 518 are positioned at a location that is a distance D5 behind the axle of rotation of rear wheels 28*b*. By varying this distance, the amount of backward tipping of the transport chair before rollers or wheelies 514 come into contact with the ground 520 can be controlled. As shown in FIG. 66, front wheels 28*a* have been lifted off of ground 520 by a distance D6. Further lifting of front wheels 28*a* is substantially prevented by the contacting of wheelies 514 with ground 520. More specifically, a much greater force is required to lift front wheels 28*a* any higher than the position shown than is required to lift them distance D6. This is because, by coming into contact with the ground, wheelies 514 shift the axis of rotation of the chair backward, requiring more force to lift up the front end any further.

Wheelies 514 assist in moving the transport chair over uneven surfaces where a caregiver desires to lift up the front end of the chair to move over the uneven surface (e.g. a curb, or the like). Wheelies assist in movement over uneven surfaces by providing a low friction interface with the ground 520, when they are engaged. Further, as noted, wheelies 514 help prevent excessive tipping of the transport chair.

In the configuration shown in FIG. 66, wheelies 514 have an axis of rotation (defined by axles 518) that falls within the circular area defined by rear wheels 28*b* when viewed from the side (such as is shown in FIG. 66). This relative location of the axes of rotation, as well as the fact that the smaller diameter of the wheelies 514 relative to the diameter of rear wheels 28*b* means that the rear end of wheelies 514 does not extend as far back as the rear end of rear wheels 28*b*. More specifically, the rear end of rear wheels 28*b* extends a distance D7 farther back than the rear end of wheelies 514. This greater rearward extension of wheels 28*b* means that the wheelies 514 substantially do not create any additional obstacles for a caregiver's feet when the caregiver is standing or walking behind the transport chair. The relatively short rearward extension of wheelies 514 also means that they do not create any tripping hazards for individuals walking behind the transport chair.

The above description is that of several embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A chair for transporting patients, said chair comprising:

a frame;

a seat supported on said frame;

a back rest supported by said frame and positioned adjacent a rear edge of said seat, said back rest providing support for a back of a patient seated in said chair;

a plurality of wheels coupled to said frame to allow said chair to roll, a brake pedal rotatable about a pivot axis and adapted to brake a set of said wheels when the brake pedal is rotated about the pivot axis in a first circular direction; and a release pedal rotatable about the pivot axis and adapted to unbrake said set of wheels when the release pedal is rotated about the pivot axis in the first circular direction, wherein said brake pedal and said release pedal are interconnected such that pressing said brake pedal rotates the brake pedal in the first circular direction and causes the release pedal to rotate in a second circular direction, and pressing said release pedal rotates the release pedal in the first circular direction and causes the brake pedal to rotate in the second circular direction, the first circular direction being opposite to the second circular direction.

2. The chair of claim 1 wherein said brake pedal and said release pedal are positioned side-by-side at a location rearward of the pivot axis.

3. The chair of claim 2 further including a toggle link coupled to said brake pedal and said release pedal, the toggle link adapted to rotate one of the brake pedal and release pedal in the first circular direction when the other of the brake pedal and release pedal rotates in the second circular direction.

4. The chair of claim 3 further including a pair of handles attached to said frame, said handles adapted to allow a caregiver to push said chair.

5. The chair of claim 4 wherein said set of wheels includes a pair of rear wheels, and said brake pedal and said release pedal are positioned between said pair of rear wheels.

6. The chair of claim 1 further including a first toothed wheel coupled to a first one of said set of wheels;

a second toothed wheel coupled to a second one of said set of wheels;

a first pin selectively positionable between teeth on said first toothed wheel;

a second pin selectively positionable between teeth on said second toothed wheel;

a first biasing member adapted to urge said first pin between teeth on said first toothed wheel when said brake pedal is pressed; and a second biasing member adapted to urge said second pin between teeth on said second toothed wheel when said brake pedal is pressed.

7. The chair of claim 6 wherein said frame includes a first rear leg to which said first one of said set of wheels is coupled and a second rear leg to which said second one of said set of wheels is coupled.

8. The chair of claim 7 wherein said first pin, said first toothed wheel, and said first biasing member are enclosed within said first rear leg; and said second pin, said second toothed wheel, and said second biasing member are enclosed within said second rear leg.

9. The chair of claim 5 further including:

a toothed wheel coupled to one of said set of wheels;

a first and second pin adapted to be selectively positioned between teeth on said toothed wheel, said first and second pins arranged so that only one of said first and second pins can be positioned between said teeth at a time; and a biasing member adapted to urge at least said one of said first and second pins between teeth on said toothed wheel when said brake pedal is pressed.

10. The chair of claim 9 wherein said frame includes a rear leg to which said one of said set of wheels is coupled, and said first and second pins and said biasing member are all enclosed within said rear leg.

11. The chair of claim 10 further including a wheelie roller coupled to a lower end of said rear leg.

12. The chair of claim 1 further including:

a toothed wheel coupled to an axle about which one of said wheels in said set of wheels rotates, said toothed wheel being coupled to said axle at a first location that is spaced apart from a second location on said axle where said one of said wheels is attached to said axle;

a pin adapted to be selectively positioned between teeth on said toothed wheel; and a biasing member adapted to urge said pin between teeth on said toothed wheel when said brake pedal is pressed.

13. The chair of claim 12 further including a clamp positioned at said first location, said clamp adapted to clamp said toothed wheel to said axle.

14. The chair of claim 13 wherein said one of said wheels is attached to said axle via a keyed surface and threads defined on said axle.

15. A chair for transporting patients comprising:

a frame;

a seat supported on said frame;

a plurality of wheels adapted to allow said chair to roll;

a toothed wheel coupled to at least one of said plurality of wheels whereby said toothed wheel and said at least one of said plurality of wheels rotate together;

a first pin selectively positionable between teeth on said toothed wheel, said first pin preventing said at least one of said plurality of wheels from rotating when positioned between teeth on said toothed wheel;

a second pin selectively positionable between teeth on said toothed wheel, said second pin preventing said at least one of said plurality of wheels from rotating when positioned between teeth on said toothed wheel, said first and second pins being positioned such that only one of said first and second pins is able to be positioned between said teeth at a time;

a biasing member adapted to urge both said first and second pins between teeth on said toothed wheel;

a release pedal positioned behind said seat and rotatable about a pivot axis, said release pedal adapted to overcome said biasing member when said release pedal is pressed; and a brake pedal positioned behind said seat and rotatable about said pivot axis, said brake pedal adapted to release said release pedal when said brake pedal is pressed, said brake pedal and said release pedal both being positioned behind said pivot axis.

16. The chair of claim 15 further including:

a second toothed wheel coupled to a second one of said plurality of wheels whereby said second toothed wheel and said second wheel rotate together;

a third pin selectively positionable between teeth on said second toothed wheel, said third pin preventing said second wheel from rotating when positioned between teeth on said second toothed wheel;

a fourth pin selectively positionable between teeth on said second toothed wheel, said fourth pin preventing said second wheel from rotating when positioned between teeth on said second toothed wheel, said third and fourth pins being positioned such that only one of said third and fourth pins is able to be positioned between said teeth on said second toothed wheel at a time;

a second biasing member adapted to urge both said third and fourth pins between teeth on said second toothed wheel; and wherein the release pedal is adapted to overcome said second biasing member when said release pedal is pressed.

17. The chair of claim 15 further including a first brake finger and a second brake finger, said first pin mounted to said first brake finger and said second pin mounted to said second brake finger, wherein said biasing member is adapted to urge said first and second brake fingers toward each other.

18. The chair of claim 17 wherein said biasing member is a spring and said spring stores more potential energy when both of said first and second pins are not engaged with teeth on said toothed wheel, and said spring stores less potential energy when one of said first and second pins is inserted between teeth on said toothed wheel.

19. The chair of claim 17 further including a brake cam mounted to a rotatable brake shaft, the brake shaft and brake cam adapted to rotate in a first circular direction in response to the brake pedal being pressed and to rotate in a second circular direction in response to the release pedal being pressed, the brake cam positioned to contact the first and second brake fingers and urge the first and second fingers apart when the release pedal is pressed.

20. The chair of claim 17 wherein said toothed wheel and said at least one of said plurality of wheels are mounted to a common axis, said toothed wheel is axially spaced on said common axis from said at least one of said plurality of wheels, said common axis is different from said pivot axis, and said first and second brake fingers rotate about first and second axes, respectively, that are different from both said common axis and said pivot axis.

21. The chair of claim 20 wherein said toothed wheel, said first and second brake fingers, and said biasing member are enclosed within a housing and said at least one of said plurality of wheels is positioned outside of said housing.

22. A chair for transporting patients comprising:

a frame;

a seat supported on said frame;

a plurality of wheels adapted to allow said chair to roll;

a toothed wheel coupled to at least one of said plurality of wheels whereby said toothed wheel and said at least one of said plurality of wheels rotate together;

a brake finger;

a pin mounted to said brake finger and selectively positionable between teeth on said toothed wheel, said pin preventing said at least one of said plurality of wheels from rotating when positioned between teeth on said toothed wheel;

a first biasing member adapted to urge said brake finger toward said toothed wheel and to urge said pin between teeth on said toothed wheel;

a brake cam mounted to a rotatable brake shaft, the brake cam positioned to contact the brake finger and urge the brake finger away from the toothed wheel when the brake cam is rotated to a first position and to allow the brake finger to move toward the toothed wheel when the brake cam is rotated to a second position;

a pedal adapted to toggle the brake cam between the first and second positions, said pedal adapted to overcome the urging of said first biasing member when the brake cam is in the first position, and to not resist the urging of said first biasing member when the brake cam is in the second position; and a second biasing member adapted to urge said brake cam toward said first position when the brake cam is in the first position and to urge said brake cam toward said second position when the brake cam is in the second position.

23. The chair of claim 22 wherein said first biasing member provides all of the force needed to insert said pin between teeth on said toothed wheel.

24. The chair of claim 23 wherein said first biasing member is a spring that stores potential energy when the brake cam is in the first position and releases potential energy when the brake cam is in the second position.

25. The chair of claim 24 further including a back rest supported by said frame and positioned adjacent a rear edge of said seat, said back rest providing support for a back of a patient seated in said chair.

26. The chair of claim 22 further including:

a second toothed wheel coupled to a second one of said plurality of wheels;

a second brake finger;

a second pin mounted to said second brake finger and selectively positionable between teeth on said second toothed wheel; and a third biasing member adapted to urge said second brake finger toward said second toothed wheel and to urge said second pin between teeth on said second toothed wheel;

a second brake cam positioned to contact the second brake finger and urge the second brake finger away from the second toothed wheel when the second brake cam is in a first position and to allow the second brake finger to move toward the second toothed wheel when the second brake cam is in a second position; and a fourth biasing member adapted to urge said second brake cam toward its first position when the second brake cam is in its first position and to urge said second brake cam toward its second position when the second brake cam is in its second position.

27. The chair of claim 26 further including:

a third pin mounted to a third brake finger and selectively positionable between teeth on said toothed wheel; and a fourth pin mounted to a fourth brake finger and selectively positionable between teeth on said second toothed wheel.

28. The chair of claim 27 wherein said pin and said third pin are positioned at offset locations relative to the teeth of said toothed wheel such that when one of said pin and said third pin is able to be inserted between teeth on the toothed wheel, the other of said pin and said third pin will be at least partially blocked by a tooth from being positioned between teeth on the toothed wheel; and wherein said second and fourth pins are positioned at offset locations relative to the teeth of said second toothed wheel such that when one of said second and fourth pins is able to be inserted between teeth on the second toothed wheel, the other of said second and fourth pins will be at least partially blocked by a tooth from being positioned between teeth on the second toothed wheel.

29. The chair of claim 27 wherein the first biasing member urges the brake finger and third brake finger toward each other, and the third biasing member urges the second brake finger and fourth brake finger toward each other.

30. The chair of claim 29 further including a second pedal and a toggle link coupled to the pedal and the second pedal, the toggle link adapted to pivot one of the pedal and second pedal in a particular direction when the other of the pedal and second pedal pivots in a direction opposite the particular direction.

* * * * *